United States Patent
Umeda et al.

(10) Patent No.: US 7,495,720 B2
(45) Date of Patent: Feb. 24, 2009

(54) POLARIZING PLATE AND LIQUID CRYSTAL DISPLAY DEVICE

(75) Inventors: Hiroki Umeda, Hino (JP); Noriyasu Kuzuhara, Kunitachi (JP)

(73) Assignee: Konica Minolta Opto, Inc., Tokyo (JP)

( * ) Notice: Subject to any disclaimer, the term of this patent is extended or adjusted under 35 U.S.C. 154(b) by 286 days.

(21) Appl. No.: 11/486,858

(22) Filed: Jul. 14, 2006

(65) Prior Publication Data

US 2007/0019133 A1 Jan. 25, 2007

(30) Foreign Application Priority Data

Jul. 21, 2005 (JP) ............................. 2005-211148

(51) Int. Cl.
- *G02B 5/30* (2006.01)
- *G02B 27/28* (2006.01)
- *G02B 1/10* (2006.01)
- *G02F 1/1335* (2006.01)

(52) U.S. Cl. .................... 349/96; 359/483; 359/485; 359/586

(58) Field of Classification Search .............. None
See application file for complete search history.

(56) References Cited

U.S. PATENT DOCUMENTS

| 2007/0019133 A1* | 1/2007 | Umeda et al. ............ 349/96 |
| 2007/0146887 A1* | 6/2007 | Ikeda et al. ............. 359/586 |

FOREIGN PATENT DOCUMENTS

| JP | 2002-267847 | 9/2002 |
| JP | 2004-004550 | 1/2004 |
| JP | 2005-114995 | 4/2005 |

* cited by examiner

*Primary Examiner*—Michelle R Connelly Cushwa
(74) *Attorney, Agent, or Firm*—Frishauf, Holtz, Goodman & Chick, P.C.

(57) ABSTRACT

A polarizing plate comprises a polarizing element; and a hydrophilic polymer film adhered on the polarizing element and having an in-plane orientation. The transmittance of the polarizing plate as a single unit for light having a wavelength of 590 nm is 40% or more under an environment of 23° C. and 55% RH, the crossed-Nichols transmittance T2 of the polarizing plate is 0.03% or less under an environment of 23° C. and 55% RH, and a change $\Delta T2$ in the transmittance T2 of the polarizing plate when the relative humidity changes from 20% RH to 80% RH at 23° C. satisfies the following formula:

$0.05 \times T2 < \Delta T2 < 0.9 \times T2$.

5 Claims, 4 Drawing Sheets

POLARIZING PLATE AND LIQUID CRYSTAL DISPLAY DEVICE

This application is based on Japanese Patent Application No. 2005-211148 filed on Jul. 21, 2005, in Japanese Patent Office, the entire content of which is hereby incorporated by reference.

BACKGROUND OF THE INVENTION

The present invention relates to a polarizing plate and liquid crystal display, particularly to a polarizing plate and liquid crystal display wherein the fluctuation of tint (tincture) due to humidity change is kept suppressed when the liquid crystal display of VA mode is observed from off-center or from the direction of slant.

The cellulose ester represented by the triacetyl cellulose employed as a polarizing plate protective film is a hydrophilic polymer, as compared to polycarbonate or norbornane based polymer. When the polymer is hydrophilic, the adhesive surface in contact with the polarizing film mainly made up of polyvinyl alcohol (PVA) is characterized by extremely easy handling. Conversely, being hydrophilic (hygroscopic) involves a problem of fluctuation of the tint in a slanting direction resulting from environmental changes such as temperature and humidity. To suppress such environmental changes, countermeasures have been taken in the conventional art by changing the type of plasticizer, increasing the amount thereof or introducing a rod-like compound for the purpose of reducing the percentage of water absorption (e.g. Patent Documents 1 and 2).

The fluctuation of the tint in a slanting direction can be improved to some extent by reducing the percentage of water absorption, for example, through increase in the amount of plasticizer. However, a problem has arisen in the practical use when compared to the case of using the less hydrophilic material such as polycarbonate and norbornane based polymer (e.g. Patent Document 3).

The present inventors have found out that what is important to suppress the fluctuation of tint in a slanting direction is to suppress the fluctuation in the front contrast (amount of white light/amount of black light) and the fluctuation in the leakage of front light when black is displayed, and the aforementioned reduction in the percentage of water absorption is less important. To achieve this, it is important to taken into account not only reduction in the percentage of water absorption by the plasticizer and others, but also the production process conditions and interaction by use of other additives.

Normally, in addition to the plasticizer, the following substances may be added to the polarizing plate protective film: polyvinyl alcohol (PVA); ultraviolet absorber for protecting the dye and liquid crystal cell including the PVA and iodine against ultraviolet rays; and particles for providing sliding property in order to maintain the film winding form. To improve the quality of the polarizing plate, these additives are essential.

In the present invention, it has been found out that fluctuation in tint can be suppressed if the environmental fluctuation in the leakage of front light during display in black is kept within the range determined in accordance with the present invention. However, reduction of the environmental fluctuation in the leakage of front light during display in black requires the fluctuation of depolarization to be suppressed. Even if the phase difference film using a hydrophilic polymer is employed in the polarizing plate protective film mere control of the incoming and outgoing water into and out of the film is not effective for the fluctuation of depolarization. Presence of an ultraviolet absorber or particle for incoming and outgoing water will cause fluctuation in the degree of depolarization. This will cause environmental fluctuation of tint when observed in a slanting direction. However, complete elimination of all of these additives is not preferred from the viewpoint of the liquid crystal display.

The present inventors have made efforts to solve the aforementioned problem, and have found out that the environmental fluctuation in the leakage of front light during the display of black can be suppressed by controlling the production process conditions and the amounts of the ultraviolet absorber and particle

[Patent Document 1] Japanese Non-Examined Patent Publication 2002-267847

[Patent Document 2] Japanese Non-Examined Patent Publication 2004-4550

[Patent Document 3] Japanese Non-Examined Patent Publication 2005-114995

SUMMARY OF THE INVENTION

The object of the present invention is to provide a polarizing plate and a liquid crystal display capable of reducing the fluctuation of tint due to humidity when observed in a slanting direction of the liquid crystal display especially in the VA mode.

The aforementioned object of the present invention can be achieved by the following structures:

(Item 1)

A polarizing plate including a hydrophilic polymer film having an orientation in its plane as a polarizing plate protective film, wherein the transmittance of the aforementioned polarizing plate as a single unit at a wavelength of 590 nm is equal to or greater than 40% in an environment of 23 degrees Celsius and 55% RH, and the transmittance T2 of crossed-Nichols in an environment of 23 degrees Celsius and 55% RH does not exceed 0.03%; and wherein the change in transmittance $\Delta T2$ meets $0.05 \times T2 < \Delta T2 < 0.9 \times T2$, when the relative humidity has changed from 20% RH to 80% RH at 23 degrees Celsius.

(Item 2)

The polarizing plate of the aforementioned polarizing plate protective film wherein Ro expressed by the following equation (i) at a wavelength of 590 nm in the environment of 23 degrees Celsius with a relative humidity of 55% RH is from 30 through 70 nm; Rt expressed by the following equation (ii) is from 100 through 300 nm; S1 expressed by the following equation (iii) is from 0.0005 through 0.0016; and S2 expressed by the following equation (iv) is from 0.0022 through 0.005.

$$Ro = (nx - ny) \times d \qquad \text{Equation (i)}$$

$$Rt = \{(nx + ny)/2 - nz\} \times d \qquad \text{Equation (ii)}$$

$$S1 = nx - ny \qquad \text{Equation (iii)}$$

$$S2 = (nx + ny)/2 - nz \qquad \text{Equation (iv)}$$

where nx denotes the refractive index in the direction of the low axis inside the film surface, ny indicates the refractive index in the direction of the high axis inside the film surface, nz represents the refractive index along the film thickness, and d shows the film thickness (nm).

(Item 3)

The polarizing plate described in Item 1 or 2 wherein the aforementioned polarizing plate protective film contains the ultraviolet absorber and particles in proportions expressed by the following Equations (1) through (3):

$$0 \leq Wu/Wf \leq 0.1 \quad \text{Equation (1)}$$

$$0 \leq Wm/Wf \leq 0.05 \quad \text{Equation (2)}$$

$$Wu/Wf \leq -3 \times Wm/Wf + 0.22 \quad \text{Equation (3)}$$

where wf indicates the percentage of the plasticizer contained in the film, Wu denotes the percentage of the ultraviolet absorber contained in the film, and Wm shows the percentage of the particles contained in the film.

(Item 4)

The polarizing plate described in any one of the Items 1 through 3 wherein the hydrophilic polymer used for the aforementioned hydrophilic polymer film is a cellulose derivative.

(Item 5)

A liquid crystal display wherein the polarizing plate described in any one of the Items 1 through 4 wherein is used in at least one side of the liquid crystal cell.

(Item 6)

A method of producing a hydrophilic polymer film having an in-plane orientation, comprises:

a casting process of casting a hydrophilic polymer liquid onto a support;

a separating process of separating a hydrophilic polymer layer from the support so as to form a web;

a conveying process of conveying the web;

a stretching process of stretching the conveyed web; and a drying process of drying the stretched web;

wherein a length of the web conveyed by the conveying process from the separating process to the stretching process is 40 m to 300 m.

(Item 7)

In the method of Item 6, the length of the web conveyed by the conveying process is 50 m to 300 m.

(Item 8)

In the method of Item 6, the conveying time for the web in the conveying process is 0.5 minutes to 10 minutes.

(Item 9)

In the method of Item 6, the web is conveyed by 80 to 600 conveying rollers in the conveying process.

(Item 10)

In the method of Item 9, the web is conveyed by 100 to 450 conveying rollers in the conveying process.

(Item 11)

In the method of Item 6, a temperature under an environment in the conveying process is 10 to 70° C.

(Item 12)

In the method of Item 6, the hydrophilic polymer film is a cellulose derivative.

The present invention provides a polarizing plate and a liquid crystal display capable of reducing the fluctuation of tint due to humidity when observed in a slanting direction of the liquid crystal display especially in the VA mode.

DETAILED DESCRIPTION OF THE PREFERRED EMBODIMENT

Figure 1:
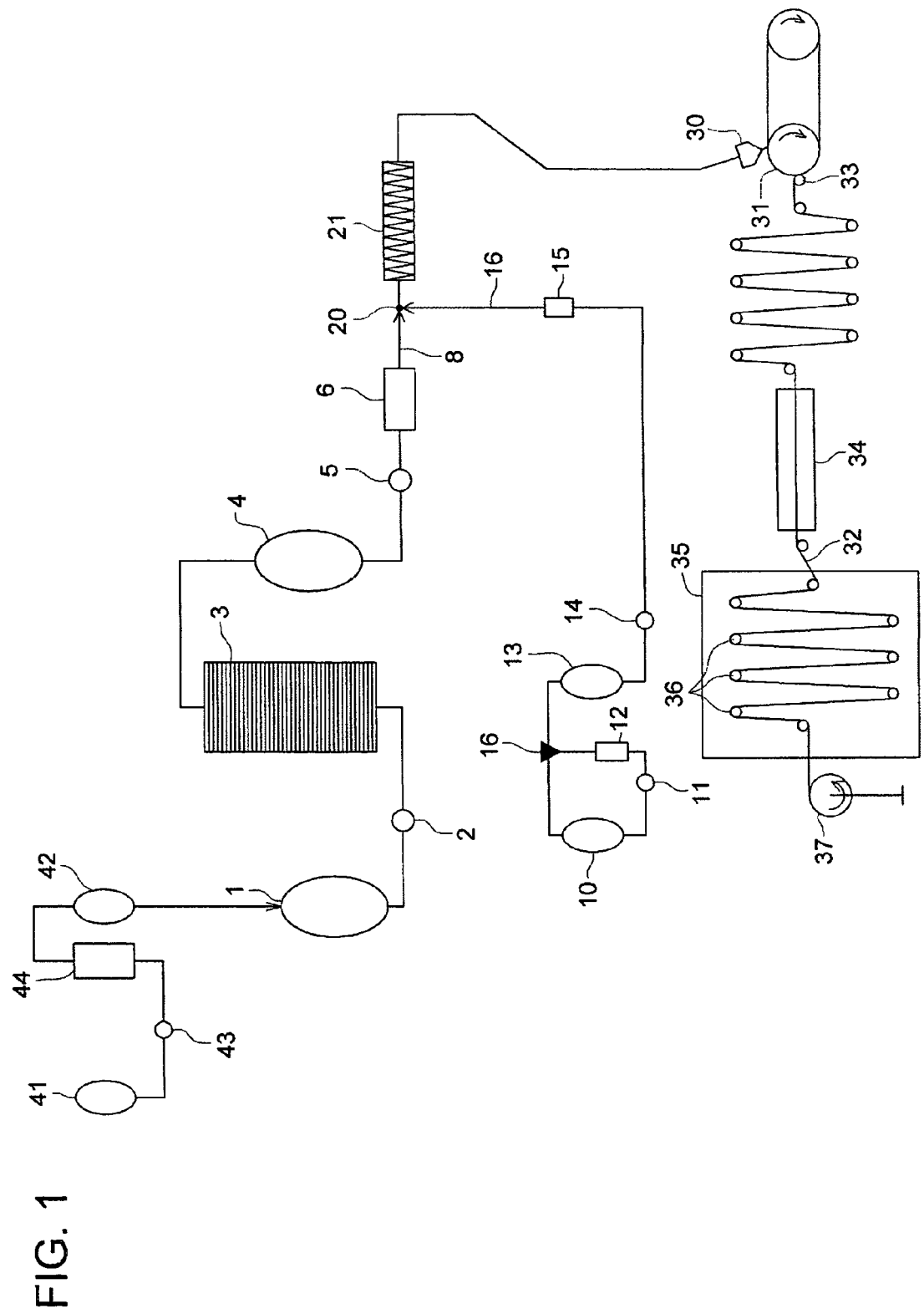
FIG. 1 is a schematic diagram showing the steps of dope preparation, casting and drying in the solution-casting film formation method of the present invention.

The following describes the best form of the embodiment of the present invention, without the present invention being restricted thereto:

The present inventors have made efforts to achieve the aforementioned object, and have found out the following, thereby reaching the prevent invention: It is possible to suppress the fluctuation of tint due to humidity when observed in a slanting direction of the liquid crystal display especially in the VA mode, by using a polarizing plate including an in-plane drawn hydrophilic polymer film as a polarizing plate protective film, wherein the transmittance of the aforementioned polarizing plate as a single unit at a wavelength of 590 nm is equal to or greater than 40% in an environment of 23 degrees Celsius and 55% RH, and the transmittance T2 of crossed-Nichols does not exceed 0.03%; and wherein the change in transmittance $\Delta T2$ meets $0.05 \times T2 < \Delta T2 < 0.9 \times T2$, when the relative humidity has changed from 20% RH to 80% RH at 23 degrees Celsius.

The polarizing plate protective film used in the polarizing plate of the present invention is manufactured by conveying and drying the web having been separated from a support member and by stretching it across the width with a tentering machine. In this case, the distance from the process of separation to the process of stretching by the tentering machine is made longer than the conventional level, and the polarizing plate protective film is manufactured. This film is used to produce the polarizing plate. The present inventors have found out that this procedure provides the aforementioned polarizing plate having the characteristics of the present invention, and the reproducibility of this procedure is remarkable.

According to the conventional art, if the distance from the process of separation to the process of stretching by the tentering machine is made longer, the web tends to cause meandering while being conveyed. If the web causes the meandering in subsequent to the process of separation, flatness deteriorates and optically characteristic spots are generated. Further, stretches and wrinkles are generated. Accordingly, the distance of conveyance from the process of separation to the tentering machine is on the order of 1 through 30 m in the conventional art. However, the present inventors produced a polarizing plate protective film when the distance of conveyance from the process of separation to the tentering machine was 40 through 300 m, and found out that the polarizing plate of the present invention could be obtained using this film. Thus, when the aforementioned distance of conveyance is 40 m or more, a polarizing plate protective film preferably used in the present invention can be manufactured. Keeping this distance less than 300 m is preferred to obtain the uniform optical characteristics. Keeping this distance within the range from 50 through 300 m is more preferred. The distance of conveyance from the process of separation to the tentering machine can be defined as the length of the web conveyed from the point of separation to the portion where an increase of the width in the tentering machine starts. From the process of separation to the process of stretching, the web is preferably conveyed by 80 through 600 conveyance rolls, preferably 100 through 450 conveyance rolls in order to ensure the advantages of the present invention. The atmospheric temperature from the point of separation to the tentering machine is preferably set at 10 through 70 degrees Celsius.

In the present invention, by making the distance of conveyance from the process of separation to the tentering machine to be 40 through 300 m longer than that in the conventional art, it seems that the orientation of the hydrophilic polymer film in its plane can become in good order in a predetermined direction, and become stable. As a result, by using the hydrophilic polymer film as a protective film for a polarizing plate, the environmental fluctuation in the leakage of front light during display in black can be suppressed.

The following describes the details of each constituent of the present invention:

(Hydrophilic Polymer Film)

The hydrophilic polymer film of the present invention can be defined as a film having an equilibrium moisture content of 1.5% or more at 23 degrees Celsius with a relative humidity of 55% RH. The equilibrium moisture content was measured as follows: A sample was subjected to humidity control at 23 degrees Celsius with a relative humidity of 55% for 24 hours. After that, the mass of this sample was measured. Then the same sample having been treated under the absolute dry condition was measured. This procedure provided the equilibrium moisture content at 23 degrees Celsius with a relative humidity of 55%. The trace moisture meter (CA-05 by Mitsubishi Chemical Industries, Ltd.) can be used for this measurement.

There is restriction imposed on the polymer film if it has the aforementioned equilibrium moisture content. Use of a cellulose derivative is preferred for the purpose of the present invention.

<Cellulose Derivative>

Cellulose derivatives available to this invention are cellulose ethers such as methyl cellulose, ethyl cellulose, hydroxy ethyl cellulose, hydroxy propyl cellulose, and cyano ethyl cellulose, and cellulose esters such as triacetyl cellulose (TAC), diacetyl cellulose (DAC), cellulose acetate propionate (CAP), cellulose acetate butylate (CAB), cellulose acetate phthalate, cellulose acetate trimellitate, and nitro cellulose. Among these, cellulose esters are preferable.

Celluloses as raw materials for cellulose derivatives available to this invention can be cotton linter, wood pulp, and kanaf although they are not limited. Cellulose derivatives obtained from these raw materials can be used singly or in combination at arbitrary ratios, but it is preferable to use 50 mass % or more of cotton linter.

The cellulose ester film has a greater modulus of elasticity as its molecular weight increases, but when the molecular weight goes too high, the cellulose ester solution becomes too viscous. This reduces the productivity of the cellulose ester film. The molecular weight (number average molecular weight (Mn)) of cellulose ester is preferably 40000 to 200000 and more preferably 100000 to 200000. The Mw/Mn ratio of cellulose ester used by this invention is preferably less than 4.0 and more preferably 1.4 to 2.3.

The mean molecular weight and molecular weight distribution of cellulose ester can be measured by a fast liquid chromatography. The ratio of mass mean molecular weight (Mw) to number average molecular weight (Mn) can be calculated from the results of measurement.

The measuring condition is as follows:
Solvent: Methylene chloride
Column: Shodex K806, K805, K803G (manufactured by Showa Denko KK). Three columns were used in connection.
Column temperature: 25° C.
Sample concentration: 0.1 mass %
Detector: RI Model 504 (manufactured by GL Science)
Pump: L6000 (manufactured by Hitachi Ltd.)
Flow rate: 1.0 ml/min
Calibration curve: Standard polystyrene STK (manufactured by Tosoh Corporation). Calibration curve using 13 samples of Mw=1,000,000 to 500. 13 samples should preferably be spaced approximately equally.

Preferable cellulose ester has acyl groups of 2 to 4 carbon atoms (per molecule) as substituents and satisfies Equations (I) and (II) (where X is the replacement ratio of acetyl group and Y is the replacement ratio of propionyl group or butyryl group) at the same time.

$$2.0 \leq X+Y \leq 2.6 \qquad \text{Equation (I)}$$

$$0 \leq X \leq 2.6 \qquad \text{Equation (II)}$$

Preferable cellulose ester is cellulose acetate propionate of $2.4 \leq X+Y \leq 2.6$, $1.4 \leq X \leq 2.3$, $0.1 \leq Y \leq 1.2$ (where X+Y is the total acyl group replacement ratio (total acyl substitution degree)). More preferable cellulose ester is cellulose acetate propionate of $2.4 \leq X+Y \leq 2.6$, $1.7 \leq X \leq 2.3$, $0.1 \leq Y \leq 0.9$ (where X+Y is the total acyl group replacement ratio). Moreover, cellulose acylate which has an acyl group and a carbamoyl group can also be used preferably. Concretely, the cellulose acylate described in paragraphs of [0014]-[0029] in Japanese Patent O.P.I. Publication No. 2005-68314 and the cellulose acylate described in paragraphs of [0045]-[0052] in Japanese Patent O.P.I. Publication No. 2004-315613 are preferably used as cellulose ester used for the present invention.

<Solvent>

The cellulose derivative of this invention is dissolved in a solvent to form a dope. This dope is flow-cast onto a substrate to form a film. Since the solvent must be removed by evaporation after extrusion or flow-casting, the solvent should preferably be volatile.

An organic solvent which has a good solubility of the above cellulose derivatives is called a good solvent and its main effect is to solve the cellulose derivatives. Among the good solvents, organic solvents that are used in large quantity is called a main or primary (organic) solvent.

Typical good solvents are, for example, ketones such as acetone, methyl ethyl ketone, cyclopentanone, and cyclohexanone, ethers such as tetrahydrofuran (THF), 1,4-dioxane, 1,3-dioxorane, and 1,2-dimethoxyethane, esters such as methyl formate, ethyl formate, methyl acetate, ethyl acetate, amyl acetate, and γ-butyrolactone, methyl cellosolve, dimethyl imidazolynone, dimethyl formamide, dimethyl acetoamide, acetonitrile, dimethyl sulfoxide, sulfolane, nitro ethane, methylene chloride, and acetomethyl acetate.

Among the above solvents, preferable are 1,3-dioxorane, THF, methyl ethyl ketone, acetone, methyl acetate and methylene chloride.

In addition to the above organic solvent, the dope should preferably contain 1 to 40 mass % of alcohol of 1 to 4 carbon atoms (per molecule) Alcohols work as a gelation solvent which gelates a web (a dope film made by flowing the cellulose derivative dope over a support) when the ratio of alcohol in the solvent becomes greater during evaporation of the solvent from the dope flown over a metallic support, strengthen the web, and facilitates separation of the web from the support. Alcohols also work to accelerate dissolution of the cellulose derivative into non-chlorine organic solvent when the ratio of alcohols is less.

Typical alcohols of 1 to 4 carbon atoms (per molecule) are methanol, ethanol, n-propanol, iso-propanol, n-buthanol, sec-buthanol, tert-buthanol, and propylene glycol monomethyl ether. Among these, ethanol is preferable because it excels at stability of dope and has a comparatively-low boiling point, good drying property, and little toxicity. These organic solvents are called poor solvents because they have no ability to dissolve cellulose derivatives.

The most preferable solvent which can satisfy the above conditions and dissolve cellulose derivatives at high concentration is a mixture of methylene chloride and ethyl alcohol whose ratio is in the range of 95:5 to 80:20 or a mixture of methyl acetate and ethyl alcohol whose ratio is in the range of 60:40 to 95:5.

<Additives>

The polarizing plate protective film of this invention can contain a plasticizer which gives workability, flexibility, and damp-proof to the film, an ultraviolet absorbent which gives an ultraviolet absorbing function to the film, an antioxidant which prevents deterioration of the film by oxidation, fine particles (matte material) which gives a slidability to the film, a retardation controller which controls the film retardation, and other additives.

<Plasticizer>

Plasticizers available to this invention are not limited particularly. However, to prevent hazes on the film and bleed-out or volatilization of the plasticizer from the film, the plasticizer should preferably contain functional groups which can interact with the cellulose derivative by hydrogen bonds, etc.

Such functional groups are hydroxy, ether, carbonyl, ester, carboxylic residue, amino, imino, amide, imide, cyano, nitro, sulfonyl, sulfonic residue, phosphonyl, phosphonic residue groups. Among them, carbonyl, ester, and phosphonyl groups are preferable.

As a plasticizer preferably used for the present invention, a phosphate ester type plasticizer and a non-phosphate ester type plasticizer are used preferably.

As a phosphate ester type plasticizer, triphenyl phosphate, tricresyl phosphate, cresyl diphenyl phosphate, octyl diphenyl phosphate, diphenyl biphenyl phosphate, trioctyl phosphate, tributyl phosphate, etc. may be listed.

As a non-phosphate ester type plasticizer, although a phthalate ester plasticizer, a trimellitate type plasticizer, a pyromellitic acid type plasticizer, a polyhydric alcohol type plasticizer, a glycolate type plasticizer, a citrate plasticizer, a fatty-acid-ester type plasticizer, a polyester plasticizer, polyvalence carboxylic acid ester plasticizer, etc. can be used preferably, it is desirable to use a polyhydric alcohol type plasticizer, a polyester plasticizer, and a polyvalence carboxylic acid type plasticizer preferably, in order to acquire especially the effect of the present invention.

A polyalcohol ester consists of an ester of an aliphatic polyalcohol having a valence of two or mor and monocarboxylic acid, and preferably includes an aromatic ring or a cycloalkyl ring in a molecule.

A polyalcohol used in the present invention is represented by formula (1)

$$R_1\text{---}(OH)_n \qquad \text{Formula (1)}$$

Wherein: $R_1$ represents an organic acid having a valence of n, n represents a positive integer of 2 or more and OH represents an alcoholic and/or a phenolic hydroxyl group.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

Specifically, triethylene glycol, tetraethylene glycol, dipropylene glycol, tripropylene glycol, sorbitol, trimethylolpropane and xylitol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives. Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid. Examples of preferable alicyclic monocarboxylic acids include: cyclopentanecarboxylic acid, cyclohexanecarboxylic acid, cyclooctanecarboxylic acid, and derivatives thereof. Examples of preferable aromatic monocarboxylic acids include: (i) benzoic acid and toluic acid, both of which have benzene ring in which alkyl groups are introduced, (ii) biphenylcarboxylic acid, naphthalenecarboxylic and tetralincarboxylic acid having 2 or more benzene rings, and (iii) derivatives thereof, of these, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester. To be used for a polyalcohol ester, carboxylic acid may be used alone or in combination of two or more carboxylic acids. Hydroxyl groups in a polyalcohol may be completely esterified or only partially esterified remaining unsubstituted hydroxyl groups. Specific examples of polyalcohol esters are shown below:

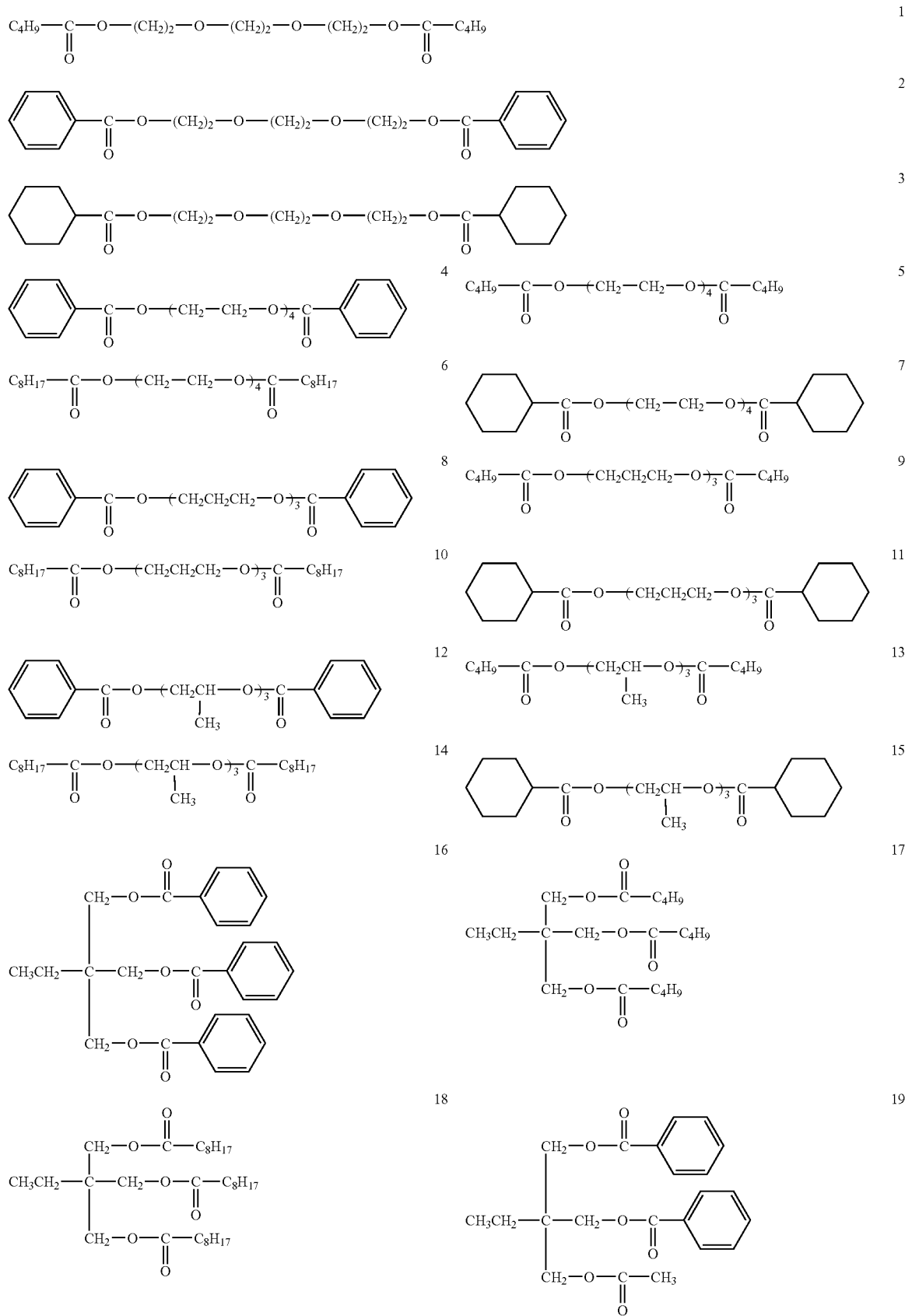

-continued
20
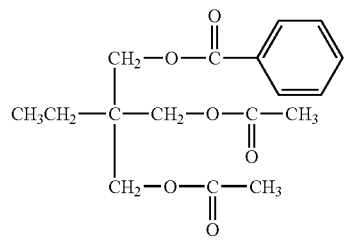
21
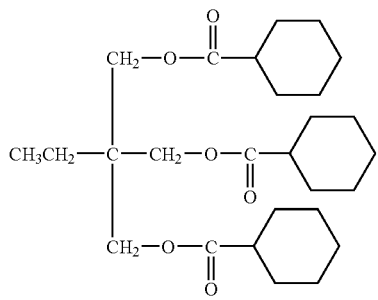
22
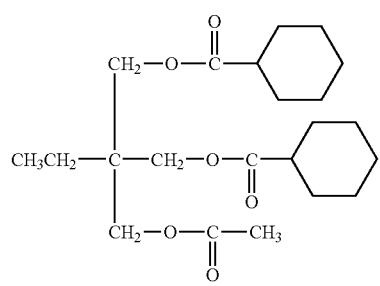
23
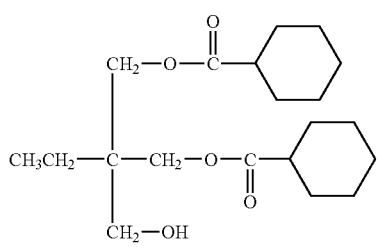
24
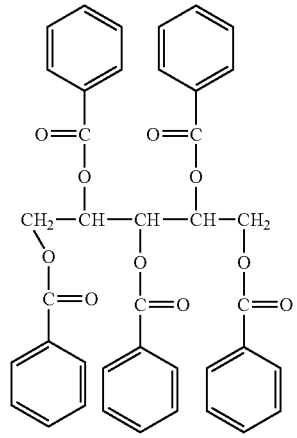
25
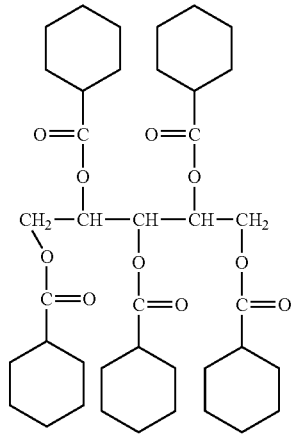
26
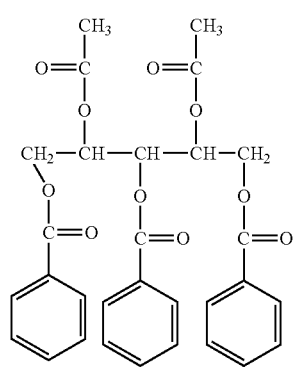
27
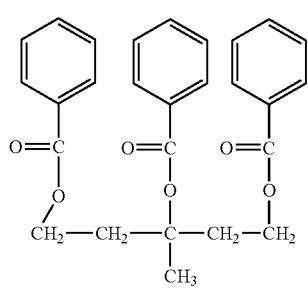

-continued

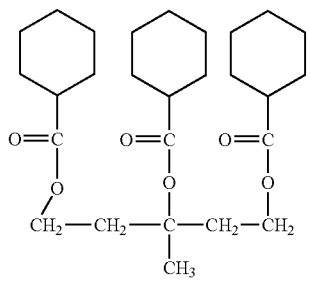 28

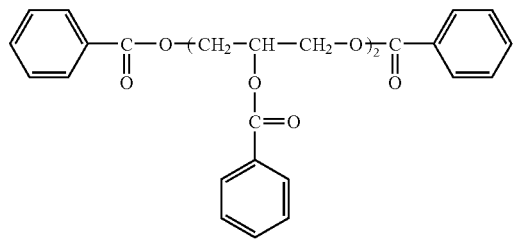 29

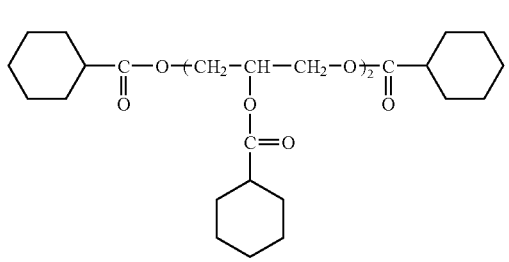 30

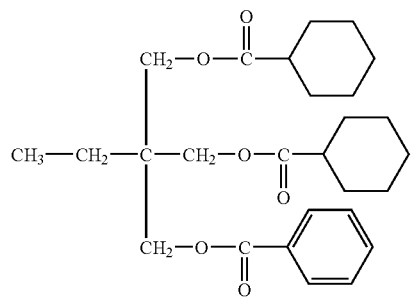 31

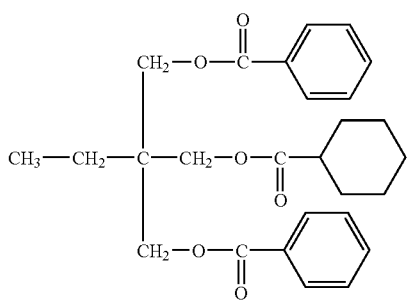 32

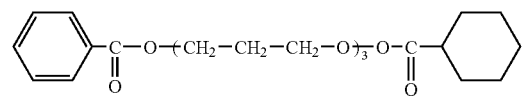 33

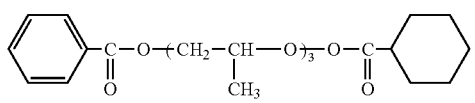 34

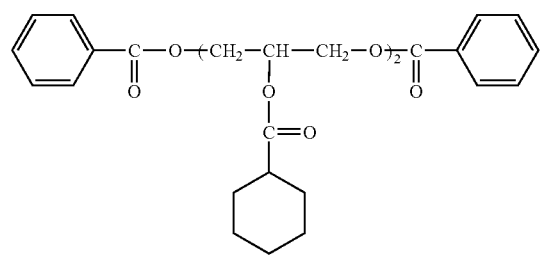 35

As for the content of the polyalcohol ester according the present invention, it is desirable to contain 1-15% by mass in a cellulose ester film, and especially it is desirable to contain 3-10% by mass.

(Ester Type Plasticizer)

The ester plasticizer used in the present invention is not specifically limited, however, an ester plasticizer which has an aromatic ring or a cycloalkyl ring in the molecule are applicable. For example, an ester plasticizer represented by the following Formula (1) are preferably used:

$$B-(G-A)_n-G-B \qquad \text{Formula (1)}$$

where B represents benzene monocarboxylic acid group, G represents an alkylene glycol group having 2-12 carbon atoms, an aryl glycol group having 6-12 carbon atoms, or an oxyalkylene glycol group having 4-12 carbon atoms, A represents an alkylene dicarboxylic acid having 4-12 carbon atoms, or an aryl dicarboxylic acid group having 6-12 carbon atoms, and n represents an integer of 1 or more.

A compound represented by Formula (1) is structured by benzene monocarboxylic acid group represented with B, an alkylene glycol group or an oxyalkylene glycol group or an aryl glycol group represented with G, and an alkylene dicarboxylic acid group or an aryl dicarboxylic acid group represented with A and is prepared through a reaction similar to the preparation reaction of a common polyester plasticizer.

Examples of a benzene monocarboxylic acid component of the ester plasticizer of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the ester plasticizer of the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols. Since alkylene glycol having carbon atoms of 2-12 is especially excellent in compatibility with cellulose ester, it is especially desirable.

Examples of an oxyalkylene glycol component having 4-12 carbon atoms of the aromatic terminal ester of the present invention include: diethylene glycol, triethylene glycol, tetraethylene glycol, dipropylene glycol and triropylene glycol, which may be used alone or in combination of two or more glycols.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids. Examples of an arylene dicarboxylic acid component having 6-12 carbon atoms include: phthalic acid, terephthalic acid, 1,5-naphthalene dicarboxylic acid and 1,4-naphthalene dicarboxylic acid.

The number average molecular weight of the ester plasticizer used in the present invention is preferably 250-2000, and more preferably 300-1500. The acid value of the ester plasticizer used in the present invention is preferably not more than 0.5 mgKOH/g and more preferably not more than 0.3 mgKOH/g. The hydroxyl value of the ester plasticizer used in the present invention is preferably not more than 25 mgKOH/g and more preferably not more than 15 mgKOH/g.

Examples of a synthetic method of an aromatic terminal ester plasticizer are shown below:

<Sample No. 1 (Aromatic Terminal Ester Sample)>

In a container, 410 parts of phthalic acid, 610 parts of benzoic acid, 737 parts of dipropylene glycols and 0.40 parts of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated to 100 Pa and, finally, to $4.0 \times 10^2$ Pa at 200-230° C., while the distillate was removed. The product was filtered to obtain an aromatic terminal ester type plasticizer having the following features:

| | |
|---|---|
| Viscosity (25° C., mPa · s): | 43400 |
| Acid value: | 0.2 |

<Sample No. 2 (Aromatic Terminal Ester Sample)>

An aromatic terminal ester having the following features was prepared in the same manner as Sample No. 1 except that 410 parts of phthalic acid, 610 parts of benzoic acid, 341 parts of ethylene glycol and 0.35 parts of tetra-isopropyl titanates (as a catalyst) were used.

| | |
|---|---|
| Viscosity (25° C., mPa · s): | 31000 |
| Acid value: | 0.1 |

<Sample No. 3 (Aromatic Terminal Ester Sample)>

An aromatic terminal ester having the following features was prepared in the same manner as Sample No. 1 except that 410 parts of phthalic acid, 610 parts of benzoic acid, 418 parts of 1,2-dihydroxypropane and 0.35 parts of tetra-isopropyl titanates (as a catalyst) were used.

| | |
|---|---|
| Viscosity (25° C., mPa · s): | 38000 |
| Acid value: | 0.05 |

<Sample No. 4 (Aromatic Terminal Ester Sample)>

An aromatic terminal ester having the following features was prepared in the same manner as Sample No. 1 except that 410 parts of phthalic acid, 610 parts of benzoic acid, 418 parts of 1,3-dihydroxypropane and 0.35 parts of tetra-isopropyl titanates (as a catalyst) were used.

| | |
|---|---|
| Viscosity (25° C., mPa · s): | 37000 |
| Acid value: | 0.05 |

Although concrete compounds of the aromatic teminal ester type plasticizer according to the present invention are shown below, the present invention is not limited to these.

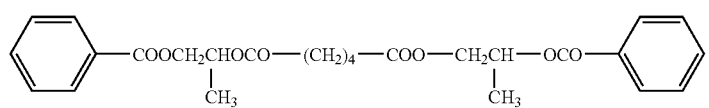

(1)

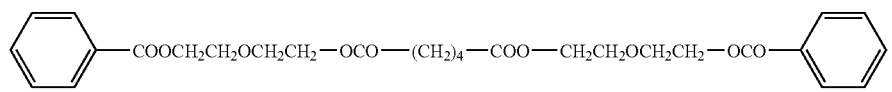

(2)

-continued

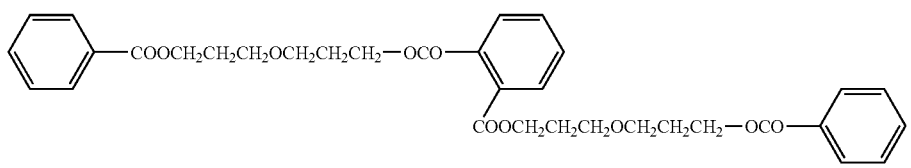
(3)

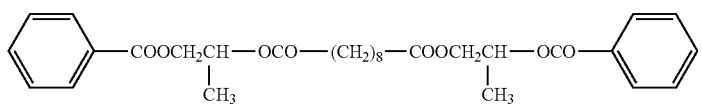
(4)

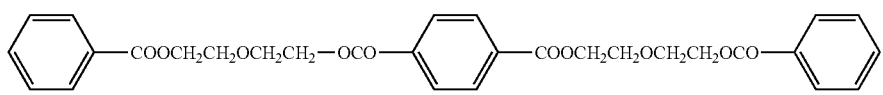
(5)

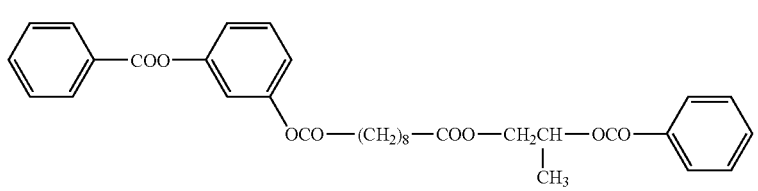
(6)

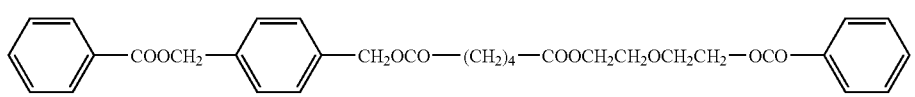
(7)

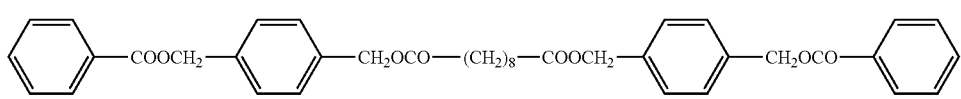
(8)

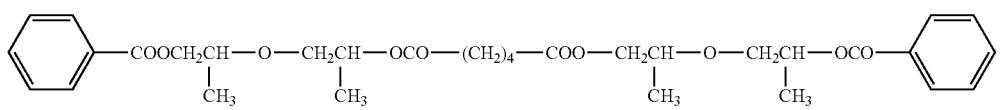
(9)

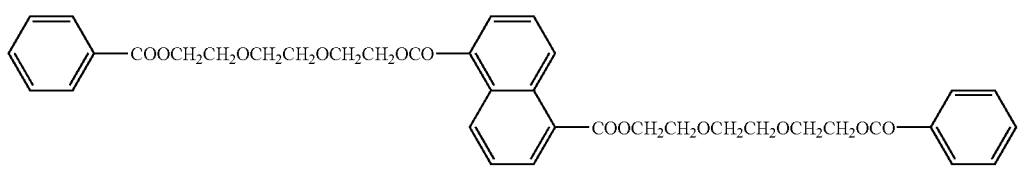
(10)

Polyvalence carboxylic acid type plasticizers useful for the present invention is ester composed of polyvalence carboxylic acid of divalence or more valence, preferably divalence to 20 valence and alcohol. Moreover, aliphatic polyvalence carboxylic acid is desirably 2-20 valence, and aromatic polyvalence carboxylic acid and alicyclic polyvalence carboxylic acid is desirably 3-20 valence.

The polyvalence carboxylic acid used for the present invention is expressed with the following general formula (Y).

$$R_5(COOH)_m(OH)_n \qquad \text{General formula (Y)}$$

(Here, R5 represents an organic group of (m+n) valence, m is a positive integer of two or more, and n is an integer of zero or more, COOH group represents a carboxyl group and OH group represents alcoholic or phenol hydroxyl group)

Although the following, for example, can be mentioned as an example of desirable polyvalence carboxylic acid, the present invention is not limited to these.

Aromatic polyvalence carboxylic acid of 3 or more valence or or its derivative such as trimellitic acid, trimesic acid, and pyromellitic acid, aliphatic polyvalence carboxylic acid such as succinic acid, adipic acid, azelaic acid, sebacic acid, oxalic acid, fumaric acid, maleic acid and tetra-hydronalium phthalic acid, and oxi-polyvalence carboxylic acid such as tartaric acid, tartronic acid, malic acid, and citric acid etc. can be used preferably. Especially, it is desirable to use oxi-polyvalence carboxylic acid from the aspect of the enhancement for retention properties.

There is no restriction in particular for alcohol used for the polyvalence carboxylic acid ester compound of the present invention, and well-known alcohol and phenol can be used. For example, aliphatic saturated alcohol or aliphatic unsaturated alcohol with normal chain or side chain having carbon atom number of 1 to 32 can be used preferably. The number of carbon atoms is more preferably from 1 to 20 and still more preferably from 1 to 10. Moreover, alicyclic alcohol and its derivative such as cyclopentanol and cyclohexanol, and aromatic alcohol and its derivative such as benzyl alcohol and cinnamyl alcohol can be used preferably.

When using oxi-polyvalence carboxylic acid as polyvalence carboxylic acid, the alcoholic or phenol hydroxyl group of the oxi-polyvalence carboxylic acid may be esterified by using monocarboxylic acid. Although the following can be mentioned as an example of desirable monocarboxylic acid, the present invention is not limited to these.

For aliphatic monocarboxylic acids, normal or branched fatty acids having from 1 to 32 carbon atoms are preferably used. The number of carbon atoms is more preferably from 1 to 20 and still more preferably from 1 to 10.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and derivatives thereof. Specifically, acetic acid, propionic acid and benzoic acid are preferred.

The molecular weight of the monocarboxylic acid ester is not limited, however, the molecular weight is preferably from 300 to 1000 and more preferably from 350 to 750. A higher molecular weight is preferable in respect of the improvement in retention properties, while a lower molecular weight is preferable with respect to moisture permeability, or to mutual solubility with cellulose ester.

The number of kinds of alcohol used for the polyvalence carboxylic acid ester used for the present invention may be one kind, and a mixture of two or more kinds.

The acid number of a polyvalence carboxylic acid ester compound used for the present invention is desirably 1 mgKOH/g or less, and more desirably 0.2 mgKOH/g or less. Since the environmental variation of retardation can be suppressed, it is desirable to make the acid number into the above-mentioned range.

Although the examples of an especially desirable polyvalence carboxylic acid ester compound are shown below, the present invention is not limited to these. For example, triethyl citrate, tributyl citrate, acetyl triethyl citrate (ATEC), acetyl tributyl citrate (ATBC), benzoyl tributyl citrate, acetyl triphenyl citrate, acetyl tri benzyl citrate, dibutyl tartrate, tartaric acid diacetyl dibutyl, trimellitic acid tributyl, pyromellitic acid tetra-butyl, etc. may be listed.

These plasticizers may be used independently or in a mixture of two kinds or more.

The used amount of a plasticizer of 1% by mass to a cellulose derivative is not preferable, because it provides few effects of reducing the water vapour permiability of a film, and when the used amount exceeds 20% by mass, the plasticizer bleeds out from the film and the property of the film deteriorates. Accordingly, the used amount of 1 to 20% by mass is preferable. The used amount of 6 to 16% by mass is more preferable, and the used amount of 8 to 13% by mass is still more preferable.

(Ultraviolet (UV) Absorber)

It is desirable that a ultraviolet-ray absorbing ability is given to various optical films, such as a polarizing plate protective film, a retardation film, and an optical compensation film, from a viewpoint of deterioration prevention of a liquid crystal. Such ultraviolet-ray absorbing ability may be obtained by making a cellulose derivative to include a material which absorbs ultraviolet rays, or by providing a layer with ultraviolet-ray absorbing ability on a film which consists of a cellulose derivative.

The definition of the UV absorber contained in the hydrophilicity polymer film used in the present invention is one having an action to decrease the transmissivity in a wavelength of 370 nm by 50% or more as a result of adding. These may decrease transmissivity 50% or more with plural UV absorbers, and, as for at least one UV absorber, it is desirable that transmissivity is reduced 10% or more as compared with transmissivity in the non-added case.

Depending on the added amount even when an absorption coefficient is small, it may be regarded as a UV absorber.

As an example of the UV absorber used preferably, although for example a triazine type compound, an oxi-benzophenone type compound, a benzotriazole type compound, a salicylate type compound, a benzophenone type compound, a cyanoacrylate type compound, a nickel complex salt type compound, etc. are may be listed, it is not limited to these. Moreover, a macromolecule UV absorber described in a official gazette of TOKKAIHEI No. 6-148430 may be also preferably used.

As an example of a UV absorber useful in the present invention, 2-(2'-hydroxy-5'-methylphenyl)benzotriazole, 2-(2'-hydroxy-3' and 5'-di-tert-butylphenyl)benzotriazole, 2-(2'-hydroxy-3'-tert-butyl-5'-methylphenyl)benzotriazole, 2-(2'-hydroxy-3' and 5'-di-tert-butylphenyl)-5-chloro benzotriazole, 2-(2'-hydroxy-3'-(3",4",5"6"-tetra-hydronalium phthalimide methyl)-5'-methylphenyl)benzotriazole, 2 and 2-methylene bis(4-(1,1,3, and 3-tetra-methyl butyl)-6-(2H-benzotriazole-2-yl)phenol), 2-(2'-hydroxy-3'-tert-butyl-5'-methylphenyl)-5-chloro benzotriazole, 2-(2H-benzotriazole-2-yl)-6-(normal chain and side chain dodecyl)-4-methyl phenol <<Tinuvin(TINUVIN) 171>>, 2-octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl] mixture of propionate <<Tinuvin (TINUVIN) 109>>, 2-(2H-benzotriazole-2yl)-4, 6-bis(1-methyl-1-phenyl ethyl)phenol <<Tinuvin 234>>, 2-(3-t-butyl-5-methyl-2hydroxyphenyl)-5-chloro-benzotriazole <<Tinuvin 326>> etc. may be listed, however, it is not limited to these. Moreover, each Tinuvins of above-mentioned Tinuvins 109, Tinuvins 171, and Tinuvin 326 is a product of Chiba Specialty Chemicals Co., and can be used preferably.

As an example of a benzophenone type compound, although 2,4-dihydroxy benzophenone, 2, and 2'-dihydroxy-4-methoxybenzophenone, 2-hydroxy-4-methoxy-5-sulfo benzophenone, bis(2-methoxy-4-hydroxy-5-benzoyl phenyl methane), etc. may be listed, it is not limited to these.

Moreover, since the UV absorber which can be used for a polarizing plate protective film in the present invention is excellent also in the coating characteristics of various coating layers, it is desirable to contain UV absorbers with the distribution coefficient of 9.2 or more described in Japanese Patent O.P.I. Publication No. 2000-187825, and especially it is desirable to use UV absorbers with the distribution coefficient of 10.1 or more.

Moreover, a macromolecule UV absorber (or ultraviolet-ray absorptivity polymer) described in TOKKAIHEI No. 6-148430 and Japanese Patent O.P.I. Publication No. 2002-47357 can be used preferably. A macromolecule UV absorber described in general formula (1) or general formula (2) of Japanese Patent O.P.I. Publication No. 6-148430, or general formulas (3), (6), and (7) in Japanese Patent O.P.I. Publication No. 2002-47357, can be used especially preferably.

Moreover, a compound having 1, 3, and 5-triazine ring can be preferably used as a UV absorber for a polarizing plate protective film of the present invention. This compound can be used also as a retardation regulator.

As to the added amount of these compounds in the polarizing plate protective film, it is preferable to contain the ultraviolet absorber and the particles described later in proportions expressed by the following Equations (1) through (3):

$$0 \leq Wu/Wf \leq 0.1 \quad \text{Equation (1)}$$

$$0 \leq Wm/Wf \leq 0.05 \quad \text{Equation (2)}$$

$$Wu/Wf \leq -3 \times Wm/Wf + 0.22 \quad \text{Equation (3)}$$

where wf indicates the percentage of the plasticizer contained in the film, Wu denotes the percentage of the ultraviolet absorber contained in the film, and Wm shows the percentage of the particles contained in the film.

Although it is desirable to add the ultraviolet absorber and the particles in the point of the film property, since there is a interaction of them for the fluctuation of the tint in a slanting direction, it is necessary to adjust the both amounts of the ultraviolet absorber and the particles. Further, from the view of physical properties of a film, it is necessary to adjust added amounts. When Wm/Wf is less than 0.05, it is more preferable, because there is a trend that the fluctuation of the tint in a slanting direction due to an environment change may suppressed. When Wu/Wf is less than 0.1, not only that the fluctuation of the tint in a slanting direction due to an environment change becomes smaller, but also that there is no problem of the tint change to yellow viewing from the front and the bleed-out hardly occurs, therefore it is preferable. Further, since the ultraviolet absorber and the particles have a interaction for a fluctuation of a front view contrast due to an environment change and further for a fluctuation of the tint in a slanting direction due to an environment change, to satisfy Equation (3) in addition to the above relations of Wm/Wf and Wu/Wf is especially preferable in order to refrain the fluctuation of the tint in a slanting direction.

(Antioxidant)

An antioxidant is also called antidegradant. When a liquid crystal image display device etc. is placed in the state of high humidity high temperature, deterioration of a polarizing plate protective film may occur. Since, for example, an antioxidant has a function which delays or prevents a polarizing plate protective film from decompositioning by halogen in residual solvents in the polarizing plate protective film, or by phosphoric acid of a phosphoric acid type plasticizer, etc., it is desirable to make it contain in the above-mentioned polarizing plate protective film.

As such an antioxidant, a hindered-phenol type compound is used preferably. For example, 2,6-di-t-butyl-p-cresol, a penta ERIS retail-tetrakis[3-(3,5-di-t-butyl-4hydroxyphenyl) propionate], triethylene glycol-bis[3-(3-t-butyl-5-methyl-4hydroxyphenyl)propionate], 1,6-dihydroxyhexane-bis[3-(3,5-di-t-butyl-4hydroxyphenyl)propionate], 2 and 4-bis-(n-octylthio)-6-(4-hydroxy-3,5-di-t-butyl anilino)-1,3, and 5-triazine, 2 and 2-chio-diethylenebis[3-(3,5-di-t-butyl-4hydroxyphenyl)propionate], Octadecyl-3-(3,5-di-t-butyl-4hydroxyphenyl)propionate, N and N'-hexamethylene bis(3,5-di-t-butyl-4-hydroxy-hydrocinnamide), 1, 3, and 5-trimethyl-2,4,6-tris(3,5-di-t-butyl-4-hydroxy benzyl)benzene, tris-(3,5-di-t-butyl-4-hydroxy benzyl)-isocyanurate, etc. may be listed. In particular, 2,6-di-t-butyl-p-cresol, a penta erisretil-tetrakis[3-(3,5-di-t-butyl-4hydroxyphenyl) propionate], and a triethylene glycol-bis[3-(3-t-butyl-5-methyl-4hydroxyphenyl)propionate] are desirable. Moreover, for example, phosphorus type processing stabilizers, such as metal deactivator of hydrazine types, such as an N and N'-bis [3-(3,5-di-t-butyl-4hydroxyphenyl)propionyl] hydrazine, and tris(2,4-di-t-butylphenyl)phosphight may be used together.

As an added amount of these compound, an added amount of 1 ppm to 1.0% at a mass rate to a cellulose derivative is desirable, and 10-1000 ppm are still more desirable.

(Matting Agent)

In the cellulose derivative in the present invention, in order to give sliding property, a matting agent such as fine particles can be added. As the fine particles, fine particles of an inorganic compound or fine particles of an organic compound may be listed up.

As an added amount of fine particles, an amount of 0.01-1.0 g per an area of 1 $m^2$ of a polarizing plate protective film are desirable, 0.03-0.5 g are more desirable, and 0.08-0.3 g are still more desirable. With this, it is desirable to form a convex of 0.1-1-micrometer on a surface of a polarizing plate protective film, and sliding property is given to the film.

As fine particles added in a polarizing plate protective film, a silicon dioxide, titanium dioxide, aluminium oxide, zirconium oxide, calcium carbonate, calcium carbonate, talc, clay, a baked caolin, a baked calcium silicate, hydration silicic acid calcium, aluminium silicate, magnesium silicate, and calcium phosphate can be mentioned as an example of an inorganic compound. Since turbidity becomes low and the haze of a film can be made small, particles containing silicon is desirable, and especially a silicon dioxide is desirable.

Fine particles like a silicon dioxide is subjected to a surface treatment with an organic substance in many cases. It is desirable that those fine particles can make the haze of a film small. As a desirable organic substance in the surface treatment, halo silane, alkoxy silane, silazane, siloxane, etc. can be mentioned.

Silicon dioxide fine particles can be obtained, for example, by burning a mixture of vaporized silicon tetrachloride and hydrogen in air at 1000-1200° C.

Fine particles of a silicon dioxide having a primary average grain diameter of 20 nm or less and an apparent specific gravity of 70 or more g/L are desirable. Particles having a primary average grain diameter of 5-16 nm are more desirable. Particles having a primary average grain diameter of 5-12 nm are still more desirable.

These fine particles provide sliding property by forming a secondary aggregate in a film and forming unevenness in a film surface. A smaller average diameter of primary particles is desirable, because a haze is low. An apparent specific gravity of 90-200 g/L or more is more desirable, and 100-200 g/L or more is more desirable. A lager apparent specific gravity is desirable, because it becomes possible to make high-concentration fine particle dispersion liquid, and an occurrence of a haze and a big coagulum is few. Suppose that a liter is expressed with L in the present invention.

As fine particles of a desirable silicon dioxide, fine particles marketed by product names of aerosil R972, R972V, R974 and R812, 200, 200V and 300, R202, OX50, and TT600 (manufactured by Japanese Aerosil Co.) can be mentioned, for example. Aerosil 200V, R972, R972V, and R974, R202 and R812 can be used preferably. As fine particleses of zirconium oxide, fine particles marketed by product names of aerosils R976 and R811 (manufactured by Japanese Aerosil Co.) can be used, for example.

Among the above fine particleses, aerosil 200V, aerosil R972V, and aerosil TT600 are especially desirable, because the effect that they make the turbidity of a polarizing plate protective film of the present invention lower and make a friction factor lower is larger.

As an example of fine particles of an organic compound, a silicone resin, a fluorine plastic, and acryl resin can be mentioned. Among them, a silicone resin is desirable, and especially fine particles having a three dimensional network structure are desirable, for example, toss pearl 103, toss pearl 105, toss pearl 108, toss pearl 120, toss pearl 145, toss pearl 3120 and toss pearl 240 (manufactured by Toshiba Silicone Co.) can be mentioned.

In measurement of a primary average grain diameter of fine particles, particles are observed with a transmission electron microscope (magnification of 500,000 to 2000,000) so as to obtain grain diameters of 100 particles, and a primary average grain diameter is obtained by calculating the average value of the grain diameters.

Moreover, the apparent specific gravity of the above-mentioned description can be calculated by the following formula in which a weight is measured by taking a fixed quantity of silicon dioxide fine particles in a measuring cylinder.

Apparent specific gravity (g/L)=the mass (g) of silicon dioxide/the volume (L) of silicon dioxide The inorganic fine particles added here can give sliding property to a film surface.

<Retardation Controlling Agent> (Rod-Shaped Compound)

The polarizing plate protective film according to the invention preferably contains as the retardation controlling agent a rod-shaped compound which has the maximum absorption wavelength ($\lambda_{max}$) in UV absorption spectrum at a wavelength of not longer than 250 nm.

The rod-shaped compound preferably has one or more, and preferably two or more, aromatic rings from the viewpoint of the retardation controlling function. The rod-shaped compound preferably has a linear molecular structure. The linear molecular structure means that the molecular structure of the rod-shaped compound is linear in the thermodynamically most stable structure state. The thermodynamically most stable structure can be determined by crystal structure analyzing or molecular orbital calculation. The molecular structure, by which the heat of formation is made minimum, can be determined on the calculation by, for example, a software for molecular orbital calculation WinMOPAC2000, manufactured by Fujitsu Co., Ltd. The linear molecular structure means that the angle of the molecular structure is not less than 140° in the thermodynamically most stable structure calculated as the above. The rod-shaped compound is preferably one displaying a liquid crystal property. The rod-shaped compound more preferably displays a crystal liquid property by heating (thermotropic liquid crystal property). The phase of the liquid crystal is preferably a nematic phase or a smectic phase.

As the rod-shaped compound, trans-1,4-cyclohexane-dicarboxylic acid esters represented by the following Formula 10 are preferable.

 Formula (2)

In Formula (2), $Ar^1$ and $R^2$ are each independently an aromatic group. The aromatic group includes an aryl group (an aromatic hydrocarbon group), a substituted aryl group, an aromatic heterocyclic group and a substituted heterocyclic group. The aryl group and the substituted alkyl group are more preferable than the aromatic heterocyclic group and the substituted aromatic heterocyclic group. The heterocycle of the aromatic heterocyclic group is usually unsaturated. The aromatic heterocyclic group is preferably a 5-, 6- or 7-member ring, and more preferably a 5- or 6-member ring. The heterocyclic ring usually has the largest number of double bond. The hetero atom is preferably a nitrogen atom, an oxygen atom or a sulfur atom and the nitrogen atom or the oxygen atom is more preferable. Examples of the aromatic heterocyclic ring include a furan ring, a thiophene ring, a pyrrole ring, an oxazole ring, in isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. As the aromatic ring of the aromatic group, a benzene ring, a furan ring, a thiophene ring, a pyrrole ring, an oxazole ring, a thiazole ring, a thiazole ring, an imidazole ring, a triazole ring, a pyridine ring, a pyrimidine ring and pyrazine ring are preferable and the benzene ring is particularly preferable.

Examples of the substituent of the substituted aryl group and the substituted aromatic heterocyclic group include a halogen atom such as a fluorine chlorine atom, a chlorine atom, a bromine atom and an iodine atom, a hydroxyl group, a carboxyl group, a cyano group, an amino group, an alkylamino group such as a methylamino group, an ethylamino group, a utylamno group and a dimethylamino group, a nitro group, a sulfo group, a carbamoyl group, an alkylcarbamoyl group such as an N-methylcarbaamoyl group and an N,N-dimethylcarbamoyl group, a sulfamoyl group, an alkylsulfamoyl group such as an N-methylsulfamoyl group, an N-ethylsulfamoyl group and an N,N-dimethylsulfamoyl group, a ureido group, an alkylureido group such as an N-methylureido group, an N,N-dimethylureido group and N,N,N-trimethylureido group, an alkyl group such as a methyl group, an ethyl group, a propyl group, a butyl group, a pentyl group, a heptyl group, an octyl group, an isopropyl group, an s-butyl group, a t-amyl group, a cyclohexyl group and a cyclopentyl group, an alkenyl group such as a vinyl group, an allyl group and a hexenyl group, an alkynyl group such as an ethynyl group and a butynyl group, an acyl group such as a formyl group, an acetyl group, a butylyl group, a hexanoyl group and a lauryl group, an acyloxy group such as an acetoxy group, a butylyloxy group, a hexanoyloxy group and lauryloxy group, an alkoxy group such as a methoxy group, an ethoxy group, a propoxy group, a butoxy group, a pentyloxy group, a heptyloxy group and an octyloxy group, an aryloxy group such as a phenoxy group, an alkoxycarbonyl group such as a methoxycarbonyl group, an ethoxycarbonyl group, a propoxycarbonyl group, a butoxycarbonyl group, a pentyloxycarbonyl group and a heptyloxycarbonyl group, an aryloxycarbonyl group such as a phenoxycarbonyl group, a an alkoxycarbonylamino group such as a butoxycarbonylamino group and a hexyloxycarbonylamino group, an alkylthio group such as a methylthio group, an ethylthio group, a propylthio group, butylthio group, a pentylthio group, a heptylthio group and an octylthio group, an arylthio group such as a thiophenyl group, an alkylsulfonyl group such as a methylsulfonyl group, an ethylsulfonyl group, a propylsulfonyl group, a butylsulfonyl group, a pentylsulfonyl group, a heptylsulfonyl group and an octylsulfonyl group, an amido group such as an acetoamido group, a butylamido group, a hexylamido group and an octylamido group, and a non-aromatic heterocyclic group such as a morpholyl group and a pyradinyl group.

As the substituent of the substituted aryl group and the substituted aromatic heterocyclic group, a halogen atom, a cyano group, a carboxyl group, a hydroxyl group, an amino group, an alkyl-substituted amino group, an acyl group, an acyloxy group, an amido group, an alkoxycarbonyl group, an alkoxy group, an alkylthio group and an alkyl group are preferable. The alkyl moiety of the alkylamino group, the alkoxycarbonyl group, the alkoxy group and the alkylthio group, and the alkyl group each may further have a substituent. Examples of the substituent of the alkyl moiety or the alkyl group include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, a ureido group, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amido group and a non-aromatic heterocyclic group. The halogen atom, the hydroxyl group, an amino group, an alkylamino group, an acyl group, an acyloxy group, an acylamino group, an alkoxycarbonyl group and an alkoxy group are preferable as the substituent of the alkyl moiety or the alkyl group.

In Formula (2), $L^1$ is a di-valent bonding group selected from the group consisting of an alkylene group, an alkenylene group, an alkynylene group, a di-valent saturated heterocyclic group, an —O— atom, a —CO— group and a combination of them. The alkylene group may have a cyclic structure. As the cyclic alkylene group, a cyclohexylene group is preferable, and 1,4-cyclohexylene group is more preferable. As the chain-shaped alkylene group, a straight-chain alkylene group is more preferable than a branched-chain alkylene group. The number of carbon atoms of the alkylene group is preferably from 1 to 20, more preferably from 1 to 15, further preferably from 1 to 10, further more preferably from 1 to 8, and most preferably from 1 to 6.

The alkenylene group and the alkynylene group each having a cyclic structure are more preferable than those having a chain structure, and a straight-chain structure is more preferably to a branched-chain structure. The number of carbon atom of the alkenylene group and the alkynylene group is preferably 2 to 10, more preferably from 2 to 8, further preferably from 2 to 6, and further more preferably 2 to 4, and most preferably 2, namely a vinylene or an ethynylene group. The di-valent saturated heterocyclic group is preferably from a 3- to 9-member heterocyclic ring. The hetero atom of the heterocyclic ring is preferably an oxygen atom, a nitrogen atom, a boron atom, a sulfur atom, a silicon atom, a phosphor atom or a germanium atom. Examples of the saturated heterocyclic ring include a piperidine ring, a piperazine ring, a morpholine ring, a pyrrolidine ring, an imidazolidine ring, a tetrahydrofuran ring, a tetrahydropyrane ring, a 1-3-dioxane ring, a 1,4-dioxane ring, a terahydrothiophene ring, a 1,3-thiazolidine ring, a 1,3-oxazolidine ring, a 1,3-dioxoran ring, a 1,3-dithiosilane ring and a 1,3,2-dioxoboran ring. Particularly preferable di-valent saturated heterocyclic group is a piperazine-1,4-diylene group, a 1,3-dioxane-2,5-diylene group and a 1,3,2-dioxobororane-2,5-diylene group.

Examples of divalent bonding group composed of a combination of groups are listed as follows.

L-1: —O—CO-alkylene-CO—O—
L-2: —CO—O-alkylene-O—CO—
L-3: —O—CO-alkenylene-CO—O—
L-4: —CO—O-alkenylene-O—CO—
L-5: —O—CO-alkynylene-CO—O—
L-6: —CO—O-alkynylene-O—CO—
L-7: —O—CO-divalent saturated heterocyclic group-CO—O—
L-8: —CO—O— divalent saturated heterocyclic group —O—CO—

In the structure of Formula (2), the angle formed by $Ar^1$ and $Ar^2$ through $L^1$ is preferably not less than 140°. Compounds represented by Formula (3) are further preferable as the rod-shaped compound.

$$Ar^1\text{-}L^2\text{-}X\text{-}L^3\text{-}Ar^2 \qquad \text{Formula (3)}$$

In Formula (3), $Ar^1$ and $Ar^2$ are independently an aromatic group. The definition and examples of the aromatic group are the same of $Ar^1$ and $Ar^2$ in Formula (2).

In Formula (3), $L^2$ and $L^3$ are independently a di-valent bonding group selected from the group consisting of an alkylene group, an —O— atom, a —CO— group and a combination of them. The alkylene group having a chain structured is preferably to that having a cyclic structure, and a straight-chain structure is more preferably to a branched-chain structure. The number of carbon atoms in the alkylene group is preferably from 1 to 10, more preferably from 1 to 8, further preferably from 1 to 6, further more preferably 1 to 4, and most preferably 1 or 2, namely a methylene group or an ethylene group. $L^2$ and $L^3$ are particularly preferably an —O—CO— group or a-CO—O— group.

In Formula (3), X is 1,4-cyclohexylene group, a vinylene group or a ethynylene group. Concrete examples of the compound represented by Formula 11 are listed below.

(1)
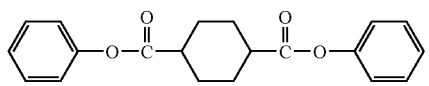

(2)
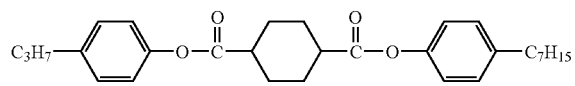

(3)
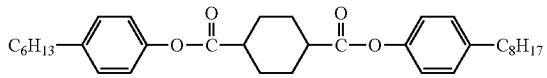

(4)
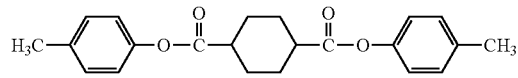

(5)
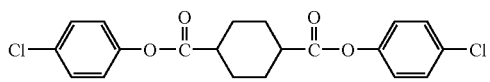

(6)
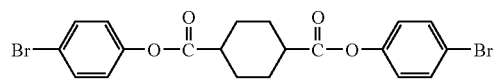

(7)
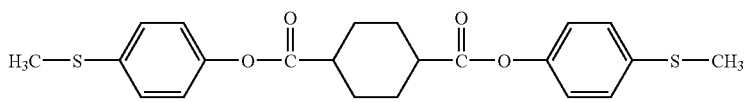

-continued
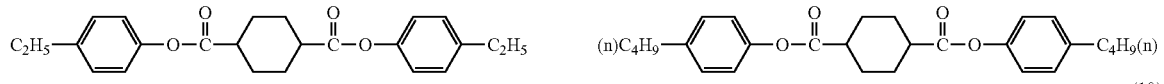
(8) (9)
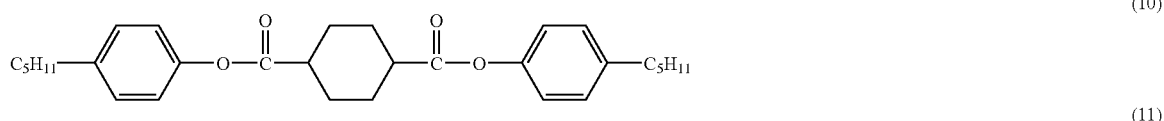
(10)
(11)
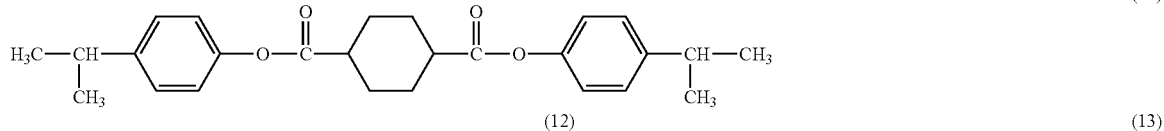
(12) (13)
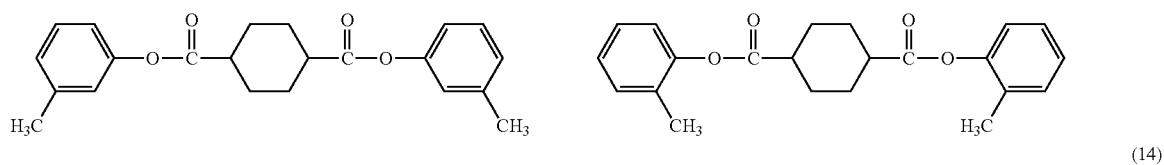
(14)
(15)
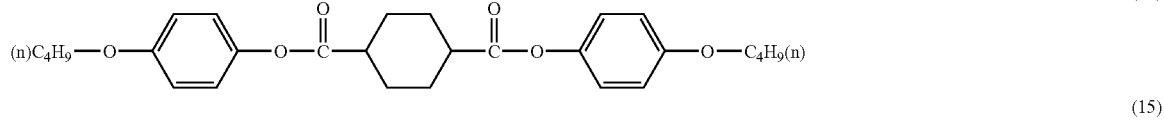
(16)
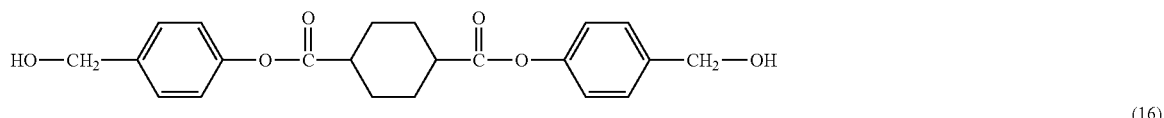
(17)
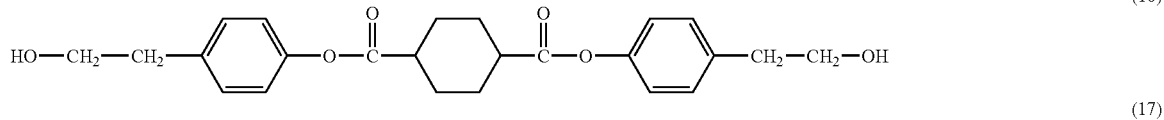
(18)
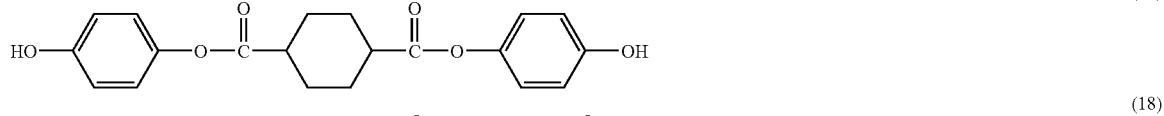
(19)
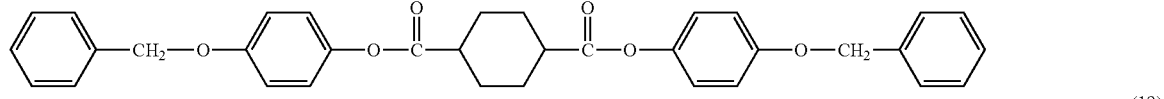
(20)
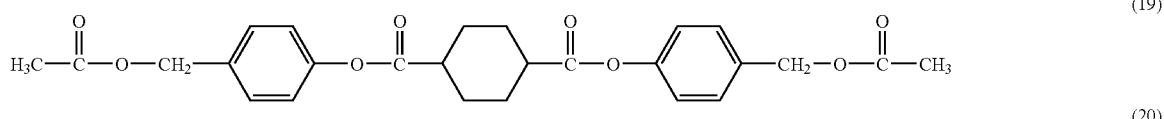
(21)
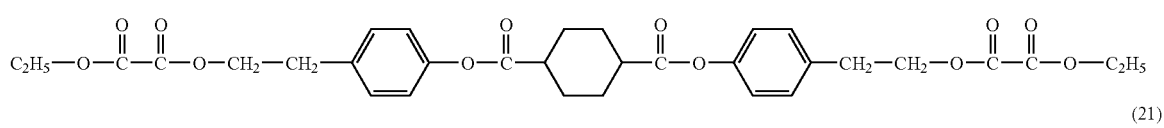
(22)
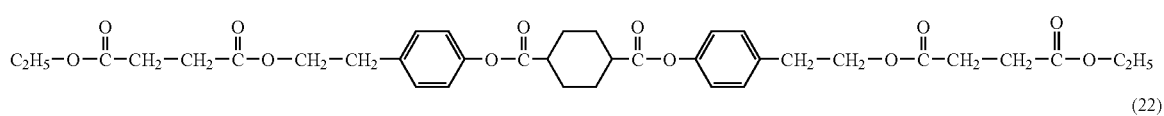
(23)
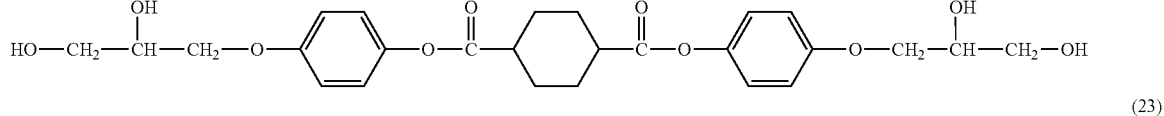
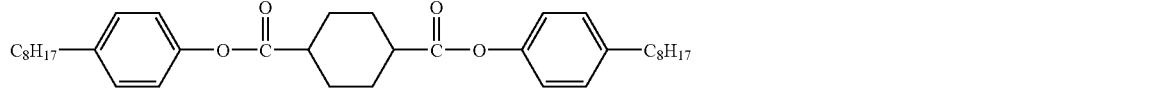

(24)
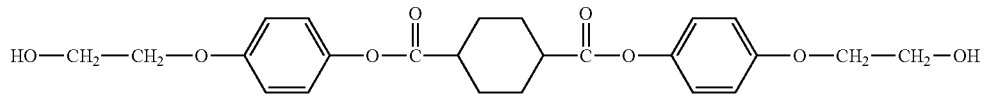
(25)
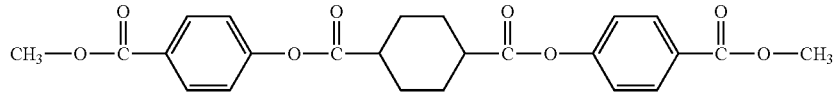
(26)
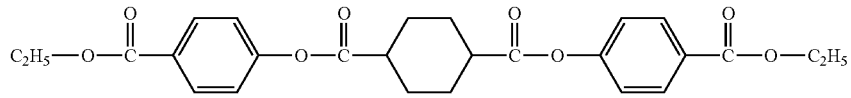
(27)
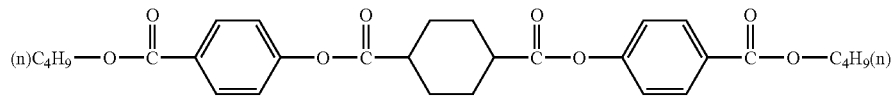
(28)
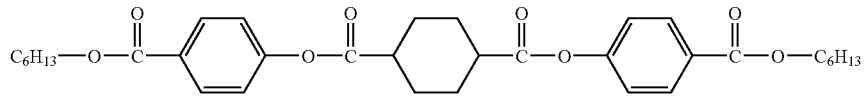
(29)
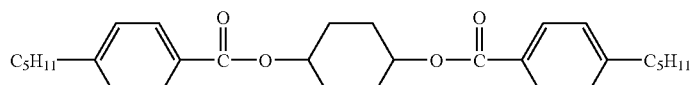
(30) (31)
(32)
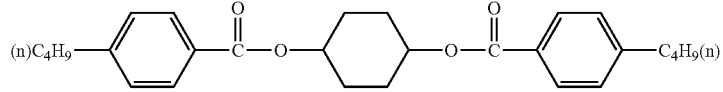
(33)
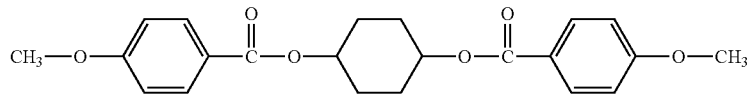
(34)
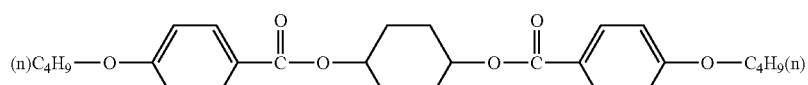
(35) (36)
(37)
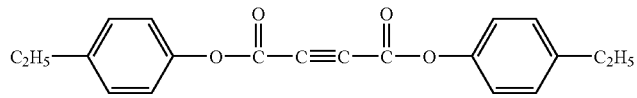
(38)
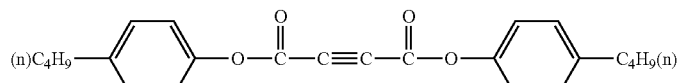
(39)
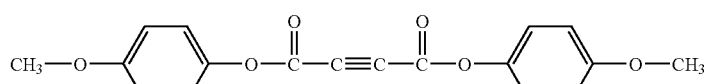

-continued

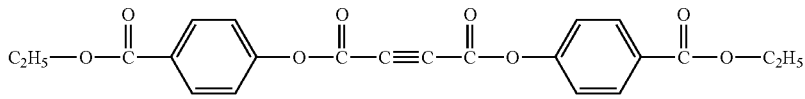 (40)

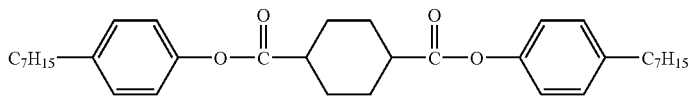 (41)

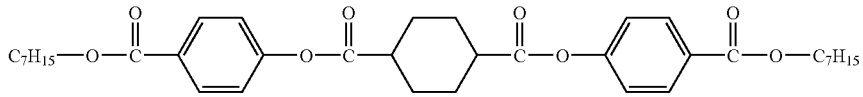 (42)

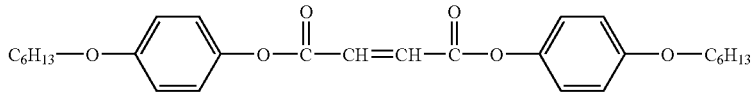 (43)

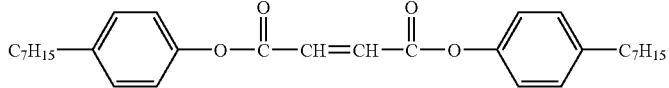 (44)

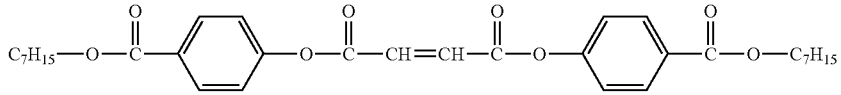 (45)

 (46)

 (47)

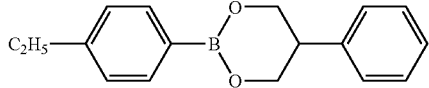 (48)

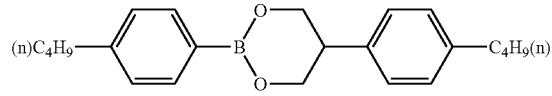 (49)

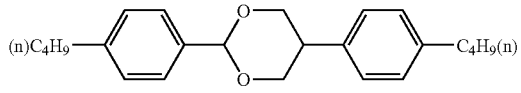 (50)

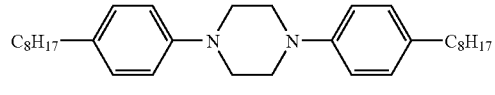 (51)

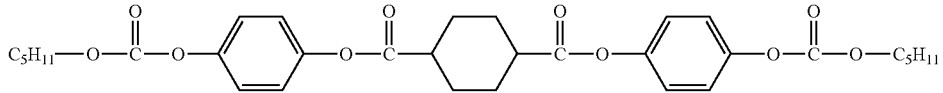 (52)

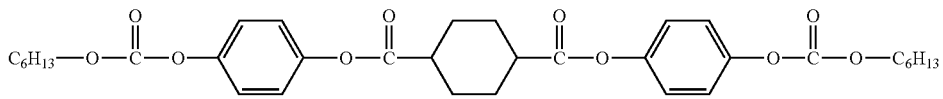 (53)

Exemplified compounds 1 to 34, 41, 42, 46, 47, 52 and 53 each has two asymmetric carbon atoms at 1- and 4-positions of the cyclohexane ring. However, Exemplified compounds 1, 4 to 34, 41, 42, 46, 47, 52 and 53 have no optical isomerism (optical activity) since they have symmetrical meso form molecular structure, and there are only geometric isomers thereof. Exemplified compound 1 in trans-form (1-trans) and that in cis-form (1-cis) are shown below.

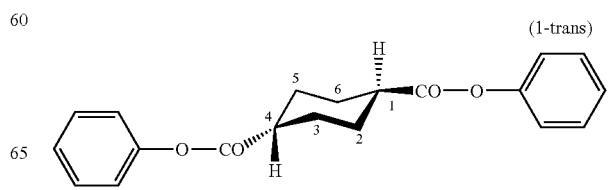 (1-trans)

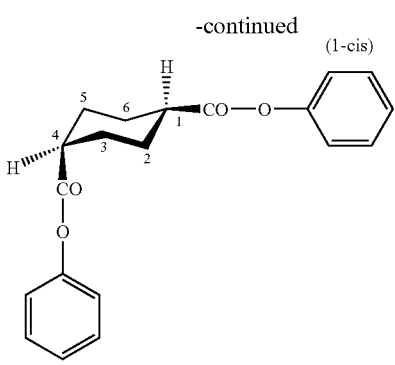

(1-cis)

As above-mentioned, the rod-shaped compound preferably has a linear molecular structure. Therefore, the trans form is preferably to the cis-form. Exemplified compounds 2 and 3 have optical isomers additionally to the geometric isomers (four isomers in total). Regarding the geometric isomers, the trans-form is more preferable than the cis-form. There is no difference between the optical isomers and d-, l- and racemic-body are all employable. In Exemplified compounds 43 to 45, cis-form and trans-form are formed at the vinylene bond. The trans-form is preferable than the cis-form by the above-described reason.

Two kinds of the rod-shaped compounds each having the maximum absorption at a wavelength shorter than 250 nm may be employed in combination. "Mol. Cryst. Liq. Cryst." vol. 53, p. 229, 1979, ibid. vol. 89, p. 93, 1982, ibid. vol. 145, p. 111, 1987, and ibid. vol. 170, p. 43, 1989, "J. Am. Chem. Soc." Vol. 113, p. 1349, 1991, ibid. vol. 118, p. 5346, 1996, and ibid. vol. 92, p. 1582, 1970, "J. Org. Chem." Vol. 40, p. 420, 1975, and "Tetrahedron" vol. 48, No. 16, p. 3437, 1992 can be cited as relating documents.

As a disc-shaped compound relating to the invention, a compound having a 1,3,5-triazine ring can be preferably employed.

Among compounds having the 1,3,5-triazine ring, compounds represented by the following Formula 12 are preferable.

Formula (4)

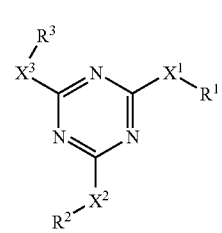

In Formula (4), $X^1$ is a single bond, an $-NR_4-$ group, an $-O-$ atom or an $-S-$ atom; $X^2$ is a single bond, an $-NR_5-$ group, an $-O-$ atom or an $-S-$ atom; $X^3$ is a single bond, an $-NR_6-$ group, an $-O-$ atom or an $-S-$ atom; $R^1$, $R^2$ and $R^3$ are each an alkyl group, an alkenyl group, an aryl group or a heterocyclic group; and $R_4$, $R_5$ and $R_6$ are each a hydrogen atom, an alkyl group, an alkenyl group, an aryl group or a heterocyclic group. The compound represented by Formula 12 is particularly preferably a melamine compound.

In the melamine compound of Formula 12, it is preferable that the $X^1$, $X^2$ and $X^3$ are each the $-NR_4-$, $-NR_5-$ and $-HR_6-$, respectively, or the $X^1$, $X^2$ and $X^3$ are each a single bond and the $R^1$, $R^2$ and $R^3$ are each a heterocyclic group having a free valency at the nitrogen atom thereof. The $-X^1-R^1$, $-X^2-R^2$ and $-X^3-R^3$ are preferably the same substituting group. The $R^1$, $R^2$ and $R^3$ are particularly preferably an aryl group. The $R_4$, $R_5$ and $R_6$ are each particularly preferably a hydrogen atom.

The alkyl group is more preferably a chain alkyl group than a cyclic alkyl group. A straight-chain alkyl group is more preferably to a branched-chain alkyl group.

The number of carbon atom of the alkyl group is preferably from 1 to 30, more preferably from 1 to 20, further preferably from 1 to 10, further more preferably from 1 to 8, and most preferably from 1 to 6. The alkyl group may have a substituent.

Concrete examples of the substituent include a halogen atom, an alkoxy group such as a methoxy group, an ethoxy group and an epoxyethyloxy group, and a acyloxy group such as an acryloyl group and a methacryloyl group. The alkenyl group is more preferably a chain alkenyl group than a cyclic alkenyl group. A straight-chain alkenyl group is preferably to a branched-chain alkenyl group. The number of carbon atom of the alkenyl group is preferably from 2 to 30, more preferably from 2 to 20, further preferably from 2 to 10, further more preferably from 2 to 8, and most preferably from 2 to 6. The alkyl group may have a substituent.

Concrete examples of the substituent include a halogen atom, an alkoxy group such as a methoxy group, an ethoxy group and an epoxyethyloxy group, and a acyloxy group such as an acryloyl group and a methacryloyl group.

The aryl group is preferably a phenyl group or a naphthyl group, and the phenyl group is particularly preferable. The aryl group may have a substituent.

Concrete examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group. The above alkyl group is the same as the foregoing alkyl group.

The alkyl moiety of the alkoxyl group, acyloxy group, alkoxycarbonyl group, alkyl-substituted sulfamoyl group, sulfonamido group, alkyl-substituted carbamoyl group, amido group, alkylthio group and acyl group is the same as the foregoing alkyl group.

The above alkenyl group is the same as the forgoing alkenyl group.

The alkenyl moiety of the alkenyloxy group, acyloxy group, alkenyloxycarbonyl group, alkenyl-substituted sulfamoyl group, sulfonamido group, alkenyl-substituted carbamoyl group, amido group, alkenylthio group and acyl group is the same as the foregoing alkenyl group.

Concrete examples of the aryl group include a phenyl group, an α-naphthyl group, a β-naphthyl group, a 4-methoxyphenyl group, a 3,4-diethoxyphenyl group, a 4-octyloxyphenyl group and a 4-dodecyloxyphenyl group.

The aryl moiety of the aryloxy group, acyloxy group, aryloxycarbonyl group, aryl-substituted sulfamoyl group, sulfonamido group, arylsubstituted carbamoyl group, amido group, arylthio group and acyl group is the same as the foregoing aryl group.

The heterocyclic group is preferably has aromaticity, when the $X^1$, $X^2$ and $X^3$ are an —NR— group, an —O— atom or an —S— group.

The heterocycle in the heterocyclic group having aromaticity is usually a unsaturated heterocycle, preferably a heterocycle having highest number of double bond. The heterocycle is preferably a 5-, 6- or 7-member ring, more preferably the 5- or 6-member ring and most preferably the 6-member ring.

The hetero atom in the heterocycle is preferably a nitrogen atom, a sulfur atom or an oxygen atom, and the nitrogen atom is particularly preferable.

As the heterocycle having aromaticity, a pyridine ring such as a 2-pyridyl group and a 4-pyridyl group is particularly preferable. The heterocyclic group may have a substituent. Examples of the substituent are the same as the substituent of the foregoing aryl moiety.

When $X^1$, $X^2$ and $X^3$ are each the single bond, the heterocyclic group preferably has a free valency at the nitrogen atom. The heterocyclic group having the free valency at the nitrogen atom is preferably 5-, 6- or 7-member ring, more preferably the 5- or 6-member ring, and most preferably the 5-member ring. The heterocyclic group may have plural nitrogen atoms.

The heterocyclic group may have a hetero-atom other than the nitrogen atom such as an oxygen atom and a sulfur atom. The heterocyclic group may have a substituent. Concrete examples of the heterocyclic group are the same as those of the aryl moiety.

Examples of the heterocyclic group having the free valency at the nitrogen atom are listed below.

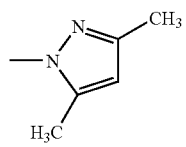
(Hc-1)

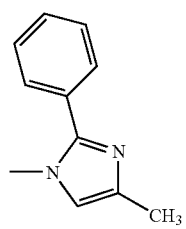
(Hc-2)

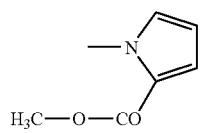
(Hc-3)

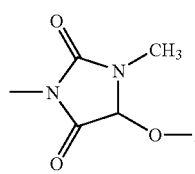
(Hc-4)

-continued

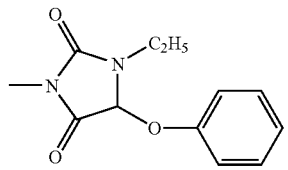
(Hc-5)

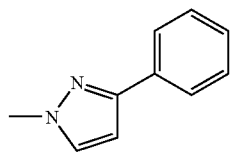
(Hc-6)

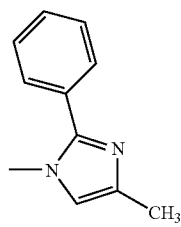
(Hc-7)

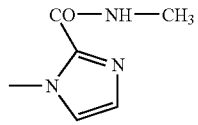
(Hc-8)

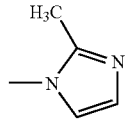
(Hc-9)

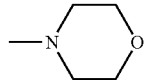
(Hc-10)

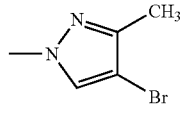
(Hc-11)

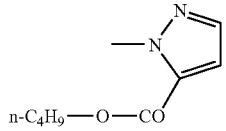
(Hc-12)

The molecular weight of the compound having a 1.3.5-triazine ring is preferably from 300 to 2,000. The boiling point of these compounds is preferably not less than 260° C. The boiling point can be measured by a measuring apparatus available on the market such as TG/DTA100, manufactured by Seiko Denshi Kogyo Co., Ltd.

Concrete examples of the compound having the 1,3,5-triazine ring are shown below.

In the followings, plural Rs each represent the same group.

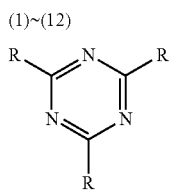

(1)~(12)

(1) Butyl
(2) 2-mthoxy-2-ethoxyethyl
(3) Undecenyl
(4) Phenyl
(5) 4-ethoxycarbonylphenyl
(6) 4-butozyphenyl
(7) p-biphenylyl
(8) 4-pyridyl
(9) 2-naphthyl
(10) 2-methylphenyl
(11) 3,4-dimethoxyphenyl
(12) 2-furyl

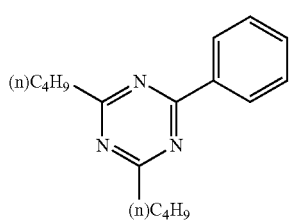

(13)

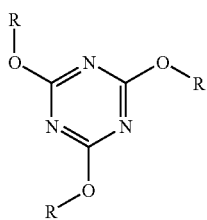

(14)~(79)

(14) phenyl
(15) 3-ethoxycarbonylphenyl
(16) 3-butoxyphenyl
(17) m-biphenyryl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenol
(24) 3-methoxyphenyl
(25) 3-anilinophenyl
(26) 3-isobutyrylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenyryl
(36) 4-phenylthiophenyl
(37) 4-chlorophenyl
(38) 4-benzoylphenyl
(39) 4-actoxyphenyl
(40) 4-benzoyloxyphenyl
(41) 4-phenoxycarbonylphenyl
(42) 4-methoxyphenyl
(43) 4-anilinophenyl
(44) 4-isobutyrylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diactoxyphenyl
(58) 3,4-dibenzoyloxyphenyl
(59) 3,4-diphenoxycarbonylphenyl
(60) 3,4-dimethoxyphenyl
(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylpenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl

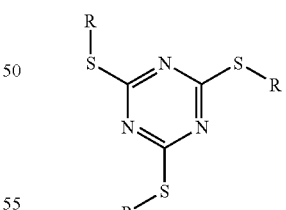

(80)~(145)

(80) phenyl
(81) 3-ethoxycarbonylphenyl
(82) 3-butoxyphenyl
(83) m-biphenyryl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenol

(90) 3-methoxyphenyl
(91) 3-anilinophenyl
(92) 3-isobutyrylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3-hydroxyphenyl
(99) 4-ethoxycarbonylphenyl
(100) 4-butoxyphenyl
(101) p-biphenyryl
(102) 4-phenylthiophenyl
(103) 4-chlorophenyl
(104) 4-benzoylphenyl
(105) 4-actoxyphenyl
(106) 4-benzoyloxyphenyl
(107) 4-phenoxycarbonylphenyl
(108) 4-methoxyphenyl
(109) 4-anilinophenyl
(110) 4-isobutyrylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diactoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylpenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl (146)~(164)

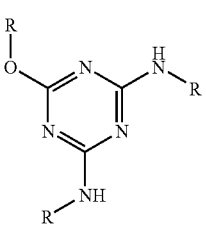

(146) phenyl
(147) 4-ethoxycarbonylphenyl
(148) 4-butoxyphenyl
(149) p-biphenyryl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenol
(156) 4-methoxyphenyl
(157) 4-anilinophenyl
(158) 4-isobutyrylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl (165)~(183)

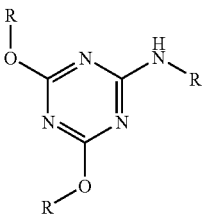

(165) phenyl
(166) 4-ethoxycarbonylphenyl
(167) 4-butoxyphenyl
(168) p-biphenyryl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenol
(175) 4-methoxyphenyl
(176) 4-anilinophenyl
(177) 4-isobutyrylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl (184)~(202)

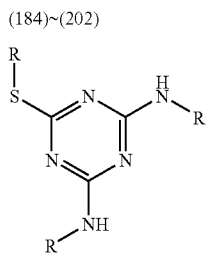

(184) phenyl
(185) 4-ethoxycarbonylphenyl
(186) 4-butoxyphenyl
(187) p-biphenyryl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenol
(194) 4-methoxyphenyl
(195) 4-anilinophenyl
(196) 4-isobutyrylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl (203)~(221)

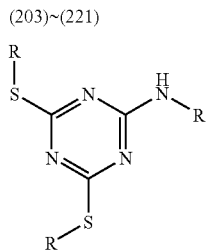

(203) phenyl
(204) 4-ethoxycarbonylphenyl
(205) 4-butoxyphenyl
(206) p-biphenyryl
(207) 4-phenylthiophenyl
(208) 4-chlorophenyl
(209) 4-benzoylphenyl
(210) 4-acetoxyphenyl
(211) 4-benzoyloxyphenyl
(212) 4-phenoxycarbonylphenol
(213) 4-methoxyphenyl
(214) 4-anilinophenyl
(215) 4-isobutyrylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl (222)~(419)

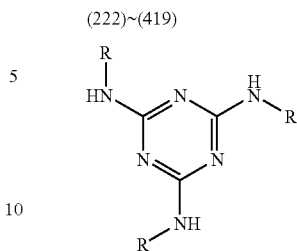

(222) phenyl
(223) 4-butylphenyl
(224) 4-2-methoxy-2-ethoxyethyl)phenyl
(225) 4-(s-nenenyl)phenyl
(226) p-biphenyryl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-aceoxyphenyl
(234) 4-benzoyloxyphenyl
(235) 4-phenoxycarbonylphenyl
(236) 4-methoxyphenyl
(237) 4-anilinophenyl
(238) 4-isobutyrylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl
(246) 3-(5-nonenyl)phenyl
(247) m-biphenyryl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-actoxyphenyl
(255) 3-benzoyloxyphenyl
(256) 3-phenoxycarbonylphenyl
(257) 3-methoxyphenyl
(258) 3-anilinophenyl
(259) 3-isobutyrylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3-hydroxyphenyl
(265) 2-butylphenyl
(266) 2-(2-methoxy-2-ethoxyethyl)phenyl
(267) 2-(5-nonenyl)phenyl
(268) o-biphenyryl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-aceoxyphenyl (276) 2-benzoyloxyphenyl
(277) 4-phenoxycarbonylphenyl
(278) 2-methoxyphenyl
(279) 2-anilinophenyl
(280) 2-isobutyrylaminophenyl
(281) 2-phenoxycarbonyl aminophenyl
(282) 2-(3-ethylureido)phenyl
(283) 2-(3,3-dimethylureido)phenyl
(284) 2-phenoxyphenyl
(285) 2-hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutyrylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutyrylaminophenyl
(340) 2,3-diphendxyphenyl
(341) 2,3-dihydroxyphenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl
(352) 2,6-di-N-methylaminophenyl
(353) 2,6-diisobutyrylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutyrylaminophenyl
(368) 3,4,5-triphenoxyphenyl
(369) 3,4,5-trihydoxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutyrylaminophenyl (382) 2,4,6-triphenoxyphenyl
(383) 2,4,6-trihydoxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsufamoyl-2-naphtyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenylsulfamoyl-2-naphthyl
(395) 1-(4-methylphenyl)-2-naphthyl
(396) 6,8-di-N-methylsufamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl

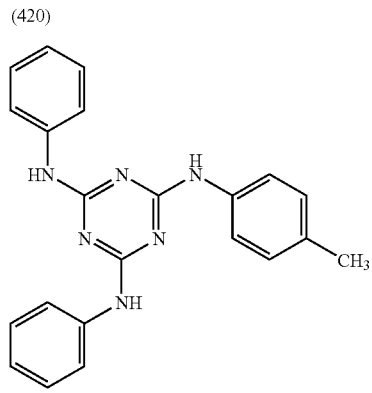

(420)

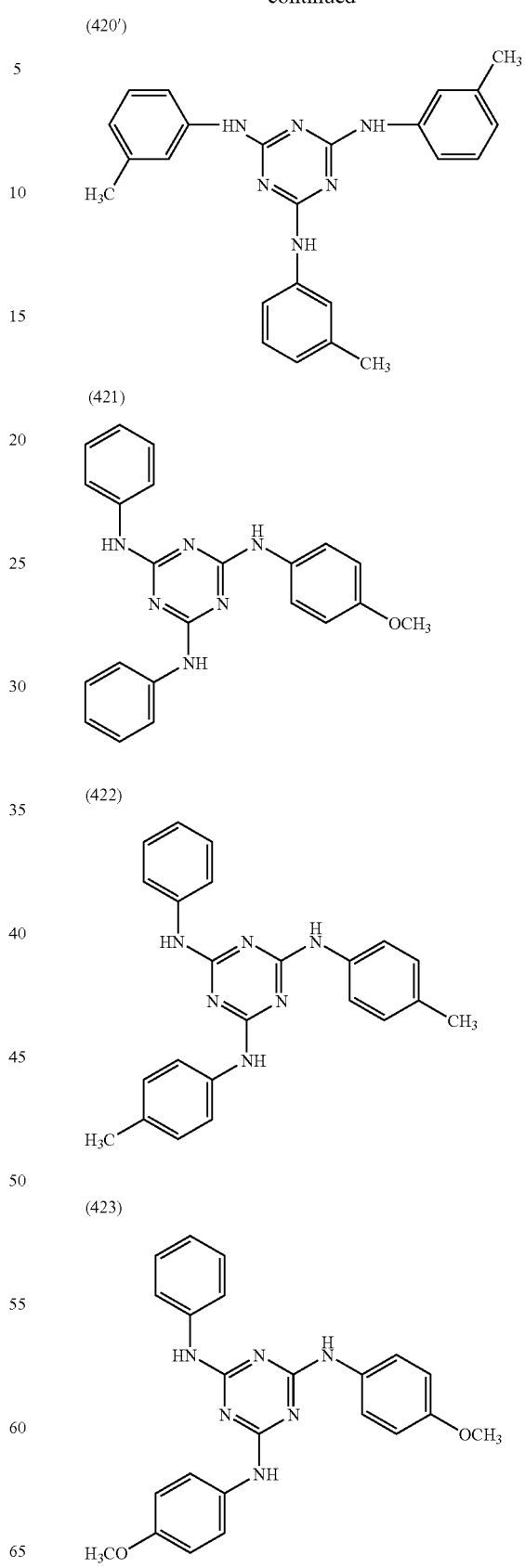

-continued (424)~(426)
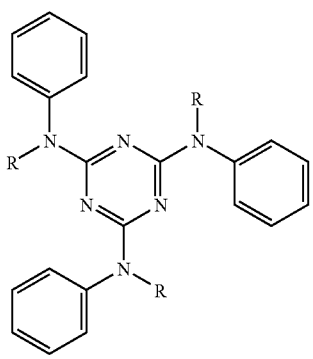
(424) methyl
(425) phenyl
(426) butyl
(427)
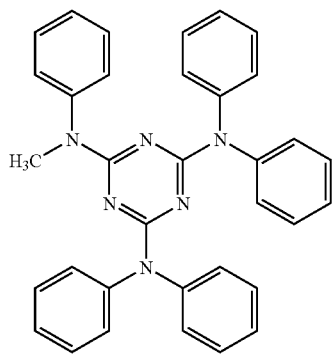
(428)
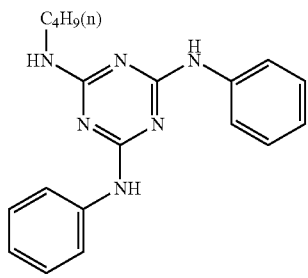
(429)
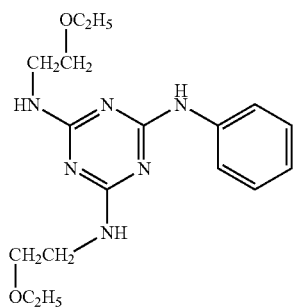
(430)~(437)
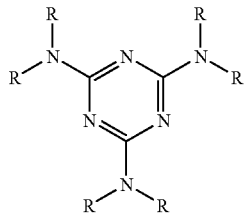
(430) methyl
(431) ethyl
(432) butyl
(433) octyl
(434) dodecyl
(435) 2-butoxy-2-ethoxyethyl
(436) benzyl
(437) 4-methoxybenzyl
(438)
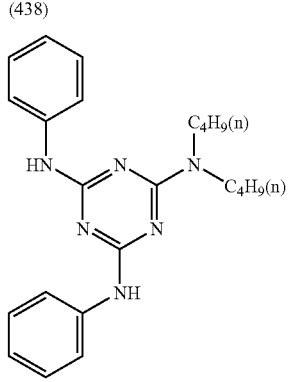
(439)
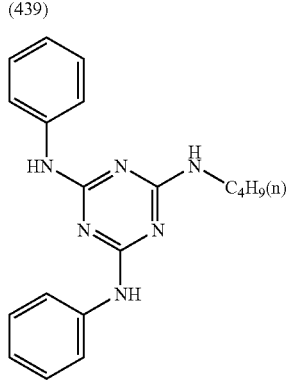

-continued (440)

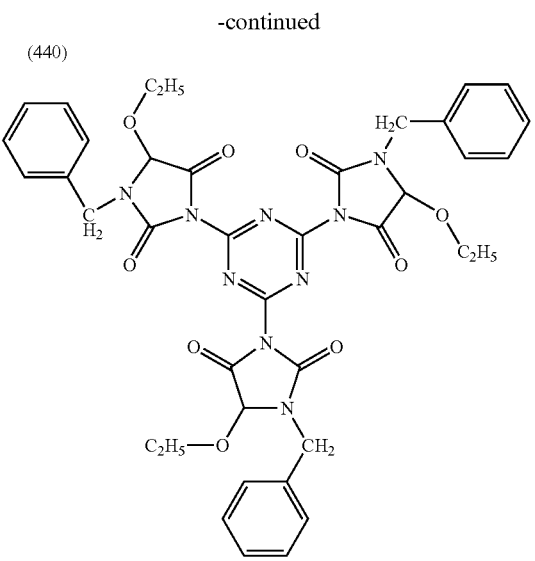

(441)

(442)

(443)

-continued (444)

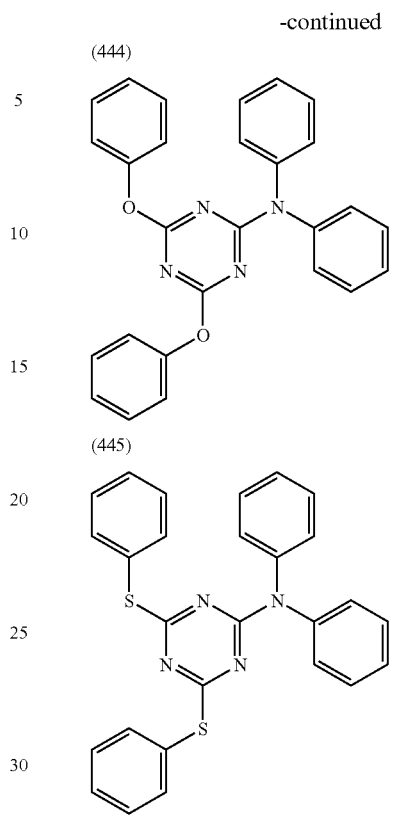

(445)

In the present invention, employed as a compound having a 1,3,5-triazine ring may be melamine polymers. It is preferable that the above melamine polymers are synthesized employing a polymerization reaction of the melamine compounds represented by Formula (13) below with carbonyl compounds.

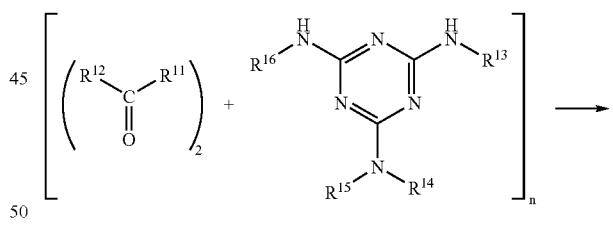

Formula (13)

In the above synthesis reaction scheme, $R^{11}$, $R^{12}$, $R^{13}$, $R^{14}$, $R^{15}$, and $R^{16}$ each represent a hydrogen atom, an alkyl group, an alkenyl group, an aryl group or a heterocyclyl group.

The above alkyl group, alkenyl group, aryl group, and heterocyclyl group, as well as those substituents are as defined for each group and also the substituents described in above Formula (4).

The polymerization reaction of melamine compounds with carbonyl compounds is performed employing the same synthesis method as for common melamine resins (for example, a melamine-formaldehyde resin). Further, employed may be commercially available melamine polymers (being melamine resins).

The molecular weight of melamine polymers is preferably 2,000-400,000. Specific examples of repeating units of melamine polymers are shown below.

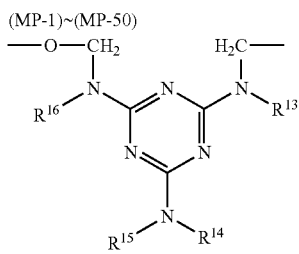

(MP-1)~(MP-50)

MP-1: $R^{13}, R^{14}, R^{15}, R^{16}$: $CH_2OH$
MP-2: $R^{13}, R^{14}, R^{15}, R^{16}$: $CH_2OCH_3$
MP-3: $R^{13}, R^{14}, R^{15}, R^{16}$: $CH_2O\text{-}i\text{-}C_4H_9$
MP-4: $R^{13}, R^{14}, R^{15}, R^{16}$: $CH_2O\text{-}n\text{-}C_4H_9$
MP-5: $R^{13}, R^{14}, R^{15}, R^{16}$: $CH_2NHCOCH=CH_2$
MP-6: $R^{13}, R^{14}, R^{15}, R^{16}$: $CH_2NHCO(CH_2)_7CH=CH(CH_2)_7CH_3$
MP-7: $R^{13}, R^{14}, R^{15}$: $CH_2OH$; $R^{16}$: $CH_2OCH_3$
MP-8: $R^{13}, R^{14}, R^{16}$: $CH_2OH$; $R^{5}$: $CH_2OCH_3$
MP-9: $R^{13}, R^{14}$: $CH_2OH$; $R^{15}, R^{16}$: $CH_2OCH_3$
MP-10: $R^{13}, R^{16}$: $CH_2OH$; $R^{14}, R^{15}$: $CH_2OCH_3$
MP-11: $R^{13}$: $CH_2OH$; $R^{14}R^{15}, R^{16}$: $CH_2OCH_3$
MP-12: $R^{13}, R^{14}, R^{16}$: $CH_2OCH_3$; $R^{15}$: $CH_2OH$
MP-13: $R^3, R^{16}$: $CH_2OCH_3$; $R^{14}, R^{15}$: $CH_2OH$
MP-14: $R^{13}, R^{14}, R^{15}$: $CH_2OH$; $R^{6}$: $CH_2O\text{-}i\text{-}C_4H_9$
MP-15: $R^{13}, R^{14}, R^{16}$: $CH_2OCH_3$; $R^{15}$: $CH_2O\text{-}i\text{-}C_4H_9$
MP-16: $R^{13}, R^{14}$: $CH_2OH$; $R^{15}, R^{16}$: $CH_2O\text{-}i\text{-}C_4H_9$
MP-17: $R^{13}, R^{16}$: $CH_2OH$; $R^{14}, R^{15}$: $CH_2O\text{-}i\text{-}C_4H_9$
MP-18: $R^{13}$: $CH_2OH$; $R^{14}, R^{15}, R^{16}$: $CH_2O\text{-}i\text{-}C_4H_9$
MP-19: $R^{13}, R^{14}, R^{16}$: $CH_2O\text{-}i\text{-}C_4H_3$; $R^{15}$: $CH_2OH$
MP-20: $R^{13}, R^{16}$: $CH_2O\text{-}i\text{-}C_4H_9$; $R^{14}, R^{15}$: $CH_2OH$
MP-21: $R^{13}, R^{14}, R^{15}$: $CH_2OH$; $R^{16}$: $CH_2O\text{-}n\text{-}C_4H_9$
MP-22: $R^{13}, R^{14}, R^{16}$: $CH_2OH$; $R^{15}$: $CH_2O\text{-}n\text{-}C_4H_9$
MP-23: $R^{13}, R^{14}$: $CH_2OH$; $R^{15}, R^{16}$: $CH_2O\text{-}n\text{-}C_4H_9$
MP-24: $R^{13}, R^{16}$: $CH_2OH$; $R^{14}, R^{15}$: $CH_2O\text{-}n\text{-}C_4H_9$
MP-25: $R^{13}$: $CH_2OH$; $R^{14}, R^{15}, R^{16}$: $CH_2O\text{-}n\text{-}C_4H_9$
MP-26: $R^{13}, R^{14}, R^{16}$: $CH_2O\text{-}n\text{-}C_4H_9$; $R^{15}$: $CH_2OH$
MP-27: $R^{13}, R^{16}$: $CH_2O\text{-}n\text{-}C_4H_9$; $R^{14}, R^{15}$: $CH_2OH$
MP-28: $R^{13}, R^{14}$: $CH_2OH$; $R^{15}$: $CH_2OCH_3$; $R^{16}$: $CH_2O\text{-}n\text{-}C_4H_9$
MP-29: $R^{13}, R^{14}$: $CH_2OH$; $R^{15}$: $CH_2O\text{-}n\text{-}C_4H_9$; $R^{16}$: $CH_2OCH_3$
MP-30: $R^{13}, R^{16}$: $CH_2OH$; $R^{14}$: $CH_2OCH_3$; $R^{15}$: $CH_2O\text{-}n\text{-}C_4H_9$
MP-31: $R^{13}$: $CH_2OH$; $R^{14}, R^{15}$: $CH_2OCH_3$; $R^{16}$: $CH_2O\text{-}n\text{-}C_4H_9$
MP-32: $R^{13}$: $CH_2OH$; $R^{14}$: $CH_2OCH_{34}$; $R^{15}$: $CH_2O\text{-}n\text{-}C_4H_9$
MP-33: $R^{13}$: $CH_2OH$; $R^{14}$: $CH_2OCH_3$; $R^{15}, R^{16}$: $CH_2O\text{-}n\text{-}C_4H_9$
MP-34: $R^{13}$: $CH_2OH$; $R^{14}, R^{15}$: $CH_2O\text{-}n\text{-}C_4H_3$; $R^{16}$: $CH_2OCH_3$
MP-35: $R^{13}, R^{14}$: $CH_2OCH_3$; $R^{15}$: $CH_2OH$; $R^{16}$: $CH_2O\text{-}n\text{-}C_4H_9$
MP-36: $R^{13}, R^{16}$: $CH_2OCH_3$; $R^{14}$: $CH_2OH$; $R^{15}$: $CH_2O\text{-}n\text{-}C_4H_9$
MP-37: $R^{13}, R^{15}$: $CH_2OCH_3$; $R^{14}$: $CH_2OH$; $R^{16}$: $CH_2O\text{-}n\text{-}C_4H_9$
MP-38: $R^{13}, R^{16}$: $CH_2O\text{-}n\text{-}C_4H_9$; $R^{14}$: $CH_2OCH_3$; $R^{15}$: $CH_2OH$
MP-39: $R^{13}$: $CH_2OH$; $R^{14}$: $CH_2CH_3$; $R^{15}$: $CH_2O\text{-}n\text{-}C_4H_9$; $R^{16}$: $CH_2NHCOCH=CH_2$
MP-40: $R^{13}$: $CH_2OH$; $R^{14}$: $CH_2OCH_3$; $R^{15}$: $CH_2NHCOCH=CH_2$; $R^{16}$: $CH_2O\text{-}n\text{-}C_4H_9$
MP-41: $R^{13}$: $CH_2OH$; $R^{14}$: $CH_2O\text{-}n\text{-}C_4H_9$; $R^{15}$: $CH_2NHCOCH=CH_2$; $R^{16}$: $CH_2OCH_3$
MP-42: $R^{13}$: $CH_2OCH_3$; $R^{14}$: $CH_2OH$; $R^{15}$: $CH_2O\text{-}n\text{-}C_4H_9$; $R^{16}$: $CH_2NHCOCH=CH_2$
MP-43: $R^{13}$: $CH_2OCH_3$; $R^{14}$: $CH_2OH$; $R^{15}$: $CH_2NHCOCH=CH_2$; $R^{16}$: $CH_2O\text{-}n\text{-}C_4H_9$
MP-44: $R^{13}$: $CH_2O\text{-}n\text{-}C_4H_9$; $R^{14}$: $CH_2OCH_3$; $R^{15}$: $CH_2OH$; $R^{16}$: $CH_2NHCOCH=CH_2$
MP-45: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-46: $R^{13}$: $CH_2OH$; $R^{14}$: $CH_2OCH_3$; $R^{16}$: $CH_2NHCO=CH_2$; $R^{16}$: $CH_2NHCO(CH_2)_7CH=CH(CH_2)_7CH_3$
MP-47: $R^{13}$: $CH_2OH$; $R^{84}$: $CH_2NHCO(CH_2)_7CH=CH(CH_2)_7CH_3$; $R^{15}$: $CH_2NHCOCH=CH_2$; $R^{16}$: $CH_2OCH_3$
MP-48: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-49: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-50: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$ (MP-51)~(MP-100)

MP-51: $R^{13}, R^{14}, R^{15}, R^{16}$: $CH_2OH$
MP-52: $R^{13}, R^{14}, R^{15}, R^{16}$: $CH_2OCH_3$
MP-53: $R^{13}, R^{14}, R^{15}, R^{16}$: $CH_2O\text{-}i\text{-}C_4H_9$
MP-54: $R^{13}, R^{14}, R^{15}, R^{16}$: $CH_2O\text{-}n\text{-}C_4H_9$
MP-55: $R^{13}, R^{14}, R^{15}, R^{16}$: $CH_2NHCOCH=CH_2$
MP-56: $R^{13}, R^{14}, R^{15}, R^{16}$: $CH_2NHCO(CH_2)_7CH=CH(CH_2)_7CH_3$
MP-57: $R^{13}, R^{14}, R^{15}$: $CH_2OH$; $R^{16}$: $CH_2OCH_3$
MP-58: $R^{13}, R^{14}, R^{15}, R^{16}$: $CH_2OH$; $R^{15}$: $CH_2OCH_3$
MP-59: $R^{13}, R^{14}$: $CH_2OH$; $R^{15}, R^{16}$: $CH_2OCH_3$
MP-60: $R^{13}, R^{14}$: $CH_2OH$; $R^{14}, R^{15}$: $CH_2OCH_3$
MP-61: $R^{13}$: $CH_2OH$; $R^{14}R^{15}, R^{16}$: $CH_2OCH_3$
MP-62: $R^{13}, R^{14}, R^{16}$: $CH_2OCH_3$; $R^{15}$: $CH_2OH$
MP-63: $R^{13}, R^{16}$: $CH_2OCH_3$; $R^{14}, R^{15}$: $CH_2OH$
MP-64: $R^{13}, R^{14}, R^{15}$: $CH_2OH$; $R^{16}$: $CH_2O\text{-}i\text{-}C_4H_9$
MP-65: $R^{13}, R^{14}, R^{16}$: $CH_2OCH_3$; $R^{15}$: $CH_2O\text{-}i\text{-}C_4\text{-}H_9$ MP-66: $R^{13}$, $R^{14}$: $CH_2OH$; $R^{15}$, $R^{16}$: $CH_2O\text{-}i\text{-}C_4H_9$
MP-67: $R^{13}$, $R^{16}$: $CH_2OH$; $R^{14}$, $R^{15}$: $CH_2O\text{-}i\text{-}C_4H_9$
MP-68: $R^{13}$: $CH_2OH$; $R^{14}$, $R^{15}$, $R^{16}$: $CH_2O\text{-}i\text{-}C_4H_9$
MP-69: $R^{13}$, $R^{14}$, $R^{16}$: $CH_2O\text{-}i\text{-}C_4H_9$; $R^{15}$: $CH_2OH$
MP-70: $R^{13}$, $R^{16}$: $CH_2O\text{-}i\text{-}C_4H_9$; $R^{14}$, $R^{15}$: $CH_2OH$
MP-71: $R^{13}$, $R^{14}$, $R^5$: $CH_2OH$; $R^{16}$: $CH_2O\text{-}n\text{-}C_4H_9$
MP-72: $R^{13}$, $R^{14}$, $R^{16}$: $CH_2OH$; $R^{15}$: $CH_2O\text{-}n\text{-}C_4H_9$
MP-73: $R^{13}$, $R^{14}$: $CH_2OH$; $R^{15}$, $R^{16}$: $CH_2O\text{-}n\text{-}C_4H_9$
MP-74: $R^{13}$, $R^{16}$: $CH_2OH$; $R_{14}$, $R^{15}$: $CH_2O\text{-}n\text{-}C_4H_9$
MP-75: $R^{13}$: $CH_2OH$; $R^{14}$, $R^{15}$, $R^{16}$: $CH_2O\text{-}n\text{-}C_4H_9$
MP-76: $R^{13}$, $R^{14}$, $R^{16}$: $CH_2O\text{-}n\text{-}C_4H_9$; $R^{15}$: $CH_2OH$
MP-77: $R^{13}$, $R^{16}$: $CH_2O\text{-}n\text{-}C_4H_9$; $R^{14}$, $R^{15}$: $CH_2OH$
MP-78: $R^{13}$, $R^{14}$: $CH_2OH$; $R^{15}$: $CH_2OCH_3$; $R^{16}$: $CH_2O\text{-}n\text{-}C_4H_9$
MP-79: $R^{13}$, $R^{14}$: $CH_2OH$; $R^{15}$: $CH_2O\text{-}n\text{-}C_4H_9$; $R^{16}$: $CH_2OCH_3$
MP-80: $R^{13}$, $R^{16}$: $CH_2OH$; $R^{14}$: $CH_2OCH_3$; $R^{15}$: $CH_2O\text{-}n\text{-}C_4H_9$
MP-81: $R^{13}$: $CH_2OH$; $R^{14}$: $CH_2OCH_3$; $R^{16}$: $CH_2O\text{-}n\text{-}C_4H_9$
MP-82: $R^{13}$: $CH_2OH$; $R^{14}$: $CH_2OCH_3$; $R^{15}$: $CH_2O\text{-}n\text{-}C_4H_9$
MP-83: $R^{13}$: $CH_2OH$; $R^{14}$: $CH_2OCH_3$; $R^{15}$, $R^{16}$: $CH_2O\text{-}n\text{-}C_4H_9$
MP-84: $R^{13}$: $CH_2OH$; $R^{14}$, $R^{15}$: $CH_2O\text{-}n\text{-}C_4H_9$; $R^{16}$: $CH_2OCH_3$
MP-85: $R^{13}$, $R^{14}$: $CH_2OCH_3$; $R^{15}$: $CH_2OH$; $R^{16}$: $CH_2O\text{-}n\text{-}C_4H_9$
MP-86: $R^{13}$, $R^{16}$: $CH_2OCH_3$; $R^{14}$: $CH_2OH$; $R^{15}$: $CH_2O\text{-}n\text{-}C_4H_9$
MP-87: $R^{13}$: $CH_2OCH_3$; $R^{14}$: $CH_2OH$; $R^{15}$: $CH_2O\text{-}n\text{-}C_4H_9$; $R^{16}$: $CH_2O\text{-}n\text{-}C_4H_9$
MP-88: $R^{13}$, $R^{16}$: $CH_2O\text{-}n\text{-}C_4H_9$; $R^{14}$: $CH_2OCH_3$; $R^{15}$: $CH_2OH$
MP-89: $R^{13}$: $CH_2OH$; $R^{14}$: $CH_2OCH_3$; $R^{15}$: $CH_2O\text{-}n\text{-}C_4H_9$; $R^{16}$: $CH_2NHCOCH{=}CH_2$
MP-90: $R^{13}$: $CH_2OH$; $R^{14}$: $CH_2OCH_3$; $R^{15}$: $CH_2NHCOCH{=}CH_2$; $R^{16}$: $CH_2O\text{-}n\text{-}C_4H_9$
MP-91: $R^{13}$: $CH_2OH$; $R^{14}$: $CH_2O\text{-}n\text{-}C_4H_9$; $R^{15}$: $CH_2NHCOCH{=}CH_2$; $R^{16}$: $CH_2OCH_3$
MP-92: $R^{13}$: $CH_2OCH_3$; $R^{14}$: $CH_2OH$; $R^{15}$: $CH_2O\text{-}n\text{-}C_4H_9$; $R^{16}$: $CH_2NHCOCH{=}CH_2$
MP-93: $R^{13}$: $CH_2OCH_3$; $R^{14}$: $CH_2OH$; $R^{15}$: $CH_2NHCOCH{=}CH_2$; $R^{16}$: $CH_2O\text{-}n\text{-}C_4H_9$
MP-94: $R^{13}$: $CH_2O\text{-}n\text{-}C_4H_9$; $R^{14}$: $CH_2OCH_3$; $R^{15}$: $CH_2OH$; $R^{16}$: $CH_2NHCOCH{=}CH_2$
MP-95: $R^{13}$: $CH_2OH$; $R^{14}$: $CH_2OCH_3$; $R^{15}$: $CH_2NHCO(CH_2)_7CH{=}CH(CH_2)_7CH_3$; $R^{16}$: $CH_2NHCOCH{=}CH_2$
MP-96: $R^{13}$: $CH_2OH$; $R^{14}$: $CH_2OCH_3$; $R^{15}$: $CH_2NHCO{=}CH_2$; $R_{16}$: $CH_2NHCO(CH_2)_7CH{=}CH(CH_2)_7CH_3$
MP-97: $R^{13}$: $CH_2OH$; $R^{14}$: $CH_2NHCO(CH_2)_7CH{=}CH(CH_2)_7CH_3$; $R^{15}$ $CH_2NHCOCH{=}CH_2$; $R^{16}$: $CH_2OCH_3$
MP-98: $R^{13}$: $CH_2OCH_3$; $R^{14}$: $CH_2OH$; $R^{15}$: $CH_2NHCO(CH_2)_7CH{=}CH(CH_2)_7CH_3$; $R^{16}$: $CH_2NHCOCH{=}CH_2$
MP-99: $R^{13}$: $CH_2OCH_3$; $R^{14}$: $CH_2OH$; $R^{15}$: $CH_2NHCOCH{=}CH_2$; $R^{16}$: $CH_2NHCO(CH_2)_7CH{=}CH(CH_2)_7CH_3$
MP-100: $R^{13}$: $CH_2NHCO(CH_2)_7CH{=}CH(CH_2)_7CH_3$; $R^{14}$: $CH_2OCH_3$; $R^{15}$: $CH_2OH$; $R^{16}$: $CH_2NHCOCH{=}CH_2$

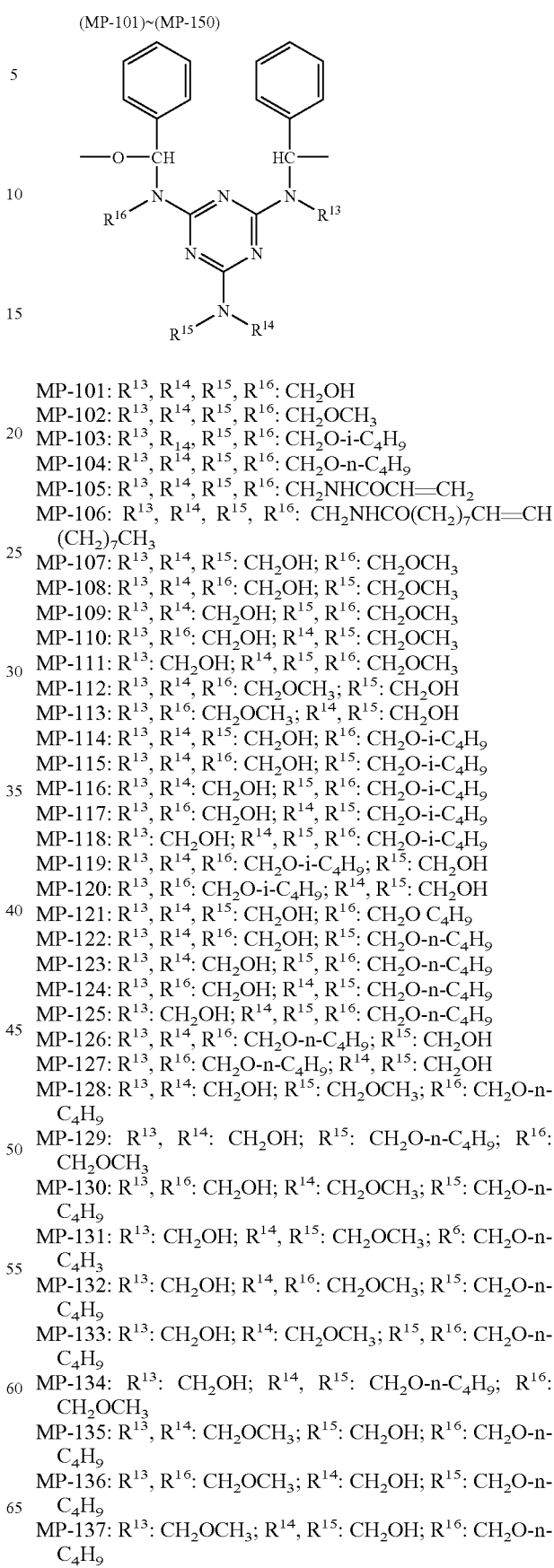

(MP-101)~(MP-150)

MP-101: $R^{13}$, $R^{14}$, $R^{15}$, $R^{16}$: $CH_2OH$
MP-102: $R^{13}$, $R^{14}$, $R^{15}$, $R^{16}$: $CH_2OCH_3$
MP-103: $R^{13}$, $R_{14}$, $R^{15}$, $R^{16}$: $CH_2O\text{-}i\text{-}C_4H_9$
MP-104: $R^{13}$, $R^{14}$, $R^{15}$, $R^{16}$: $CH_2O\text{-}n\text{-}C_4H_9$
MP-105: $R^{13}$, $R^{14}$, $R^{15}$, $R^{16}$: $CH_2NHCOCH{=}CH_2$
MP-106: $R^{13}$, $R^{14}$, $R^{15}$, $R^{16}$: $CH_2NHCO(CH_2)_7CH{=}CH(CH_2)_7CH_3$
MP-107: $R^{13}$, $R^{14}$, $R^{15}$: $CH_2OH$; $R^{16}$: $CH_2OCH_3$
MP-108: $R^{13}$, $R^{14}$, $R^{16}$: $CH_2OH$; $R^{15}$: $CH_2OCH_3$
MP-109: $R^{13}$, $R^{14}$: $CH_2OH$; $R^{15}$, $R^{16}$: $CH_2OCH_3$
MP-110: $R^{13}$, $R^{16}$: $CH_2OH$; $R^{14}$, $R^{15}$: $CH_2OCH_3$
MP-111: $R^{13}$: $CH_2OH$; $R^{14}$, $R^{15}$, $R^{16}$: $CH_2OCH_3$
MP-112: $R^{13}$, $R^{14}$, $R^{16}$: $CH_2OCH_3$; $R^{15}$: $CH_2OH$
MP-113: $R^{13}$, $R^{16}$: $CH_2OCH_3$; $R^{14}$, $R^{15}$: $CH_2OH$
MP-114: $R^{13}$, $R^{14}$, $R^{15}$: $CH_2OH$; $R^{16}$: $CH_2O\text{-}i\text{-}C_4H_9$
MP-115: $R^{13}$, $R^{14}$, $R^{16}$: $CH_2OH$; $R^{15}$: $CH_2O\text{-}i\text{-}C_4H_9$
MP-116: $R^{13}$, $R^{14}$: $CH_2OH$; $R^{15}$, $R^{16}$: $CH_2O\text{-}i\text{-}C_4H_9$
MP-117: $R^{13}$, $R^{16}$: $CH_2OH$; $R^{14}$, $R^{15}$: $CH_2O\text{-}i\text{-}C_4H_9$
MP-118: $R^{13}$: $CH_2OH$; $R^{14}$, $R^{15}$, $R^{16}$: $CH_2O\text{-}i\text{-}C_4H_9$
MP-119: $R^{13}$, $R^{14}$, $R^{16}$: $CH_2O\text{-}i\text{-}C_4H_9$; $R^{15}$: $CH_2OH$
MP-120: $R^{13}$, $R^{16}$: $CH_2O\text{-}i\text{-}C_4H_9$; $R^{14}$, $R^{15}$: $CH_2OH$
MP-121: $R^{13}$, $R^{14}$, $R^{15}$: $CH_2OH$; $R^{16}$: $CH_2O\ C_4H_9$
MP-122: $R^{13}$, $R^{14}$, $R^{16}$: $CH_2OH$; $R^{15}$: $CH_2O\text{-}n\text{-}C_4H_9$
MP-123: $R^{13}$, $R^{14}$: $CH_2OH$; $R^{15}$, $R^{16}$: $CH_2O\text{-}n\text{-}C_4H_9$
MP-124: $R^{13}$, $R^{16}$: $CH_2OH$; $R^{14}$, $R^{15}$: $CH_2O\text{-}n\text{-}C_4H_9$
MP-125: $R^{13}$: $CH_2OH$; $R^{14}$, $R^{15}$, $R^{16}$: $CH_2O\text{-}n\text{-}C_4H_9$
MP-126: $R^{13}$, $R^{14}$, $R^{16}$: $CH_2O\text{-}n\text{-}C_4H_9$; $R^{15}$: $CH_2OH$
MP-127: $R^{13}$, $R^{16}$: $CH_2O\text{-}n\text{-}C_4H_9$; $R^{14}$, $R^{15}$: $CH_2OH$
MP-128: $R^{13}$, $R^{14}$: $CH_2OH$; $R^{15}$: $CH_2OCH_3$; $R^{16}$: $CH_2O\text{-}n\text{-}C_4H_9$
MP-129: $R^{13}$, $R^{14}$: $CH_2OH$; $R^{15}$: $CH_2O\text{-}n\text{-}C_4H_9$; $R^{16}$: $CH_2OCH_3$
MP-130: $R^{13}$, $R^{16}$: $CH_2OH$; $R^{14}$: $CH_2OCH_3$; $R^{15}$: $CH_2O\text{-}n\text{-}C_4H_9$
MP-131: $R^{13}$: $CH_2OH$; $R^{14}$, $R^{15}$: $CH_2OCH_3$; $R^6$: $CH_2O\text{-}n\text{-}C_4H_3$
MP-132: $R^{13}$: $CH_2OH$; $R^{14}$, $R^{16}$: $CH_2OCH_3$; $R^{15}$: $CH_2O\text{-}n\text{-}C_4H_9$
MP-133: $R^{13}$: $CH_2OH$; $R^{14}$: $CH_2OCH_3$; $R^{15}$, $R^{16}$: $CH_2O\text{-}n\text{-}C_4H_9$
MP-134: $R^{13}$: $CH_2OH$; $R^{14}$, $R^{15}$: $CH_2O\text{-}n\text{-}C_4H_9$; $R^{16}$: $CH_2OCH_3$
MP-135: $R^{13}$, $R^{14}$: $CH_2OCH_3$; $R^{15}$: $CH_2OH$; $R^{16}$: $CH_2O\text{-}n\text{-}C_4H_9$
MP-136: $R^{13}$, $R^{16}$: $CH_2OCH_3$; $R^{14}$: $CH_2OH$; $R^{15}$: $CH_2O\text{-}n\text{-}C_4H_9$
MP-137: $R^{13}$: $CH_2OCH_3$; $R^{14}$, $R^{15}$: $CH_2OH$; $R^{16}$: $CH_2O\text{-}n\text{-}C_4H_9$ MP-138: $R^{13}$, $R^{16}$: $CH_2O$-n-$C_4H_9$; $R^{14}$: $CH_2OCH_3$; $R^{15}$: $CH_2OH$
MP-139: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-140: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$
MP-141: $R^{13}$: $CH_2OH$; $R^{14}$: $CH_2O$-n-$C_4H_9$; $R^{15}$: $CH_2NHCOCH=CH_2$ $R^{16}$: $CH_2OCH_3$
MP-142: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-143: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-144: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-145: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-146: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-147: $R^{13}$: $CH_2OH$; $R^{14}$: $CH_2NHCO(CH_2)_7CH=CH(CH_2)_7CH_3$; $R^{15}$: $CH_2NHCOCH=CH_2$;; $R^{16}$: $CH_2OCH_3$
MP-148: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-149: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-150: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$ (MP-151)~(MP-200)

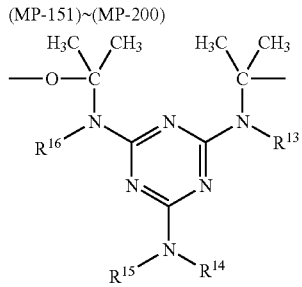

MP-151: $R^{13}$, $R^{14}$, $R^{15}$, $R^{16}$: $CH_2OH$
MP-152: $R^{13}$, $R^{14}$, $R^{15}$, $R^{16}$: $CH_2OCH_3$
MP-153: $R^{13}$, $R^{14}$, $R^{15}$, $R^{16}$: $CH_2O$-i-$C_4H_9$
MP-154: $R^{13}$, $R^{14}$, $R^{15}$, $R^{16}$: $CH_2O$-n-$C_4H_9$
MP-155: $R^{13}$, $R^{14}$, $R^{15}$, $R^{16}$: $CH_2NHCOCH=CH_2$
MP-156: $R^{13}$, $R^{14}$, $R^{15}$, $R^{16}$: $CH_2NHCO(CH_2)_7CH=CH(CH_2)_7CH_3$
MP-157: $R^{13}$, $R^{14}$, $R^{15}$: $CH_2OH$; $R^{16}$: $CH_2OCH_3$
MP-158: $R^{13}$, $R^{14}$, $R^{16}$: $CH_2OH$; $R^{15}$: $CH_2OCH_3$
MP-159: $R^{13}$, $R^{14}$: $CH_2OH$; $R^{15}$, $R^{16}$: $CH_2OCH_3$
MP-160: $R^{13}$, $R^{16}$: $CH_2OH$; $R^{14}$, $R^{15}$: $CH_2OCH_3$
MP-161: $R^{13}$, $R^{14}$, $R^{15}$: $CH_2OH$; $R^{16}$: $CH_2OCH_3$
MP-162: $R^{13}$, $R^{14}$, $R^{16}$: $CH_2OCH_3$; $R^{15}$: $CH_2OH$
MP-163: $R^{13}$, $R^{16}$: $CH_2OCH_3$; $R^{14}$, $R^{15}$: $CH_2OH$
MP-164: $R^{13}$, $R^{14}$, $R^{15}$: $CH_2OH$; $R^{16}$: $CH_2O$-i-$C_4H_9$
MP-165: $R^{13}$, $R^{14}$, $R^{16}$: $CH_2OH$; $R^{15}$: $CH_2O$-i-$C_4H_9$
MP-166: $R^{13}$, $R^{14}$, $R^{15}$: $CH_2OH$; $R^{16}$: $CH_2O$-i-$C_4H_9$
MP-167: $R^{13}$, $R^{16}$: $CH_2OH$; $R^{14}$, $R^{15}$: $CH_2O$-i-$C_4H_9$
MP-168: $R^{13}$, $R^{14}$, $R^{15}$: $CH_2OH$; $R^{16}$: $CH_2O$-i-$C_4H_9$
MP-169: $R^{13}$, $R^{14}$, $R^{16}$: $CH_2O$-i-$C_4H_9$; $R^{14}$, $R^{15}$: $CH_2OH$
MP-170: $R^{13}$, $R^{16}$: $CH_2O$-i-$C_4H_9$; $R^{14}$, $R^{15}$: $CH_2OH$
MP-171: $R^{13}$, $R^{14}$, $R^{15}$: $CH_2OH$; $R^{16}$: $CH_2O$-n-$C_4H_9$
MP-172: $R^{13}$, $R^{14}$, $R^{16}$: $CH_2OH$; $R^{15}$: $CH_2O$-n-$C_4H_9$
MP-173: $R^{13}$, $R^{14}$: $CH_2OH$; $R^{15}$, $R^{16}$: $CH_2O$-n-$C_4H_9$
MP-174: $R^{13}$, $R^{16}$: $CH_2OH$; $R^{14}$, $R^{15}$: $CH_2O$-n-$C_4H_9$
MP-175: $R^{13}$: $CH_2OH$; $R^{14}$, $R^{15}$, $R^{16}$: $CH_2O$-n-$C_4H_9$
MP-176: $R^{13}$, $R^{14}$, $R^{16}$: $CH_2O$-n-$C_4H_9$; $R^{15}$: $CH_2OH$
MP-177: $R^{13}$, $R^{16}$: $CH_2O$-n-$C_4H_9$; $R^{14}$, $R^{15}$: $CH_2OH$
MP-178: $R^{13}$, $R^{14}$: $CH_2OH$; $R^{15}$: $CH_2OCH_3$; $R^{16}$: $CH_2O$-n-$C_4H_9$
MP-179: $R^{13}$, $R^{14}$: $CH_2OH$; $R^{15}$: $CH_2O$-n-$C_4H_9$; $R^{16}$: $CH_2OCH_3$
MP-180: $R^{13}$, $R^{16}$: $CH_2OH$; $R^{14}$: $CH_2OCH_3$; $R^{15}$: $CH_2O$-n-$C_4H_9$
MP-181: $R^{13}$: $CH_2OH$; $R^{14}$, $R^{15}$: $CH_2OCH_3$; $R^{16}$: $CH_2O$-n-$C_4H_9$
MP-182: $R^{13}$: $CH_2OH$; $R^{14}$, $R^{16}$: $CH_2OCH_3$; $R^{15}$: $CH_2O$-n-$C_4H_9$
MP-183: $R^{13}$: $CH_2OH$; $R^{14}$: $CH_2OCH_3$; $R^{15}$, $R^{16}$: $CH_2O$-n-$C_4H_9$
MP-184: $R^{13}$: $CH_2OH$; $R^{14}$, $R^{15}$: $CH_2O$-n-$C_4H_9$; $R^{16}$: $CH_2OCH_3$
MP-185: $R^{13}$, $R^{14}$: $CH_2OCH_3$; $R^{15}$: $CH_2OH$; $R^{16}$: $CH_2O$-n-$C_4H_9$
MP-186: $R^{13}$, $R^{16}$: $CH_2OCH_3$; $R^{14}$: $CH_2OH$; $R^{15}$: $CH_2O$-n-$C_4H_9$
MP-187: $R^{13}$: $CH_2OCH_3$; $R^{14}$, $R^{15}$: $CH_2OH$; $R^{16}$: $CH_2O$-n-$C_4H_9$
MP-188: $R^{13}$, $R^{16}$: $CH_2O$-n-$C_4H_9$; $R^{14}$: $CH_2OCH_3$; $R^{15}$: $CH_2OH$
MP-189: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-190: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$
MP-191: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-192: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-193: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-194: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-195: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-196: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-197: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$
MP-198: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-199: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-200: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

In the present invention, employed may be copolymers in which at least two types of the above repeating units are combined.

Further, simultaneously employed may be at least two types of compounds having a 1,3,5-triazine ring. Also simultaneously employed may be at least two types of disk shaped compounds (for example, compounds having a 1,3,5-triazine ring and compounds having a porphyrin skeleton).

The used amount of these additives is preferably 0.2-30 percent by weight with respect to the optical film, but is particularly preferably 1-20 percent by weight.

<Film Production>

Hereafter, a desirable film-production method of a polarizing plate protective film according to the present invention is explained.

1) Dissolution Process:

In this process, cellulose ester is dissolved in an organic solvent which mainly contains good solvent, in a vessel while stirring a mixture of a cellulose ester, an additive and a solvent so as to form a dope or an additive solution is mixed in a cellulose derivative solution so as to form a dope.

As a method of dissolving a cellulose derivative by ordinary pressure, although various methods such as a method of performing under the ambient pressure, a method of performing under a temperature below the boiling point of the main solvent, a method of performing under a temperature above the boiling point of the main solvent while applying a pressure, a method of performing a cooling dissolving method described in the official gazettes of Japanese Patent O.P.I. Publication No. 9-95544, Japanese Patent O.P.I. Publication No. 9-95557 and Japanese Patent O.P.I. Publication No. 9-95538, a method of performing under a high pressure described in the official gazette of Japanese Patent O.P.I. Publication No. 11-21379 can be employed, a method of performing under a temperature above the boiling point of the main solvent while applying a pressure especially is desirable.

The concentration of the cellulose derivative in a dope is desirably 10-35% by mass.

After adding dissolving or dispersing an additive in the dope while dissolving or after dissolving, the dope is filtered with a filer media and degassed, and then the dope is sent to the following manufacturing process with a feeding pump.

In the present invention, it is preferable to produce a film with a method in which fine particles are dispersed, a fine particles addition liquid is adjusted, this fine particles addition liquid is added directly in a dissolving vessel of a main dope solution, the dope solution is filtered with a filter media having a collecting particle diameter of 0.5 to 5 μm and a filtering time of 10 to 25 sec/100 ml, filter media, the resulting dope is subjected to casting so as to produce the film. According to this method, although coagulum remains at the time of dispersing the fine particles and coagulum is generated at the time of adding the main dope, such coagulum can be removed by the filter media having a collecting particle diameter of 0.5 to 5 μm and a filtering time of 10 to 25 sec/100 ml. In the dope, since the concentration of the fine particles is fully thin in comparison with the added solution, a sudden rise of a filtering pressure due to sticking among coagulum at the time of filtering hardly take place.

FIG. 1 is a schematic diagram showing the steps of dope preparation, casting and drying. A large-sized coagulum is removed by a particle-added solution manufacturing kettle 41 through a filter 44. The solution is fed to the stock kettle 42. After that, a particle-added solution is added to the main dope dissolution kettle 1 from the stock kettle 42. Then the main dope solution is infiltrated by the main filter 3, and an ultraviolet absorber-added solution is added in-line by 16 wherever required. Alternatively, the ultraviolet absorber or ultraviolet absorber solution can be added to the main dope dissolution kettle in advance.

In many cases, the main dope contains about 10 through 50% of return scrap by mass. Since the return scrap includes particles, it is necessary to control the amount of the return scrap to be added, as well as the amount of the particle-added solution to be added. To ensure easy control and batch management, it is preferred to adopt the method of directly adding the main dope into a dissolution kettle or the method of providing a mixing kettle for mixing the main dope with particle-added solution. Of these methods, the method of directly adding the main dope into a dissolution kettle is more preferred because a sufficient time can be taken to mix the main dope with particle-added solution, and productivity is superb. The solution containing the addition of particles preferably includes 0.5 through 10% of particles by mass, more preferably 1 through 5% by mass, still more preferably 1 through 3% by mass. A smaller amount of particles signifies a lower viscosity and easier handling, whereas a greater amount of particles indicates a smaller amount to be added, and easier addition to the main dope. This is the reason why the aforementioned range is recommended. The return scrap refers to a cellulosic ester film pulverized into small particles. It includes both sides of the film having been trimmed off when the cellulosic ester film is produced, as well as the cellulose film web having been rejected due to a scratch or other fault. The return scrap is reused as part of the material.

2) Casting Process:

In this casting process, a dope solution is sent to a high pressure die using a feeding pump (for example, a high pressure metering gear pump) and cast on an endless metal belt, for example, a stainless steel belt, or on a rotating cylindrical metal support at a prescribed position from the high pressure die.

A high pressure die is preferable since uniform thickness is more easily obtained by adjusting the slit shape at the tip of a die. A high pressure die includes a coat-hanger die and a T die either of which are preferably used. Two high pressure dies may be provided simultaneously on a metal support to increase the film forming rate by dividing the amount of dope and by superimposing two film layers. Or it is also desirable to obtain a film of a laminated structure by a multi casting method to conduct casting of plural dope solutions simultaneously.

3) Solvent Evaporation Process:

A web (a film of a dope after the dope is cast on a metal support is referred to as a web) is heated on a metal support to evaporate the contained solvent until the web becomes peelable.

The following methods may be used to promote evaporation of a solvent from a web: blowing from above the web; heating a metal support from a back surface using a liquid heat medium; and heating from both surfaces of a web using radiant heat. Among these methods, the method to heat a metal support from a back surface using a liquid heat medium is preferable with respect to drying efficiency, however the above methods may also be used in combination. In the case of heating a back surface using a liquid heat medium, it may be preferable to heat at a temperature lower than the boiling point of the main solvent of an organic solvent used in the dope or lower than the boiling point of an organic solvent having a lowest boiling point.

4) Peeling Process

A web dried on a metal support is peeled from the metal support at a prescribed position. The peeled web is sent to the next process. If the amount of the residual solvent (below-mentioned formula) in a web is too much at the point of peeling, peeling is difficult and if the amount of the residual solvent is too small, partial peeling of the web may occur prior to the point of peeling.

As an alternate method to increase the formation rate of a web (by peeling while an amount of the residual solvent is as much as possible, the formation rate of a web can be increased), a gel casting method may be used. This method enables a higher forming rate of a web since a web is peeled while the web still contains a high percentage of solvent. In a gel casting method, the gel is formed by: adding a considerable amount of a poor solvent in a dope which forms a gel after casting the dope on a metal support; or lowering the temperature of the metal support to facilitate formation of a gel. By forming a gel, the mechanical strength of a web increases and an early peeling of the web becomes possible, resulting in a higher web formation rate.

With regard to the amount of the residual solvent on the metal support, it may be preferable to peel the web in a range of 5 to 150% by mass depending on the degree of a drying condition and a length of the metal support. In the case of peeling it when the amount of the residual solvent is too much, if the web is to soft, the web may lose a flatness at the time of peeling, or apt to cause twist or longitudinal streak by the peeling tension. Accordingly, the amount of the residual solvent when peeling is determined in view of both of an economic speed and a quality.

In the present invention, the temperature at the point of peeling from the metal support is preferably controlled between −50° C. and 40° C., is more preferably 10° C. to 40° C., and is still more preferably 15° C. to 30° C.

The amount of residual solvent at the point of peeling on the metal support is preferably 10 to 150% by weight, is more preferably 10 to 120% by weight.

The amount of the residual solvent is defined by the following equation:

Residual solvent content (% by weight)=$\{(M-N)/N\} \times 100$ where M represents weight of samples of the web taken during or after the manufacturing process, and N represents weight of the same sample after it has been dried at 115° C. for one hour.

5) Drying and Stretching Process:

After peeling, the web is dried using a drying equipment which conveys the web by passing it alternately among a plurality of rolls arranged in the drying equipment, and/or a tenter apparatus which clips the both ends of a web and conveys it with a clip, thereby drying the web.

Figure 2:
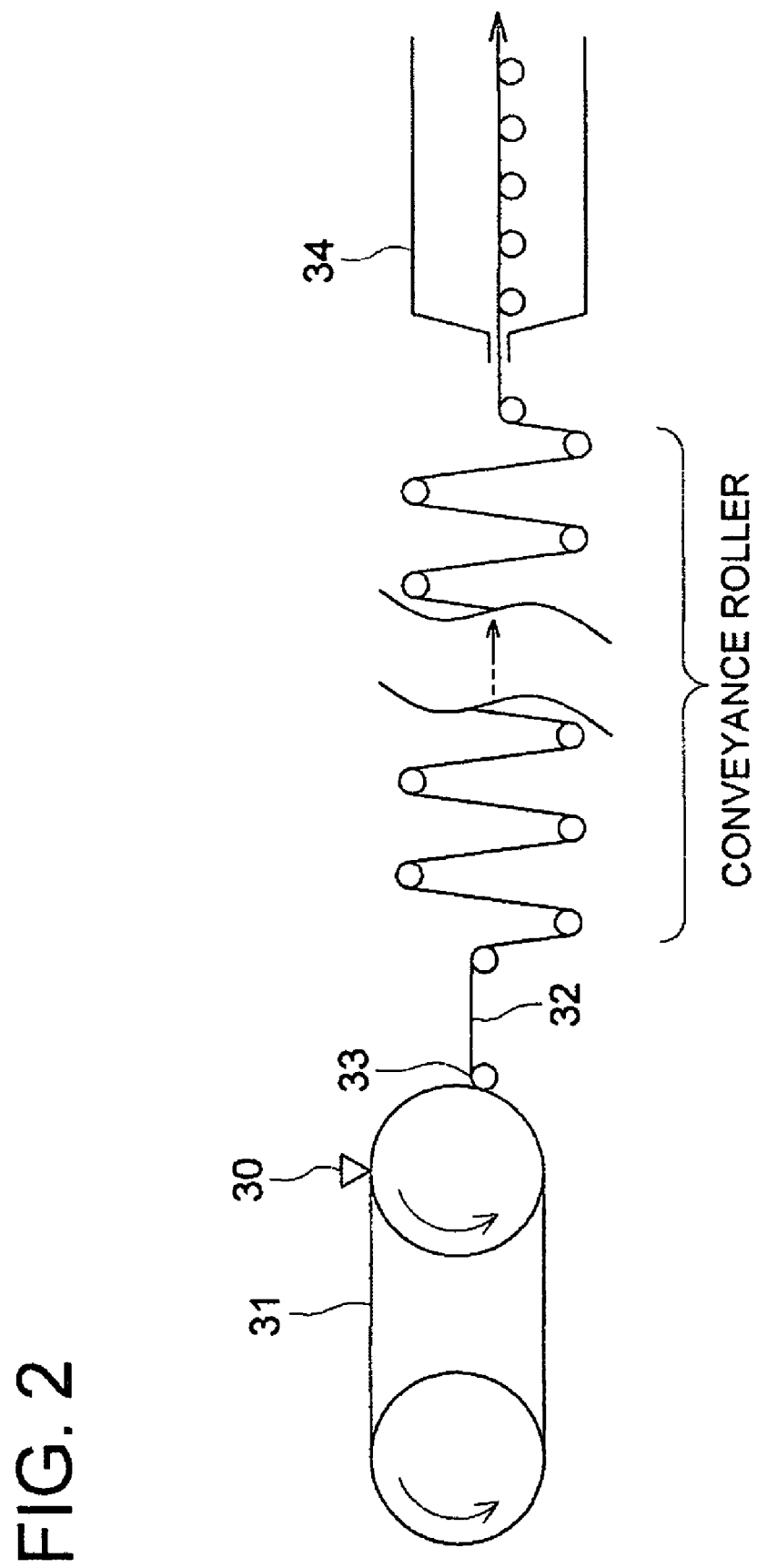
FIG. 2 is a schematic diagram showing the process of conveyance from the casting apparatus of the present invention to the tenter stretching apparatus.

FIG. 2 is a schematic diagram showing the process of conveyance from the casting apparatus 31 of the present invention to the tenter stretching apparatus 34. The present inventors produced a polarizing plate protective film when the distance of conveyance from the separation position 33 of FIG. 2 to the tenter stretching apparatus 34 was 40 through 300 m, and found out that the polarizing plate of the present invention could be obtained using the aforementioned polarizing plate protective film. The present invention is the result of this finding. When the aforementioned conveyance distance is 40 m or more, the polarizing plate protective film preferably used in the present invention can be obtained. This distance is preferably 300 m or less in order to get uniform optical characteristics, and more preferably in the range from 50 through 300 m. The distance of conveyance from the process of separation to the tentering machine can be defined as the length of the web conveyed from the point of separation to the portion where an increase of the width in the tentering machine starts. From the process of separation to the process of stretching, the web is preferably conveyed by 80 through 600 conveyance rolls, preferably 100 through 450 conveyance rolls in order to ensure the advantages of the present invention. The time required for conveyance from the point of separation to the tentering machine is preferably set at 0.5 through 10 minutes.

According to the conventional art, if the distance from the process of separation to the process of stretching by the tentering machine is made longer, it becomes difficult to control coasting of the web to be conveyed. When the web subsequent to the process of separation has coasted, flatness deteriorates and optically characteristic spots are produced. Further, stretches and wrinkles are generated. Thus, it has been difficult to increase the distance of conveyance for this portion. Accordingly, the distance of conveyance from the process of separation to the tentering machine is on the order of 1 through 30 m in the conventional art.

In the present invention, to increase the distance from the point of separation to the tentering machine, it is preferred to use a tentering machine wherein the distance of the film (hereinafter "web" may be referred to as "film") being clamped (distance from the position of starting the clamping to the position of terminating) can be controlled independently on the right and left by the right and left clamping devices of the tentering machine.

Figure 3:
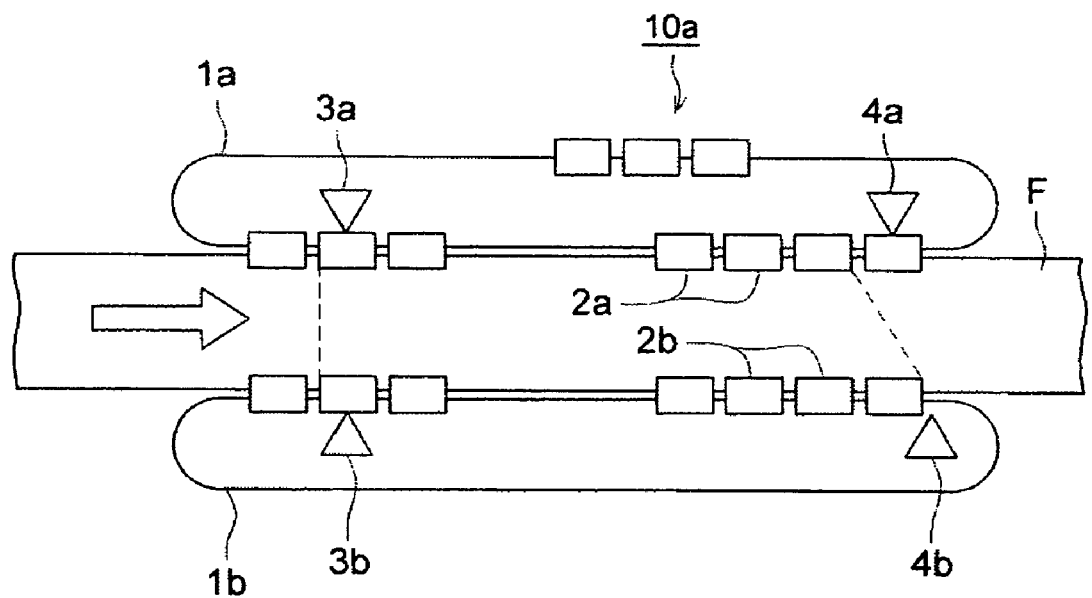
FIG. 3 is a schematic diagram showing an example of the tenter stretching apparatus (10a) using the method of the present invention.

FIG. 3 is a schematic diagram showing an example of the tenter stretching apparatus (10*a*) wherein the lengths of the right and left portions of the resin film (F) being clamped are controlled independently on the right and left so that the length of the film (F) clamped on the right is different from that clamped on the left. FIG. 3 schematically shows an example of the tenter stretching apparatus (10*a*) preferably used in the production of a polymer film used in the present invention. In FIG. 3, the right and left positions being clamped by the right and left clamping devices (clips) (2*a*) and (2*b*) on the tenter stretching apparatus (10*a*) are made different from each other. Namely, the lengths of the film (F) clamped on the right and left sides are adjusted by changing the setting positions of clip closers (3*a*) and (3*b*) on the right and left so that the positions for starting clamping on the right and left are different from each other. This arrangement causes force of twisting the resin film (F) to be generated inside the tentering machine (10*a*), and corrects the displacement resulting from conveyance by other than the tentering machine (10). This arrangement effectively eliminates the possibility of the web being coasted or wrinkles being produced, even if the conveyance distance from the point of separation to the tentering machine has been increased.

The tenter stretching apparatus (10*a*) shown in the diagram is a schematic view. Normally, of the multiple clips (2*a*) and (2*b*) equipped with a pair of rotary drive apparatuses (ring-shaped chain) (1*a*) and (1*b*) made up of endless chains in a row, the clips (2*a*) and (2*b*) on the linear traveling section on the side of chain outward trip for clamping and pulling the right and left edges of the film (F) will gradually move away across the width of the film (F). This arrangement is ensured by the setting of the tracks of the chains (1*a*) and (1*b*) on the right and left sides. Thus, the film (F) is oriented across the width.

In the present invention, to provide high-precision correction of the wrinkles, stretch or distortion, it is preferred to add an apparatus for preventing a longer film from coasting. It is also preferred to use a coasting correction apparatus such as an edge position controller (also called the EPC) disclosed in the Japanese Non-Examined Patent Publication 6-8663, or a center position controller (also called the CPC). Such an apparatus uses an air servo sensor or optical sensor to detect the film edge. Based on this information, the direction of conveyance is controlled in such a way that the film edge and the center across the width will be aligned to a predetermined position for conveyance. One or two guide rolls and a flat expander roll with driving device as actuators are shook to the right and left (or up and down) along the line, thereby correcting the coasting. A pair of smaller pinch rolls are placed on the right and left of the film (one on the front of the film and the other on the back, wherein they are located on both sides of the film), whereby the film is sandwiched and pulled to correct coasting (a cross guide method). The principle of correcting the coasting of these devices can be described as follows: If the running film is to be led, for example, to the left, the roll is tilted so that the film will go to the right, according to the former method. According to the latter method, a pair of pinch rolls on the right are nipped to pull it to the right. At least one of the aforementioned coasting preventive apparatuses is preferably installed between the point of film separation and the tenter stretching apparatus.

Figure 5:
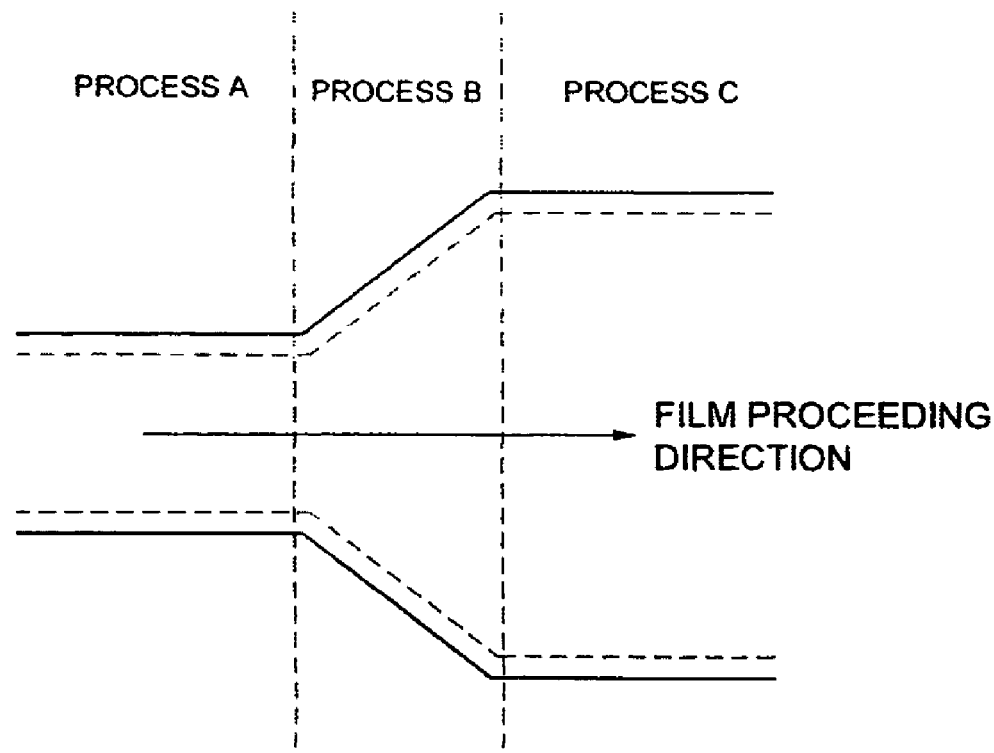
FIG. 5 is a schematic diagram representing an example of the tentering machine process used in the present invention.

Referring to FIG. 5, the following describes an example of the tenter stretching process for manufacturing the polarizing plate protective film of the present invention.

Figure 4:
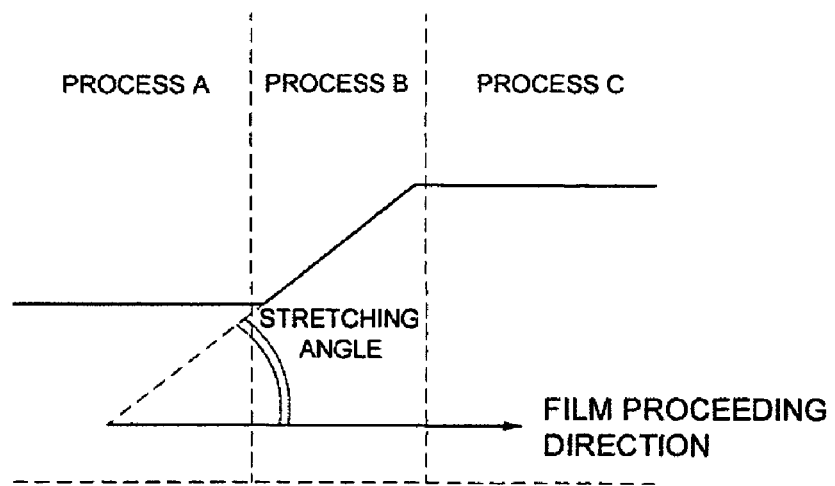
FIG. 4 is a diagram representing the stretching angle in the process of stretching.

In FIG. 5, the process A is provided to clamp the film having been conveyed from the film conveyance process D0 (not illustrated). In the following process B, the film is drawn along the width (perpendicular to the film traveling direction) at the draw angle illustrated in FIG. 4. In the process C, stretching terminates, and the film is conveyed as it is clamped.

A slitter which trims both edges of the film is preferably provided at any position between just after the web is peeled and just after Process B or C. Specifically preferably, a slitter is provided just before Process A. When a stretching was carried out under the same condition, a stretched film which is slit before Process B showed an improved orientation angle distribution of slow axes than a stretched film without slitting. This may be because an undesirable stretching in the machine direction is suppressed between the peeling process and Process B where the film still contains much solvent.

In a tenter process, different temperature domains may be purposely provided in the film to improve the orientation angle distribution of slow axes. Also a neutral domain is preferably provided between two different temperature domains to prevent interference.

The stretching process may be divided into several steps. Biaxial stretching in both machine and transverse directions is also preferable. Biaxial stretching may be carried out simultaneously or in series of steps. In stepped stretching, stretching may be carried out in different directions or in the same direction. Stretching in different directions may also be added to the sequence of stepped stretching in the same direction. The following stretching steps may be possible.

stretching in the casting direction-stretching in the transverse direction and simultaneously stretching in the casting direction;

stretching in the casting direction-stretching in the transverse direction and simultaneously stretching in the casting direction.

Further, simultaneous biaxial stretching may includes a case in which the stretching is conducted in one direction and contracting is conducted in the other direction by easing the tension. A preferable stretching magnification of the simultaneous biaxial stretching to obtain an optical compensation film according to the present invention is ×1.05 to ×1.5 in the widthwise direction and ×0.8 to ×1.3 in a longitudinal direction (a casting direction), in particular, it may be more preferable to make it to be ×1.1 to ×1.5 in the widthwise direction and ×0.8 to ×0.99 in a longitudinal direction. Especially, it may be further more preferable to make it to be ×1.1 to ×1.4 in the widthwise direction and ×0.9 to ×0.99 in a longitudinal direction.

The term "stretching direction" is usually used to indicate the direction in which a direct stretching stress is applied to a film (expression 1), however, in a case of stepped biaxial stretching, "stretching direction" may indicate the direction in which the final stretching factor is the largest (expression 2), which is usually identical to the direction of a slow axis. When a changing rate of a film dimension is discussed, the term "stretching direction" without explanation may be used in the meaning of above expression 2, and when an amount of residual solvent is discussed, the term is usually used in the meaning of above expression 1.

It is well known that, when a film is stretched in the transverse direction of the film, the dispersion of orientations of optical slow axes becomes bad. In order to conduct stretching in the transverse direction of a film while the ratio of Rth to Ro is kept constant and the dispersion of orientations of optical slow axes is kept good, a film preferably satisfies $Ta \leqq (Tb-10)$, or $Tc \leqq Tb$, and more preferably the film satisfies both $Ta \leqq (Tb-10)$ and $Tc \leqq Tb$, wherein Ta, Tb and Tc each represents a temperatures in Celsius at each end of Processes A, B and C, respectively.

In order to decrease the above mentioned the dispersion of orientations of optical slow axes (orientation angle dispersion), the temperature increasing rate of the film in Process B is preferably 0.5 to 10° C./s.

The stretching duration in Process B is preferably shorter to increase a dimensional stability in the 80° C.-90% RH test, however, a lower limitation of the stretching duration may be prescribed to maintain uniformity of the film. The stretching duration is preferably 1 to 10 seconds, more preferably 4 to 10 seconds.

In the tenter process, a coefficient of heat transfer may be constant or may be changed. The heat transfer coefficient is preferably in the range of $41.9 \times 10^3$ to $419 \times 10^3$ J/m² hr, more preferably $41.9 \times 10^3$ to $209.5 \times 10^3$ J/m² hr, and further more preferably $41.9 \times 10^3$ to $126 \times 10^3$ J/m² hr.

In order to improve the dimensional stability of a film in the 80° C.-90% RH test, the stretching rate in the transverse direction in Process B may be constant or may be changed. The stretching rate is preferably in the range of 50 to 500 W/minute, more preferably 100 to 400 W/minute, and most preferably 200 to 300 W/minute.

In the tenter process, the distribution of environmental temperature is preferably smaller to improve uniformity of a film. The distribution of environmental temperature in the tenter process is preferably within ±5° C., more preferably within ±2° C., and most preferably within ±1° C. By decreasing the distribution of environmental temperature, the temperature distribution in the transverse direction of a film may also be decreased.

In Process C, in order to suppress further stretching, the width of a film held by a tenter is preferably reduced. Specifically, the width is preferably reduced to 95 to 99.5% of the former process.

After a film is treated in the tenter process, a subsequent-drying process (hereafter referred to as Process D1) is preferably provided. The length of the drying zone after the tenter process is preferably 500 to 6000 m. It is desirable to convey with conveying rollers of 400-15000 pieces. In the drying zone after the tenter process, the drying is conducted at 100-200° C., still more preferably at 110-160° C. Further, it is desirable to conduct heat-treatment while conveying under the atmosphere that the atmosphere replacement ratio is 12 times/hour or more at 105-155° C., still more preferably 12-45 times/hour.

Further, the polarizing plate protective film used for the present invention preferably has a free volume radius of 0.250-0.350 nm obtained by the positron annihilation lifetime spectroscopy the and more preferably 0.250-0.310 nm.

The free volume in the present invention represents vacant area which is not occupied by the cellulose ester chain. This free volume can be measured using positron annihilation lifetime spectroscopy. More specifically, by measuring the time from injection of positrons into a cellulose ester film to the annihilation of the positrons, namely annihilation lifetime of positrons, size and numerical concentration of free volume holes are nondestructively estimated from the annihilation lifetime of positrons.

(Measurement of Free Volume Radius by Positron Annihilation Lifetime Spectroscopy, and Free Volume Parameter)

A positron annihilation lifetime and relative intensity were measured under the following measurement condition.

(Measurement Condition)

| Positron source: | 22NaCl (intensity: 1.85 MBq) |
| --- | --- |
| Gamma-ray detector: | Plastic scintillator + Photomultiplier tube |
| Apparatus time resolution: | 290 ps |
| Measurement temperature: | 23° C. |
| Total number of counts: | 1 million counts |
| Specimen size: | 20 mm × 15 mm × 2 mm |

20 pieces of 20 mm×15 mm sized films were piled to prepare an about 2 mm thick sample. The sample was dried under vacuum 24 hours.

| Irradiation area: | A circle of about 10 mm in diameter |
| --- | --- |
| Time per channel: | 23.3 ps/ch |

According to the above measurement condition, positron annihilation lifetime spectroscopy was carried out. A three component analysis using a nonlinear least-square method was carried out for the obtained results. When the annihilation times were referred to as, in small order, $\tau 1$, $\tau 2$ and $\tau 3$ and the corresponding intensities were referred to as I1, I2 and I3 (I1+I2+I3=100%), respectively, using the largest annihilation time $\tau 3$, a free volume radius R3 (nm) was determined using the following formula. The larger the $\tau 3$ value is, the larger the estimated free volume is.

$$\tau 3 = (1/2) \, [1 - \{R3/(R3+0.166)\} + (1/2\pi)\sin\{2\pi R3/(R3+0.166)\}]^{-1}$$

where, 0.166 (nm) represents the thickness of the electronic layer which is exuding from the wall of a hole.

The above measurements were repeated twice and the mean values were calculated for the determination.

Evaluation of a free volume in polymer by positron annihilation spectroscopy is explained in, for example, MATERIAL STAGE vol. 4, No.5, 2004, pp. 21-25, The TRC News, No. 80 (July, 2002) PP. 20-22 (published by Toray Research Center), and "BUNSEKI (Analysis)", 1988, pp. 11-20".

The free volume radius of the polarizing plate protective film of the present invention is preferably 0.250-0.310 nm and is more preferably 0.270-0.305 nm. In an industrial process, it is rather difficult to produce a cellulose ester polarizing plate protective film having a free volume radius of less than 0.250 nm. Further, in a conventional polarizing plate protective film having a free volume radius 0.310 nm or more, patch of retardation becomes to occur easily under high temperature and high humidity.

The method of controlling the free volume radius of the polarizing plate protective film containing a low volatile plasticizer and cellulosic derivative in a prescribed range is not specifically limited, however, the following method may be applicable.

A polarizing plate protective film having a free volume radius of 0.250-0.310 nm and a free volume parameter of 1.0-2.0, both of which are determined by positron annihilation lifetime spectroscopy may be obtained, for example, by the following method: casting a dope containing a polyalcohol ester, a polycarboxylic acid ester, and a cellulose ester to form a web; stretching the web while the web contains residual solvent; drying the web until the amount of residual solvent decreases to 0.3% to obtain a cellulose ester film; (iv) heat treating the cellulose ester film at 105-150° C. in a film transportation process under a circumstance in which the rate of atmosphere replacement of not less than 12 times/h, or more preferably 12-45 times/h.

The rate of atmosphere replacement is the number of times replacing the atmosphere of a heat treatment chamber by fresh-air per unit time, provided that the volume of the heat treatment chamber is expressed as V ($m^3$) and the amount of fresh-air sent to the heat treatment chamber is expressed as FA ($m^3/h$). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

Rate of atmosphere replacement=$FA/V$(times/$h$)

When the heat treatment temperature exceeds 155° C., or when it is lower than 105° C., the effect of the present invention tends not be acquired.

As the operating temperature, it is still more preferable that the operating temperature is in the range of 110-150° C. Further, preferable is that the heat treatment is carried out under the condition in which the rate of atmosphere replacement is 12 times/h or more. When it is less than 12 times/h, the effect of the present invention tends not be acquired.

As described above, the polarizing plate protective film is produced through the control of the aforementioned production process conditions and the amount of the ultraviolet absorber and particles. Use of this polarizing plate makes it possible to manufacture the polarizing plate of the present invention, wherein the transmittance of the aforementioned polarizing plate as a single unit at a wavelength of 590 nm is equal to or greater than 40% in the environment of 23 degrees Celsius with a relative humidity of 55% RH, and the transmittance T2 of crossed-Nichols does not exceed 0.03%; and wherein the change in transmittance $\Delta T2$ meets $0.05 \times T2 < \Delta T2 < 0.9 \times T2$, when the relative humidity has changed from 20% RH to 80% RH. This arrangement achieves the object of the present invention, and provides a polarizing plate and a liquid crystal display capable of reducing the fluctuation of tint due to humidity when observed in a slanting direction of the liquid crystal display especially in the VA mode.

In the polarizing plate protective film of the present invention, Ro expressed by the following equation (i) at a wavelength of 590 nm in an environment of 23 degrees Celsius and 55% RH is preferably from 30 through 70 nm; Rt expressed by the following equation (ii) is preferably from 70 through 300 nm; S1 expressed by the following equation (iii) is preferably from 0.0005 through 0.0035; and S2 expressed by the following equation (iv) is from 0.0012 through 0.015.

$$Ro=(nx-ny) \times d \qquad \text{Equation (i)}$$

$$Rt=\{(nx+ny)/2-nz\} \times d \qquad \text{Equation (ii)}$$

$$S1=nx-ny \qquad \text{Equation (iii)}$$

$$S2=(nx+ny)/2-nz \qquad \text{Equation (iv)}$$

where nx denotes the refractive index in the direction of the low axis inside the film surface, ny indicates the refractive index in the direction of the high axis inside the film surface, nz represents the refractive index along the film thickness, and d shows the film thickness (nm). To ensure that all of the Ro, Rt, S1 and S2 expressed by the Equations (i) through (iv) are kept within the preferred range, the thickness d of the film preferably contains a suitable range, and the thickness of the polarizing plate protective film of the present invention is preferably 20 through 60 µm. If the thickness is less than 20 µm, the mechanical strength of this thin film is insufficient, with the result that breakage or other troubles are likely to occur at the time of production. If the thickness is less than 60 µm, the radius of a free volume is easily kept within the preferred range, and this has a preferable effect in ensuring the advantages of the present invention. Use of the polarizing plate protective film having a thickness of 20 through 60 µm reduces the overall thickness of the polarizing plate, and brings about such added advantages as reduced weight of the polarizing plate and reduced light leakage, in addition to the advantages of the present invention.

(6) Rolling-Up Manufacturing Process

After the amount of residual solvents in a web becomes two % by mass or less, it is a process to roll up as a polarizing plate protective film, and a film with excellent dimensional stability can be obtained by making the amount of residual solvents into 0.4% by mass or less.

As the rolling-up method, what is generally used may be used, for example, a constant torque method, a constant tension method, a taper tension method, a program tension controlling method of a constant internal stress, etc. may be listed, and these can be used properly.

The moisture permiability of a polarizing plate protective film of the present invention may be defined with the value measured at 25° C. 90 RH % by the method described in JIS Z 0208. The moisture permiability is desirably 20-500 g/m²·24 hours, especially desirable that it is 20-250 g/m²·24 hours. When the moisture permiability is 500 g/m²·24 hours or less, the fade resistance of a polarizing plate is excellent. Conversely, when the moisture permiability is 20 g/m²·24 hours or more, it is easy to dry solvents, such as water currently used for adhesives at the time of polarizing plate production, and a drying time becomes short, therefore it is desirable. More preferably, it is 25-250 g/m²·24 hours.

The mechanical strength of a polarizing plate protective film of the present invention is 2-6 GPa preferably, when Young's modulus in 23° C. and 55% RH is shown as an index. Young's modulus can be measured based on JIS-K-6911.

The transmissivity of a polarizing plate protective film of the present invention is preferably 90% or more, more preferably 92% or more, still more preferably 93% or more. Further, as for a haze, it is desirable that it is 0.5% or less, more preferably 0.1% or less, and still more preferably 0%.

(Polarizing Plate)

A polarizing plate of the present invention and a liquid crystal display device employing the polarizing plate of the present invention will be explained.

(Polarizer)

As a polarizer, one which is prepared by stretching and dying a polyvinyl alcohol based film with iodine is preferably used.

Especially it is preferable that the above polarizer is cast employing ethylene-modified polyvinyl alcohol at an ethylene unit content of 1-4 mol %, a degree of polymerization of 2,000 and a saponification ratio of 99.0-99.99 mol %, and is prepared employing an ethylene-modified polyvinyl alcohol film at a hot-water cutting temperature of 66-73° C. Further, in order to decrease color spots, it is more preferable that the difference of the hot water cutting temperature between two points 5 cm apart in the TD direction is at most 1° C. Still further, in order to decrease color spots, it is still more preferable that the difference of the hot water cutting temperature between two points 1 cm apart in the TD direction is at most 0.5° C.

A polarizer using this modified polyvinyl alcohol film is especially preferably used for a large scale liquid crystal device, because it is excellent in a polarizing capability and a durability and further it has less color irregularities (color spots).

Employed as the ethylene-modified polyvinyl alcohol (being the ethylene-modified PVA) may be those which are prepared in such a manner that ethylene-vinyl ester based polymers, prepared by copolymerizing ethylene and vinyl ester based monomers, are saponified in which vinyl ester units are employed as vinyl alcohol units. Examples of the above vinyl ester based monomers include vinyl formate, vinyl acetate, vinyl propionate, vinyl valerate, vinyl laurate, vinyl stearate, vinyl benzoate, vinyl pivaliate, and versatic acid vinyl esters. Of these, it is preferable to employ vinyl acetate.

The content of ethylene units (the copolymerized amount of ethylene) in the ethylene-modified PVA is commonly 1-4 mol %, is preferably 1.5-3 mol %, is still more preferably 2-3 mol %.

When the content of ethylene units is within this range, the polarizing performance and the durability are enhanced and color spots are decreased.

Further, as to ethylene modified polyvinyl alcohol, monomers listed below can be copolymerized with vinyl ester based monomers. When copolymerizing with vinyl ester based monomers, a preferable range is not more than 15 mol %, more preferably not more than 5 mol %.

Examples of such copolymerizable monomers with vinyl ester based monomers include olefins having 3-30 carbon atoms such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfinic acid and salts thereof, acrylamidopropyldimethylanine and salts thereof, N-methylol acrylamide and derivatives thereof; methacrylamide derivatives such as methacrylamide, N-methylmethacrylamide, N-ethylmethacrylamide, methacrylamidopropane sulfonic acid and salts thereof; methacrylamidopropyldimethylamine and salts thereof, or N-methylol methacrylamide and derivatives thereof; N-vinylamides such as N-vinylformamide, N-vinylacetamide, or n-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitrites such as acrylonitrile or methacrylonitrile; halogenated vinyls such as vinyl chloride, vinylidene chloride, vinyl fluoride, or vinylidene fluoride; allyl compounds such as allyl acetate or allyl chloride; maleic acid, and salts and esters thereof; itaconic acid, and salts and esters thereof; vinylsilyl compounds such as vinylmethoxysilane; and N-vinylamides such as isopropenyl acetate, N-vinylformamide, N-vinylacetamide, or N-vinylpyrrolidone.

The degree of polymerization of ethylene-modified PVA composing the polarizer and of PVA of the polarizing film is commonly 2,000, is preferably 2,500, but is more preferably 2,000 in terms of polarizing performance and durability. When the degree of polymerization of ethylene-modified PVA is at most 2,000, the polarizing performance and durability of the polarizing film are undesirably degraded. On the other hand, the degree of polymerization of at most 4,000 is preferred since color spots of the polarizer are hardly formed.

The degree of polymerization of the ethylene-modified PVA refers to the weight average degree of polymerization. This weight average degree of polymerization is a value obtained by performing GPC measurement at 40° C. employing hexafluoroisopropanol (HFIP) added with 20 millimol/liter of sodium trifluoroactate in the moving phase employing monodispersed PMMA as a standard product.

In view of polarization performance and durability of a polarizing film, the ratio of saponification of the ethylene-modified PVA constituting the polarizer is preferably 99.0-99.99 mol %, is more preferably 99.9-99.99 mol %, but is most preferably 99.95-99.99 mol %.

Although a method to produce an ethylene-modified PVA film may not be limited specifically, the extrusion casting method and the melt extrusion method may be preferable to obtain a good ethylene-modified PVA film. The resulting ethylene-modified PVA film is, if necessary, dried and thermally treated.

Cited as solvents to dissolve the ethylene-modified PVA employed during production of ethylene-modified PVA film may, for example, be dimethylsulfoxide, dimethylformamide, dimethylacetamide, N-methylpyrrolidone, ethylene glycol, glycerin, propylene glycol, triethylene glycol, tetraethylene glycol, trimethylolpropane, ethylenediamine, diethylenetriamine, and water. These may be employed individually or in combination of at least two types. Of these, suitably employed is dimethylsulfoxide and water, or a mixed solvent of glycerin and water.

The ratio of ethylene-modified PVA, incorporated in an ethylene-modified PVA solution or water-containing ethylene-modified PVA employed during production of the ethylene-modified film, varies depending on the degree of polymerization of the ethylene-modified PVA, but is commonly 20-70% by weight, is preferably 25-60% by weight, but is more preferably appropriately 30-55% by weight, but is most preferably 35-50 by weight. When the ratio of the ethylene-modified PVA exceeds 70% by weight, viscosity of the ethylene-modified PVA solution or the water-containing ethylene-modified PVA becomes excessively high, whereby it becomes difficult to prepare a film without foreign matter and defects due to difficult filtration and defoaming. On the other hand, when the ratio of the ethylene-modified PVA is at most 20% by weight, the viscosity of the ethylene-modified PVA solution or the water-containing ethylene-modified PVA becomes excessively low, whereby it becomes difficult to prepare a PVA film at the targeted thickness. Further, if desired, plasticizers, surface active agents, and dichroic dyes may be incorporated in the above ethylene-modified PVA solution or water-containing ethylene-modified PVA.

During production of the ethylene-modified PVA film, it is preferable to incorporate polyhydric alcohols as a plasticizer. Examples of polyhydric alcohols include ethylene glycol, glycerin, propylene glycol, diethylene glycol, diglycerin, triethylene glycol, tetraethylene glycol, and trimethylolpropane. These may be employed individually or in combinations of at least two types. Of these, in view of orientation enhancement effects, diglycerin, ethylene glycol, and glycerin are preferable.

The added amount of polyhydric alcohols is preferably 1-30 parts by weight with respect to 100 parts by weight of the ethylene-modified PVA, is more preferably 3-25 parts by weight, but is most preferably 5-20 parts by weight. When the added amount is at most 1 part by weight, dying properties and orientation properties are occasionally degraded, while when it exceeds 30 parts by weight, the ethylene-modified film becomes excessively flexible, whereby handling properties tend to be degraded.

During production of the ethylene-modified PVA film, it is preferable to incorporate surface active agents. The types of surface active agents are not particularly limited, but nonionic or cationic surface active agents are preferred. Examples of suitable anionic surface active agents include carboxylic acid types such as potassium laurate, sulfuric acid ester types such as octyl sulfate, and sulfonic acid types such as dodecylbenznene sulfonate. Examples of suitable nonionic surface active agents include alkyl ether types such as polyoxyethylene oleyl ether; alkyl phenyl ether types such as polyoxyethylene octyl phenyl ether; alkyl ester types such as polyoxyethylenelaurate; alkylamine types such as polyoxyethylene lauryl aminoether; alkylamide types such as polyoxyethylene lauric acid amide; polypropylene glycol ether types such as polyoxyethylene polyoxypropylene ether; alkanol amide types such as oleic acid diethanolamide; and allyl phenyl ether types such as polyoxyalkylene phenyl ether. These surface active agents may be employed individually or in combinations of at least two types.

The added amount of surface active agents is preferably 0.01-1 part by weight with respect to 100 parts by weight of the ethylene-modified PVA, is more preferably 0.02-0.5 part by weight, but is most preferably 0.05-0.3 part by weight. When the added amount is at most 0.01 part by weight, effects to improve film casting properties and peeling properties are hardly exhibited, while when it exceeds 1 part by weight, surface active agents are dissolved out onto the surface of the ethylene-modified PVA film to result in blocking, whereby handling properties tend to be degraded.

The thickness of the ethylene-modified PVA film employed to prepare a polarizer is preferably 10-50 μm, but is more preferably 20-40 μm. When the thickness is at most 10 μm, uniform stretching is hardly performed due to excessively low film strength, whereby color spottings of the polarizing film tend to be generated. On the other hand, when the thickness exceeds 50 μm, during production of a polarizing film via uniaxial orientation of the ethylene-modified PVA film, the thickness tends to vary due to neck-in at the ends, whereby color spottings of the polarizing film tend to be undesirably enhanced.

Further, to produce a polarizing film employing an ethylene-modified PVA film, for example, the ethylene-modified PVA film may be dyed, uniaxially stretched, fixed and dried, if desired, thermally treated. The order of the dying, uniaxial stretching, and fixing is not particularly limited. Further, the uniaxial stretching may be repeated at least twice.

Dying may be performed at any time such as prior to uniaxial stretching, during uniaxial stretching, or after uniaxial stretching. As dyes for dying, iodine-potassium iodide and dichroic dyes may be employed individually or in combinations of at least two types. Dying is commonly performed by immersing a PVA film into a solution incorporating the above dyes. Alternatively, the above dyes may be blended into a PVA film during casting. The above dying conditions and methods are not particularly limited.

It is possible to conduct uniaxial stretching employing either a wet stretching method or a dry heat stretching method, and in heated water (a solution incorporating the above dyes or the fixing bath, described below, may be employed) or in an atmosphere employing the ethylene-modified PVA film after water absorption. The temperature during stretching is not particularly limited. When the ethylene-modified PVA film is stretched in heated water (being wet system stretching), the stretching temperature is preferably 30-90° C., while in the case of dry heat stretching, it is preferably 50-180° C. The stretching factor (the total stretching factor in the case of multistage uniaxial stretching) is preferably at least 4 in terms of polarization performance of a polarizing film, but is most preferably at least 5. The upper limit of the stretching factor is not particularly limited. However, the stretching factor is preferably at least 8, since uniform stretching is readily performed. The film thickness after stretching is preferably 2-20 µm, is more preferably 5-20 µm, but is most preferably 5-15 µm.

To strengthen adsorption of the above dyes onto the ethylene-modified PVA film, a fixing treatment is frequently conducted. Commonly, boric acid and/or boron compounds are added to a treatment bath employed for the fixing treatment. Alternatively, if desired, iodine compounds may be incorporated in the treatment bath.

Drying of a prepared polarizer is preferably performed between 30-150° C., but is more preferably performed between 50-150° C.

An optically transparent protective film, exhibiting desired mechanical strength, is adhered to one or both sides or side of the polarizer, prepared as above, whereby a polarizing plate is prepared. Listed as adhesives for the above adhesion may be PVA based and urethane based adhesives. Of these, the PVA based adhesives are preferable.

(A Polarizing Plate and a Liquid Crystal Display)

A polarizing plate protective film of the present invention has an excellent viewing angle compensation function and has improved a humidity dependence of a viewing angle compensation function and a viewing angle compensation function, whereby the polarizing plate protective film can be used as a polarizer protection film, and also can be used as an optical compensation film to magnify the viewing angle of a liquid crystal display while maintaining a stable performance.

A polarizing plate of the present invention is explained.

The polarizing plate of the present invention is producible by a general method. For example, after carrying out an alkali saponification process for a cellulose ester film, there is a method of using a full saponification type polyvinyl-alcohol aqueous solution and sticking them on double surfaces of a polarizer. The alkali saponification process is a process to soak a cellulose ester film into a hot strong alkali liquid in order to improve the wetting of a water base adhesives and to raise adhesion property.

At this time, a polarizing plate protective film of the present invention is used at least one of the cellulose ester film. Another cellulose ester film can be used for another surface.

The cellulose ester film manufactured for a polarizing plate protective film of the present invention may be used for the another surface, or a commercially available cellulose ester film (KC8UX 2M, KC4UX 2M, KC5UN, KC4UY, KC8UY (manufactured by Konica Minolta OPT Inc.)) may be used as a polarizing plate protection film of another surface of a surface side.

It is desirable that the polarizer protection film used for a surface side of a display device includes an antireflection layer, an antistatic coating and an antipollution layer besides anti-glaring layer or a clear hard coat layer.

The polarizing plate of the present invention obtained as mentioned above can be arranged so at to be pasted on double surfaces of liquid crystal cell, whereby a liquid crystal display of the present invention can be produced.

Moreover, at the time of production of a polarizing plate, it is desirable to carry out a lamination so that a in-plane slow axis of a polarizing plate protective film of the present invention and a transmission axis of a polarizer are parallel or may intersect perpendicularly. In this case, it is especially preferable in the sense of manufacture that a long-roll film is used so as to paste roll to roll. With this, light leakage at the time of a black indication is improved remarkably and even if a liquid crystal display is has a big screen more than 15 type, preferably more than 19 type, there is no white omission in a screen periphery section. Further, even under an environment that humidity change is large, stable viewing angle characteristics with its effect are maintained for a long period of time. Especially, a prominent effect is observed on a MVA (multi domain vertical alignment) type liquid crystal display. Moreover, the viewing angle characteristics of a liquid crystal display which employs various drive systems, such as TN, VA, OCB, and HAN, can be optimized.

EXAMPLE

The following describes the present invention with reference to specific examples, without the present invention being restricted thereto:

Example 1

The following describes the method of describing the Ro, Rt, S1 and S2:

The present inventors measured the average refractive index of the film constituent material using an Abbe refractometer (IT) and a spectral light source. They also measure the film thickness using a commercially available micrometer.

Using the automatic double refractometer KOBRA-21ADH (manufactured by Oji Scientific Instruments), the present inventors measured the retardation value of the film at a wavelength of 590 nm in the same environment, wherein this film had been left to stand for 24 hours at 23 degrees Celsius and 55% RH. Substituting the aforementioned average refractive index and film thickness into the following equations, they obtained the in-plane retardation (Ro), retardation (Rt) along the thickness of the film, and values S1 and S2. At the same time, the inventors measured the directions of low axes of the film.

$Ro = (nx - ny) \times d$   Equation (i)

$Rt = \{(nx + ny)/2 - nz\} \times d$   Equation (ii)

$S1 = nx - ny$   Equation (iii)

$S2 = (nx + ny)/2 - nz$   Equation (iv)

where nx denotes the refractive index in the direction of the low axis inside the film surface, ny indicates the refractive index in the direction of the high axis inside the film surface, nz represents the refractive index along the film thickness, and d shows the film thickness (nm).

<<Preparation of Cellulosic Ester Film 101>>

The inventors prepared the main dope solution of the following compositions using the apparatus given in FIG. 1, by taking the steps of putting methylene chloride and ethanol in a pressure dissolution tank; adding cellulosic ester into the solvent mixture in the tank while stirring the mixture; heating while stirring the mixture until the cellulosic ester was completely dissolved; adding an additive such as a plasticizer to dissolve the mixture; and filtering the solution by a filter paper Azumi No. 244 (manufactured by AZUMI FILTERPAPER CO., LTD). This dope was uniformly flow-cast over a 2-m-wide stainless band support using a belt casting apparatus. The solvent was allowed to evaporate over the stainless band support until the quantity of solvent was 110%. Then the web was separated from the stainless band support, and was conveyed 150 m by the conveyance roll. The web was then drawn 1.3 times along the width in an environment of 130 degrees Celsius by the tenter stretching apparatus (FIG. 3), and the web was held for several seconds with the width kept unchanged. The crosswise tension was alleviated to release the force for keeping the width unchanged. After that, the web was dried by being conveyed 2000 m over a third drying zone set to 125 degrees Celsius, thereby producing a 1.5-m-wide cellulosic ester film 101 with a knurled portion on the edge having a width of 1 cm and a height of 8 μm.

<Composition of the Main Doping Solution>
Methylene chloride: 300 parts by mass
Ethanol: 52 parts by mass
Hydrophilic polymer: Cellulosic ester A (cellulose acetate propionate; Acetyl group replacement ratio of 1.5; and propionyl group replacement ratio of 0.9) 100 parts by mass
Plasticizer A (pentaerythritol tetrabenzoate (polyvalent alcohol ester)): 8 parts by mass
Plasticizer B (Sample No. 3 (aromatic end ester)): 8 parts by mass
Silicon dioxide particles (Aerosil R972V (manufactured by Japan Aerosil)): 0.3 parts by mass
Ultraviolet absorbent (TINUVIN 109 (manufactured by Ciba Specialty Chemicals)): 0.6 parts by mass
Ultraviolet absorbent (TINUVIN 171 (manufactured by Ciba Specialty Chemicals)): 0.5 parts by mass To get the silicon dioxide particles, the following particle dispersion solution and the particle 'added solution using the same were prepared, and the following particle' added solution was added to the main dope to ensure a predetermined amount of particles to be added.

<Particle Dispersion Liquid>
Particles (Aerosil R972V (manufactured by Japan Aerosil)): 11 parts by mass
Ethanol: 89 parts by mass The inventors stirred the above mixture by a dissolver for 50 minutes and dispersed the particles in the mixture by a Manthon Gaulin.

<Particle Dispersion Liquid>

The inventors prepared the particle-added solution by taking the steps of further adding 89 parts by mass of methylene chloride to the aforementioned particle dispersion liquid, and filtering the mixture by a filter having a bore diameter of 1 μm.

<<Preparation of Cellulosic Ester Films 102 through 121>>

The inventors prepared cellulosic ester films 102 to 121 in the same manner as above, except that the hydrophilic polymer (cellulosic ester), amount of additives, and conveyance distance from the point of separation to the point of starting stretching, listed in Table 1 are changed. The amounts of the plasticizer A and plasticizer B to be added were changed so that the total amounts to be added would be as listed in Table 1, wherein the ratio was kept unchanged. The amounts of the ultraviolet absorber A and ultraviolet absorber B to be added were changed so that the total amounts to be added would be as listed in Table 1, wherein the ratio was kept unchanged.

A polarizing plate was produced according to the following procedure using the cellulosic ester films 101 through 121 having been prepared, and was evaluated according to the aforementioned criteria.

<<Preparation of Polarized Plates>>

The inventors prepared an alkaline-saponificated polarized plate using the above-prepared cellulosic ester films as the web samples:

<Alkaline Saponification>
Saponification process: 2M-NaOH 50 degrees Celsius, 90 seconds
Rinse process: Water 30 degrees Celsius, 45 seconds
Neutralization process: 10 mass % HCl 30 degrees Celsius, 45 seconds
Rinse process: Water 30 degrees Celsius, 45 seconds After the saponification, rinse, neutralization, and rinse processes in that order, the films were dried at 80 degrees Celsius.

<Preparation of Polarizer>
(Polarizer A: Ethylene Denatured Polyvinyl Alcohol Polarizer)

The inventors prepared a 40-μm-thick polarizer ethylene denatured polyvinyl alcohol polarizer by taking the steps of adding a mixture of 10 parts (by mass) of glycerine and 200 parts of water to 100 parts of ethylene denatured polyvinyl alcohol (content of ethylene unit of 2.1 mol %, saponification degree of 99.92 mol %, and polymerization degree of 3000), fusion-blending the mixture, defoaming the same, fusion-extruding the same from a T die to metal rolls, and then drying the same.

The present inventors prepared a polarizer by processing the aforementioned ethylene denatured polyvinyl alcohol film in the order of pre-swelling, dyeing, uniaxial stretching, fixing, drying and heating. To put it more specifically, the inventors took the steps of immersing the ethylene denatured polyvinyl alcohol film in water of 30 degrees Celsius for 60 seconds to let the film pre-swell, and then immersing the pre-swollen film in an aqueous solution which contained 40 g/liter of boric acid, 0.4 g/liter of iodine, and 60 g/liter of potassium iodide at 35 degrees Celsius for 2 minutes. These steps were followed by the further steps of uniaxial-stretching the film up to 6 times in an aqueous solution which contained 4% of boric acid, and immersing the film in an aqueous solution which contained 60 g/liter of potassium iodide, 40 g/liter of boric acid, and 10 g/liter of zinc chloride at 30 degrees Celsius for 5 minutes to fix the same. Then the fixed ethylene denatured polyvinyl alcohol film was taken out of the solution. After that, this film of a fixed length was dried by hot air of 40 degrees Celsius and was further heated at 100 degrees Celsius for 5 minutes.

The polarizer having been produced was characterized by a film thickness of 15 μm, a transmittance of 43%, and degree of polarization of 99.9%.

(Polarizer B: Polyvinyl Alcohol Polarizer)

The inventors prepared a 24-μm-thick polyvinyl alcohol polarizer by taking the steps of uniaxial stretching a 120-μm thick polyvinyl alcohol film (at 110 degrees Celsius and a stretching rate of 5 times), immersing this film in an aqueous solution containing 0.075 g of iodine, 5 g of potassium iodide and 100 g of water for 60 seconds, and then in an aqueous solution containing 6 g of potassium iodide, 7.5 g of boric acid, and 100 g of water at 68 degrees Celsius, rinsing and drying the same.

The KONIKA MINOLTATAC KC8UX-RHA(manufactured by Konica Minolta Opt) as a commercially available alkaline saponified cellulosic ester film was bonded on one side of the aforementioned polarizer A, and the cellulosic ester films 101 through 121 on the opposite side using an aqueous solution containing 5% of fully saponified polyvinyl alcohol as an adhesive. This polarizer A was then dried to get polarizing plates 101 through 121. After that, polarizing plates 105B, 113B and 118B were produced in the same procedure as the polarizing plates 105, 113 and 118 except that the polarizer B was used instead of polarizer A.

<<Evaluation>>

(Transmittance of a Polarizing Plate as a Single Unit, Transmittance ΔT2 of Crossed-Nichols and Change in Transmittance ΔT2 Resulting from Change in Humidity)

With regard to the transmittance of the polarizing plate as a single unit, the test environment was set at 23 degrees Celsius and 55% RH and then under this condition, a polarizing plate sample was subjected to a humidity control for 24 hours. Thereafter, the transmittance of the polarizing plate sample was measured by using a spectrophotometer U3100 (manufactured by Hitachi Seisakusho) with a wavelength of 590 nm, thereby obtaining the transmittance of a polarizing plate as a single unit.

Similarly, two polarizing plate samples were subjected to a humidity control for 24 hours under the condition of 23 degrees Celsius and 55% RH. Then, the two polarizing plate samples were superimposed on the condition that the absorbing axes of the two polarizing plate samples were crossed perpendicularly to each other and the transmittance was measured by using a spectrophotometer U3100 (manufactured by Hitachi Seisakusho) with a wavelength of 590 nm under the measuring condition of 23 degrees Celsius and 55% RH, thereby obtaining the transmittance T2 of crossed-Nichols of a polarizing plate.

Further, the transmittance T2 of crossed-Nichols was obtained similarly except that the humidity control and the measuring condition was changed to 23 degrees Celsius and 20% RH and 23 degree Celsius and 80% RH, and the difference when changing the humidity was obtained as a change in transmittance ΔT2.

TABLE 1

| *1 | *2 Type | *2 Quantity | Plasticizer | Ultra-violet curing agent | Particles | Conveyance distance (m) | Wf (%) | Wm (%) | Wu (%) | Wm/Wf | Wu/Wf | ** | Ro (nm) | Rf (nm) |
|---|---|---|---|---|---|---|---|---|---|---|---|---|---|---|
| 101 | A | 100 | 16 | 1.1 | 0.3 | 40 | 13.6 | 0.26 | 0.9 | 0.019 | 0.069 | 0.16 | 30 | 130 |
| 102 | A | 100 | 12 | 0.7 | 0.4 | 100 | 10.6 | 0.35 | 0.6 | 0.033 | 0.058 | 0.12 | 45 | 125 |
| 103 | B | 100 | 14 | 0.7 | 0.3 | 150 | 12.2 | 0.26 | 0.6 | 0.021 | 0.050 | 0.16 | 50 | 120 |
| 104 | A | 100 | 12 | 0 | 0 | 150 | 10.7 | 0.00 | 0.0 | 0.000 | 0.000 | 0.22 | 45 | 125 |
| 105 | A | 100 | 12 | 0 | 0.2 | 150 | 10.7 | 0.18 | 0.0 | 0.017 | 0.000 | 0.17 | 42 | 130 |
| 106 | A | 100 | 13 | 2.5 | 0.6 | 10 | 11.2 | 0.52 | 2.2 | 0.046 | 0.192 | 0.08 | 30 | 135 |
| 107 | A | 100 | 12 | 0 | 0.6 | 20 | 10.7 | 0.53 | 0.0 | 0.050 | 0.000 | 0.07 | 35 | 130 |
| 108 | A | 100 | 12 | 1.5 | 0.2 | 30 | 10.6 | 0.18 | 1.3 | 0.017 | 0.125 | 0.17 | 35 | 135 |
| 109 | A | 100 | 15 | 1.5 | 0.3 | 40 | 12.8 | 0.26 | 1.3 | 0.020 | 0.100 | 0.16 | 40 | 130 |
| 110 | A | 100 | 11 | 0.7 | 0.4 | 50 | 9.8 | 0.36 | 0.6 | 0.036 | 0.064 | 0.11 | 45 | 125 |
| 111 | B | 100 | 14 | 0.7 | 0.3 | 200 | 12.2 | 0.26 | 0.6 | 0.021 | 0.050 | 0.16 | 50 | 135 |
| 112 | B | 100 | 11 | 0 | 0 | 200 | 9.9 | 0.00 | 0.0 | 0.000 | 0.000 | 0.22 | 50 | 140 |
| 113 | A | 100 | 11 | 0 | 0.2 | 150 | 9.9 | 0.18 | 0.0 | 0.018 | 0.000 | 0.17 | 42 | 130 |
| 114 | A | 100 | 11 | 1 | 0.3 | 40 | 9.8 | 0.27 | 0.9 | 0.027 | 0.091 | 0.14 | 30 | 130 |
| 115 | A | 100 | 11 | 0.7 | 0.4 | 50 | 9.8 | 0.36 | 0.6 | 0.036 | 0.064 | 0.11 | 42 | 130 |
| 116 | C | 100 | 11 | 0.7 | 0.3 | 300 | 9.8 | 0.27 | 0.6 | 0.027 | 0.064 | 0.14 | 100 | 220 |
| 117 | C | 100 | 14 | 0 | 0 | 300 | 12.3 | 0.00 | 0.0 | 0.000 | 0.000 | 0.22 | 70 | 220 |
| 118 | B | 100 | 11 | 0 | 0.2 | 150 | 9.9 | 0.18 | 0.0 | 0.018 | 0.000 | 0.17 | 50 | 115 |
| 119 | C | 100 | 11 | 1 | 0.4 | 350 | 9.8 | 0.36 | 0.9 | 0.036 | 0.091 | 0.11 | 100 | 220 |
| 120 | C | 100 | 11 | 1.5 | 0.4 | 330 | 9.7 | 0.35 | 1.3 | 0.036 | 0.136 | 0.11 | 70 | 220 |
| 121 | C | 100 | 11 | 1.5 | 0.2 | 330 | 9.8 | 0.18 | 1.3 | 0.018 | 0.136 | 0.17 | 70 | 220 |

| *1 | d (μm) | S1 | S2 | *3 | *4 | 0.05 × T2 | ΔT2 | 0.9 × T2 | Tint fluctuation | Remarks |
|---|---|---|---|---|---|---|---|---|---|---|
| 101 | 70 | 0.00043 | 0.00186 | 42.5 | 0.030 | 0.00150 | 0.0200 | 0.0270 | C | Inv. |
| 102 | 45 | 0.00100 | 0.00278 | 42.3 | 0.025 | 0.00125 | 0.0100 | 0.0225 | B | Inv. |
| 103 | 40 | 0.00125 | 0.00300 | 44.9 | 0.015 | 0.00075 | 0.0050 | 0.0135 | B | Inv. |
| 104 | 60 | 0.00075 | 0.00208 | 43.1 | 0.015 | 0.00075 | 0.0025 | 0.0135 | B | Inv. |
| 105 | 50 | 0.00084 | 0.00260 | 43.9 | 0.005 | 0.00025 | 0.0005 | 0.0045 | A | Inv. |
| 106 | 80 | 0.00038 | 0.00169 | 40.0 | 0.033 | 0.00165 | 0.0290 | 0.0297 | D | Comp. |
| 107 | 80 | 0.00044 | 0.00163 | 41.2 | 0.015 | 0.00075 | 0.0150 | 0.0135 | D | Comp. |
| 108 | 80 | 0.00044 | 0.00169 | 39.2 | 0.030 | 0.00150 | 0.0014 | 0.0270 | D | Comp. |
| 109 | 60 | 0.00067 | 0.00217 | 43.3 | 0.030 | 0.00150 | 0.0200 | 0.0270 | C | Inv. |
| 110 | 40 | 0.00113 | 0.00313 | 43.3 | 0.025 | 0.00125 | 0.0100 | 0.0225 | B | Inv. |
| 111 | 40 | 0.00125 | 0.00338 | 43.3 | 0.015 | 0.00075 | 0.0025 | 0.0135 | B | Inv. |
| 112 | 45 | 0.00111 | 0.00311 | 43.3 | 0.015 | 0.00075 | 0.0050 | 0.0135 | B | Inv. |
| 113 | 55 | 0.00076 | 0.00236 | 42.2 | 0.005 | 0.00025 | 0.0005 | 0.0045 | A | Inv. |
| 114 | 25 | 0.00120 | 0.00520 | 42.3 | 0.030 | 0.00150 | 0.0200 | 0.0270 | C | Inv. |
| 115 | 42 | 0.00100 | 0.00310 | 42.3 | 0.025 | 0.00125 | 0.0100 | 0.0225 | B | Inv. |

TABLE 1-continued

| 116 | 60 | 0.00167 | 0.00367 | 42.3 | 0.015 | 0.00075 | 0.0025 | 0.0135 | B | Inv. |
| 117 | 45 | 0.00156 | 0.00489 | 42.3 | 0.015 | 0.00075 | 0.0050 | 0.0135 | B | Inv. |
| 118 | 55 | 0.00091 | 0.00209 | 43.6 | 0.005 | 0.00025 | 0.0005 | 0.0045 | A | Inv. |
| 119 | 80 | 0.00125 | 0.00275 | 39.0 | 0.033 | 0.00165 | 0.0290 | 0.0297 | D | Comp. |
| 120 | 70 | 0.00100 | 0.00314 | 38.4 | 0.015 | 0.00075 | 0.0150 | 0.0135 | D | Comp. |
| 121 | 70 | 0.00100 | 0.00314 | 38.3 | 0.030 | 0.00150 | 0.0014 | 0.0270 | D | Comp. |

Hydrophilic polymer
A: Acetyl replacement ratio: 1.5; propionyl group replacement ratio: 0.9
B: Acetyl replacement ratio: 1.5; propionyl group replacement ratio: 0.8
C: Acetyl replacement ratio: 1.4; propionyl group replacement ratio: 0.7
**: (−3 × Wm/Wf + 0.22), Quantity: parts by mass,
*1: Cellulosic ester film No.,
*2: Hydrophilic polymer,
*3: Transmittance (%) of polarizing plate as a unit
*4: Transmittance T2 (%) of crossed-Nichols, Inv.: Invention, Comp.: Comparative example The Table 1 shows the cellulosic ester film of the present invention wherein the production process conditions and the amount of the ultraviolet absorber and particle are controlled. It is apparent that this film has sufficient phase difference, and the fluctuation of retardation value due to humidity change is smaller in this film than that in the comparative example, providing excellent performances as a polarizing plate protective film.

<<Preparation of Liquid Crystal Display>>

The present inventors prepared the liquid crystal displays 101 through 121 by taking the steps of removing the polarizing plate from the Sony-made liquid crystal television set KLV20AP2, and bonding the above prepared polarizing plates 101 through 121 to the glass surface of the liquid crystal cell (VA type), wherein the surface bonded with the polarizing plate was bonded in such a way that the polarizing plate protective films of the present invention (cellulosic ester films 101 through 121) would be located on the side of the liquid crystal cell, and the absorption axis was oriented in the same direction as the polarizing plate having been bonded in advance.

<<Evaluation>>

The liquid crystal displays 101 through 121 having been manufactured were evaluated as follows:

(Measurement of Tint Fluctuation in a Slanting Direction)

The KING BRIGHT BOX-5000 instead of the cold-cathode tube was used as a light source to protect against adverse effect of the backlight. Under this condition, the backlight of the above prepared liquid crystal display was turned on at 23 degrees Celsius and 55% RH. Twenty minutes later, the ELDIM-made EZ-Contrast was used to measure the white and black display and to calculate the front contrast, thereby obtaining the amount of light on the front surface and at the tilt angle of 60 degrees with respect to azimuth angles of 45, 135, 225 and 315 degrees, and the u' and v' of the CIE 1976 chromaticity diagram. Thus, the average value of the values at the tilt angle of 60 degrees with respect to azimuth angles of 45, 135, 225 and 315 degrees was used as the value in a slanting direction. Further, the backlight was turned on at 23 degrees Celsius and 20% RH, and 23 degrees Celsius and 80% RH. Twenty minutes later, the same measurement was conducted to calculate the change (difference) in the amount of light in black display at 23 degrees Celsius and 55% RH. A change in tint was evaluated by visual observation according to the following criteria. A smaller change (difference) signifies a more stable status.

A: No change in a slanting direction
B: A slight change without problem (accepted)
C: Some change found (accepted only with difficulty)
D: A serious change found (rejected)

Table 2 shows the results of this measurement.

TABLE 2

| Liquid crystal apparatus | *1 | Cellulosic ester film no. | | Polarizer | | Change in light intensity | Remarks |
|---|---|---|---|---|---|---|---|
| | | Liquid crystal cell side | Observation side | Type | Film thickness (μm) | | |
| 101 | 101 | 101 | KC8UX-RHA | Polarizer A | 15 | C | Inv. |
| 102 | 102 | 102 | KC8UX-RHA | Polarizer A | 15 | B | Inv. |
| 103 | 103 | 103 | KC8UX-RHA | Polarizer A | 15 | B | Inv. |
| 104 | 104 | 104 | KC8UX-RHA | Polarizer A | 15 | B | Inv. |
| 105 | 105 | 105 | KC8UX-RHA | Polarizer A | 15 | A | Inv. |
| 106 | 106 | 106 | KC8UX-RHA | Polarizer A | 15 | D | Comp. |
| 107 | 107 | 107 | KC8UX-RHA | Polarizer A | 15 | D | Comp. |
| 108 | 108 | 108 | KC8UX-RHA | Polarizer A | 15 | D | Comp. |
| 109 | 109 | 109 | KC8UX-RHA | Polarizer A | 15 | C | Inv. |
| 110 | 110 | 110 | KC8UX-RHA | Polarizer A | 15 | B | Inv. |
| 111 | 111 | 111 | KC8UX-RHA | Polarizer A | 15 | B | Inv. |
| 112 | 112 | 112 | KC8UX-RHA | Polarizer A | 15 | B | Inv. |
| 113 | 113 | 113 | KC8UX-RHA | Polarizer A | 15 | A | Inv. |
| 114 | 114 | 114 | KC8UX-RHA | Polarizer A | 15 | C | Inv. |
| 115 | 115 | 115 | KC8UX-RHA | Polarizer A | 15 | B | Inv. |
| 116 | 116 | 116 | KC8UX-RHA | Polarizer A | 15 | B | Inv. |
| 117 | 117 | 117 | KC8UX-RHA | Polarizer A | 15 | B | Inv. |

TABLE 2-continued

| Liquid crystal apparatus | *1 | Cellulosic ester film no. Liquid crystal cell side | Observation side | Polarizer Type | Film thickness (μm) | Change in light intensity | Remarks |
|---|---|---|---|---|---|---|---|
| 118 | 118 | 118 | KC8UX-RHA | Polarizer A | 15 | A | Inv. |
| 119 | 119 | 119 | KC8UX-RHA | Polarizer A | 15 | D | Comp. |
| 120 | 120 | 120 | KC8UX-RHA | Polarizer A | 15 | D | Comp. |
| 121 | 121 | 121 | KC8UX-RHA | Polarizer A | 15 | D | Comp. |
| 105B | 105 | 105 | KC8UX-RHA | Polarizer B | 24 | B | Inv. |
| 113B | 113 | 113 | KC8UX-RHA | Polarizer B | 24 | B | Inv. |
| 118B | 118 | 118 | KC8UX-RHA | Polarizer B | 24 | B | Inv. |

*1: Polarizing plate, Inv.: Invention, Comp.: Comparative example

In the present invention, the aforementioned method was used for evaluation in order to minimize the adverse effect of the heat of backlight. When evaluation was made using the backlight originally attached to the liquid crystal display, the same tendency was observed in the test result, although there was little difference. In future, to minimize the adverse effect of the heat of backlight, there will be a tendency for the backlight temperature to be more and more reduced. In this case, the adverse effect of humidity is shown to become conspicuous. This suggests the validity of the present invention.

The liquid crystal display of the present invention has been demonstrated to provide extremely stable display performances without fluctuation in view angle even when there is a fluctuation in humidity. Especially the liquid crystal display using the ethylene denatured polyvinyl alcohol polarizer A provides better stability performance.

Example 2

The present inventors produced the cellulosic ester film 201 in the same procedure as the cellulosic ester film 102 in Example 1, except that the following heat treatment was provided.

<<Heat Treatment>>

The present inventors produced the cellulosic ester film 201 by taking the steps of stretching the web by a tentering machine; and drying the web by a drying air at 105 degrees Celsius in the process of conveyance and drying by a roll with a plurality of webs arranged on the upper and lower portions thereof until the residual solvent was reduced to 0.3% by mass, thereby obtaining a film. When this film was heated for 20 minutes in an environment of 110 degrees Celsius and atmosphere change rate of 25 times/hour, the film was pressurized at a pressure of 10 kPa along the thickness of the film by nip rolls arranged in multiple steps. After that, the film was cooled down to the room temperature and was taken up.

The present inventors produced the cellulosic ester films 202 through 205 by the same procedure, except that the heat treatment temperature, atmosphere change rate, and presence or absence of pressurization were changed as listed in Table 2, and the radius of a free volume was placed under control.

Assuming that the atmosphere capacity of the heat treatment chamber is $V(m^3)$ and the amount of fresh air supplied is FA $(m^3/hr)$, the atmosphere change rate in the aforementioned heating process corresponds to the number of times where the atmosphere per unit time calculated by the following equation is replaced by fresh air.

Atmosphere change rate=$FA/V$(number of times/hour)

<Measurement of a free volume radius by the Positron Annihilation Lifetime Measurement>

The inventors measured the radius of free volume of each cellulosic ester film by the Positron Annihilation Lifetime Measurement.

<<Evaluation>>

The inventors evaluated "retardation value fluctuations due to humidity change" of Embodiment 1 and the following items of the prepared cellulosic ester films 201 through 205.

(Retardation Value Change Before and After the Hot and Humid Processing)

The inventors measured retardation values of the prepared cellulosic ester films and calculated Rt(a') fluctuations from the values.

The inventors obtained the Rt(a') fluctuation according to the following equation by taking the following steps: Film samples were placed under humidity control at 23 degrees Celsius and 55% RH for 5 hours, and the Rt value was measured in the same environment, wherein this Rt value was assumed as Rt(b'). The same film samples were placed under humidly control at 80 degrees Celsius and 90% RH for 50 hours and then again at 23 degrees Celsius and 55% RH for 5 hours. After that, the Rt value measured in the same environment was calculated, and the result was assumed as Rt(c'). These values Rt(b') and Rt (c') were assigned to the Equations given below.

$Rt(a')=|Rt(b')-Rt(c')|$

The results of the aforementioned evaluation are listed in Table 3.

TABLE 3

| Cellulosic ester film no. | Heating temperature (°C.) | Atmosphere change rate (no. of time/hr) | *1 | Radius of free volume (nm) | Retardation fluctuation (R + (a')) | Tint fluctuation in slanting direction | Remarks |
|---|---|---|---|---|---|---|---|
| 201 | 135 | 25 | 10 | 0.250 | 9 | A | Inv. |
| 202 | 110 | 12 | — | 0.310 | 10 | A | Inv. |

TABLE 3-continued

| Cellulosic ester film no. | Heating temperature (° C.) | Atmosphere change rate (no. of time/hr) | *1 | Radius of free volume (nm) | Retardation fluctuation (R + (a')) | Tint fluctuation in slanting direction | Remarks |
|---|---|---|---|---|---|---|---|
| 203 | 100 | 15 | — | 0.315 | 11 | B | Inv. |
| 204 | 125 | 15 | 1 | 0.285 | 9 | A | Inv. |
| 205 | 130 | 40 | 5 | 0.245 | 10 | A | Inv. |

*1: Pressurization (kPa), Inv.: Invention

It is apparent that the cellulosic ester film 201 through 205 having been prepared allows the radius of a free volume to be kept within the preferable range (0.250 through 0.310 nm) of the present invention by the aforementioned process of heating and pressurization, whereby the fluctuation in retardation value due to humidity fluctuation is further reduced. The present inventors produced polarizing plates 201 through 205 in the same procedure as that in Example 1, except that the cellulosic ester film 102 was changed into the cellulosic ester films 201 through 205. Further, the present inventors also produced liquid crystal display 201 through 205 in the same procedure as that of the example 1. Both the T2 and ΔT2 of polarizing plates 201 through 205 exhibit the values equivalent to those of the polarizing plate 102. The liquid crystal displays 201 through 205 having been produced based on this finding were measured for the fluctuation of tint in a slanting direction in the same procedure as that of the example 1, and satisfactory results have been obtained—liquid crystal display 203 was evaluated as "B", whereas the liquid crystal display 201, 202, 204 and 205 were rated as "A".

What is claimed is:

1. A polarizing plate, comprising:
   a polarizing element; and
   a hydrophilic polymer film adhered on the polarizing element and having an in-plane orientation;
wherein the transmittance of the polarizing plate as a single unit for light having a wavelength of 590 nm is 40% or more under an environment of 23° C. and 55% RH, the crossed-Nichols transmittance T2 of the polarizing plate is 0.03% or less under an environment of 23° C. and 55% RH, and a change ΔT2 in the transmittance T2 of the polarizing plate when the relative humidity changes from 20% RH to 80% RH at 23° C. satisfies the following formula:

$$0.05 \times T2 < \Delta T2 < 0.9 \times T2.$$

2. The polarizing plate of claim 1, wherein the hydrophilic polymer film has the following optical characteristics for light having a wavelength of 590 nm under an environment of 23° C. and 55% RH that Ro expressed by the following equation (i) is from 30 through 70 nm; Rt expressed by the following equation (ii) is from 100 through 300 nm; S1 expressed by the following equation (iii) is from 0.0005 through 0.0016; and S2 expressed by the following equation (iv) is from 0.0022 through 0.005:

$$Ro = (nx - ny) \times d \qquad \text{Equation (i)}$$

$$Rt = \{(nx + ny)/2 - nz\} \times d \qquad \text{Equation (ii)}$$

$$S1 = nx - ny \qquad \text{Equation (iii)}$$

$$S2 = (nx + ny)/2 - nz \qquad \text{Equation (iv)}$$

where nx denotes the refractive index in the direction of the slow axis inside the film surface, ny indicates the refractive index in the direction of the fast axis inside the film surface, nz represents the refractive index along the film thickness, and d shows the film thickness (nm).

3. The polarizing plate of claim 1, wherein the hydrophilic polymer film contains a ultraviolet absorber and particles in proportions expressed by the following Equations (1) through (3):

$$0 \leq Wu/Wf \leq 0.1 \qquad \text{Equation (1)}$$

$$0 \leq Wm/Wf \leq 0.05 \qquad \text{Equation (2)}$$

$$Wu/Wf \leq -3 \times Wm/Wf + 0.22 \qquad \text{Equation (3)}$$

where wf indicates the percentage of the plasticizer contained in the film, Wu denotes the percentage of the ultraviolet absorber contained in the film, and Wm shows the percentage of the particles contained in the film.

4. The polarizing plate of claim 1, wherein the hydrophilic polymer film is a cellulose derivative.

5. A liquid crystal display apparatus, comprising:
   a liquid crystal cell; and
   the polarizing plate described in claim 1 and adhered onto at least one surface of the liquid crystal cell.

* * * * *